(12) United States Patent
Hsieh et al.

(10) Patent No.: US 7,581,396 B2
(45) Date of Patent: Sep. 1, 2009

(54) MIXER ASSEMBLY FOR COMBUSTOR OF A GAS TURBINE ENGINE HAVING A PLURALITY OF COUNTER-ROTATING SWIRLERS

(75) Inventors: Shih-Yang Hsieh, West Chester, OH (US); George Chia-Chun Hsiao, West Chester, OH (US); Shui-Chi Li, West Chester, OH (US); Hukam Chand Mongia, West Chester, OH (US)

(73) Assignee: General Electric Company, Schnectady, NY (US)

( * ) Notice: Subject to any disclaimer, the term of this patent is extended or adjusted under 35 U.S.C. 154(b) by 676 days.

(21) Appl. No.: 11/188,596

(22) Filed: Jul. 25, 2005

(65) Prior Publication Data

US 2007/0028624 A1 Feb. 8, 2007

(51) Int. Cl.
*F02C 1/00* (2006.01)
(52) U.S. Cl. .......................... 60/748; 60/776
(58) Field of Classification Search .............. 60/776, 60/748, 737, 746, 747, 772
See application file for complete search history.

(56) References Cited

U.S. PATENT DOCUMENTS

| | | | |
|---|---|---|---|
| 5,417,070 A * | 5/1995 | Richardson | .......... 60/748 |
| 6,354,072 B1 | 3/2002 | Hura | |
| 6,363,726 B1 | 4/2002 | Durbin et al. | |
| 6,367,262 B1 | 4/2002 | Mongia et al. | |
| 6,381,964 B1 | 5/2002 | Pritchard, Jr. et al. | |
| 6,418,726 B1 | 7/2002 | Foust et al. | |
| 6,453,660 B1 | 9/2002 | Johnson et al. | |
| 6,484,489 B1 | 11/2002 | Foust et al. | |
| 6,865,889 B2 | 3/2005 | Mancini et al. | |
| 2004/0021235 A1* | 2/2004 | Corr et al. | .......... 261/79.1 |

* cited by examiner

*Primary Examiner*—Michael Cuff
*Assistant Examiner*—Andrew Nguyen
(74) *Attorney, Agent, or Firm*—James Davidson; William Scott Andes

(57) ABSTRACT

A mixer assembly for use in a combustor of a gas turbine engine, including a pilot mixer, a main mixer, and a fuel manifold positioned between the pilot mixer and the main mixer. The pilot mixer further includes an annular pilot housing having a hollow interior and a pilot fuel nozzle mounted in the pilot housing and adapted for dispensing droplets of fuel to the hollow interior of the pilot housing. The main mixer further includes a main housing surrounding the pilot housing and defining an annular cavity, a plurality of fuel injection ports for introducing fuel into the cavity, and a swirler arrangement including at least three swirlers positioned upstream from the plurality of fuel injection ports, wherein each swirler of the swirler arrangement has a plurality of vanes for swirling air traveling through the respective swirler to mix air and the droplets of fuel dispensed by the fuel injection ports. The swirlers are oriented substantially radially to a centerline axis through the mixer assembly or at an acute angle to the centerline axis through the mixer assembly. Alternatively, at least two swirlers are included substantially parallel to the centerline axis through the mixer assembly along with one or more radial or conical swirlers. In another alternative, the swirler arrangement includes a first swirler oriented substantially parallel to a centerline axis through the mixer assembly, a second swirler oriented at an acute angle to the centerline axis through the mixer assembly, and a third swirler oriented substantially radially to the centerline axis through the mixer assembly.

13 Claims, 39 Drawing Sheets

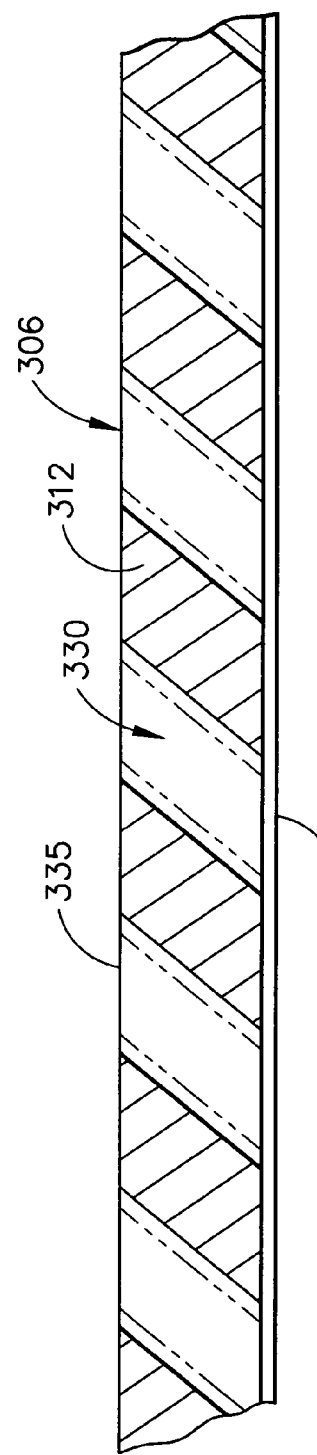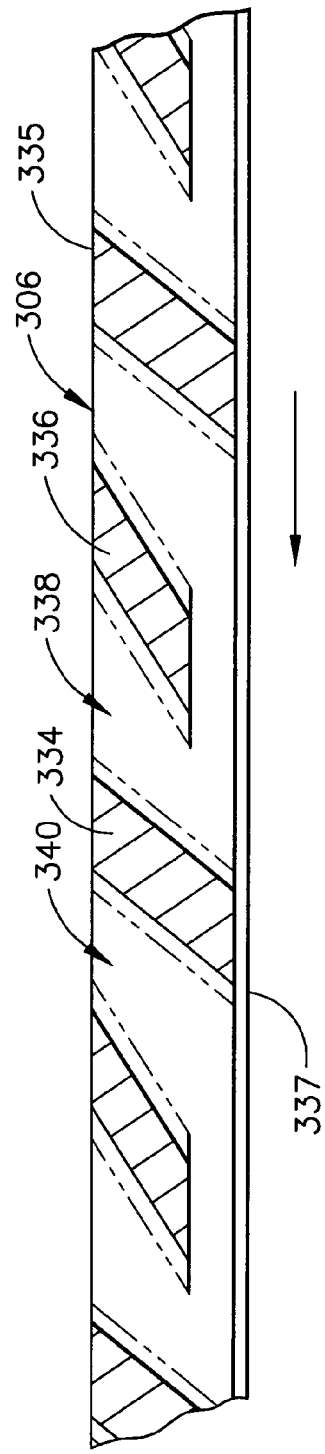

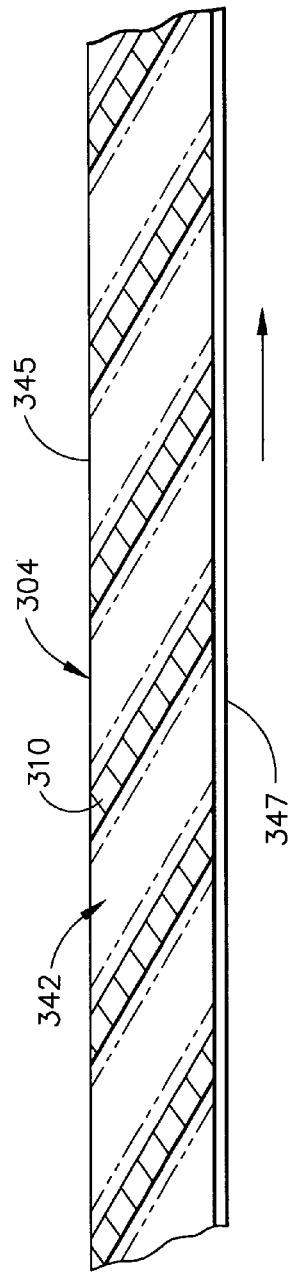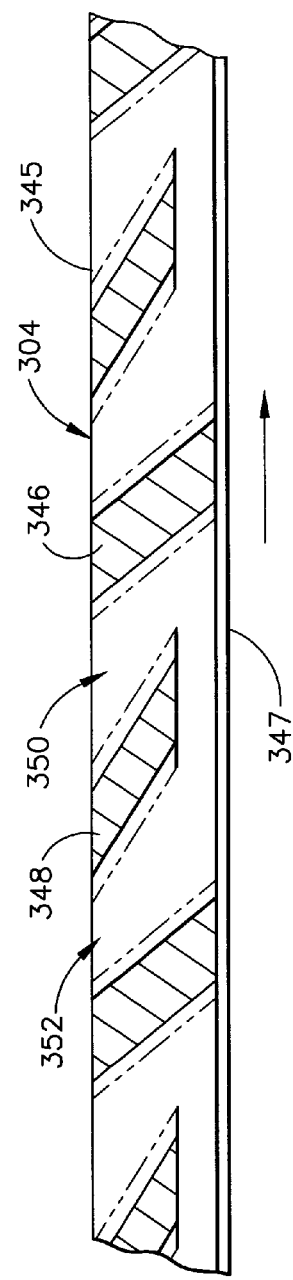

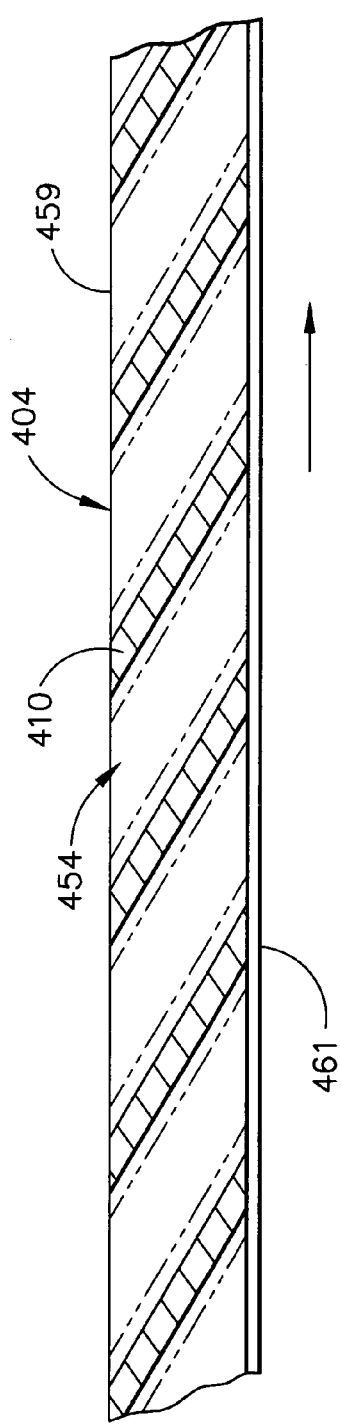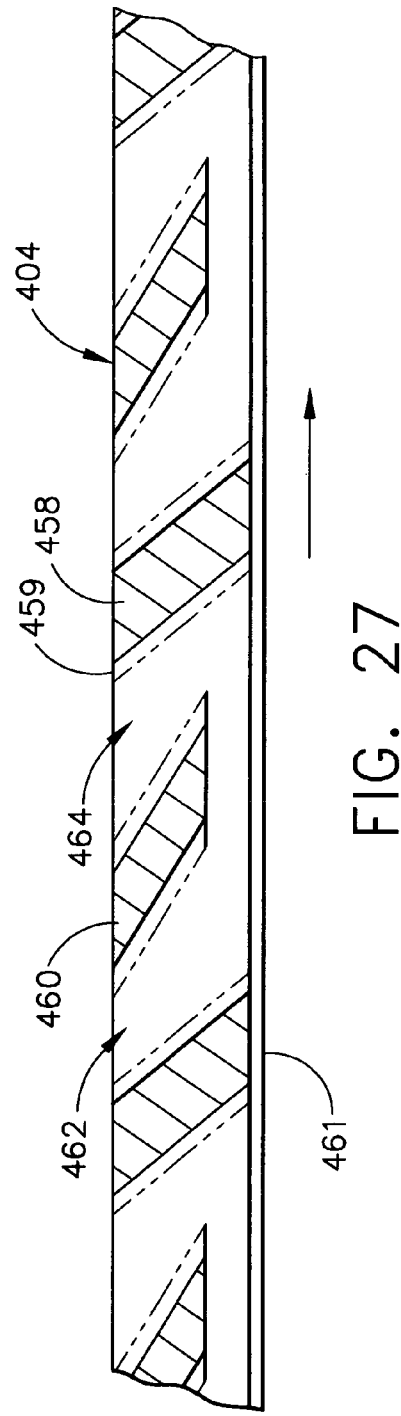

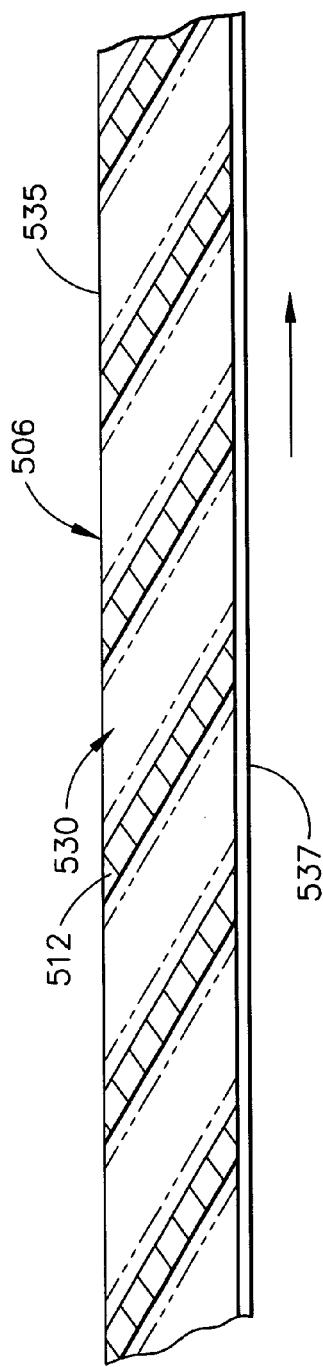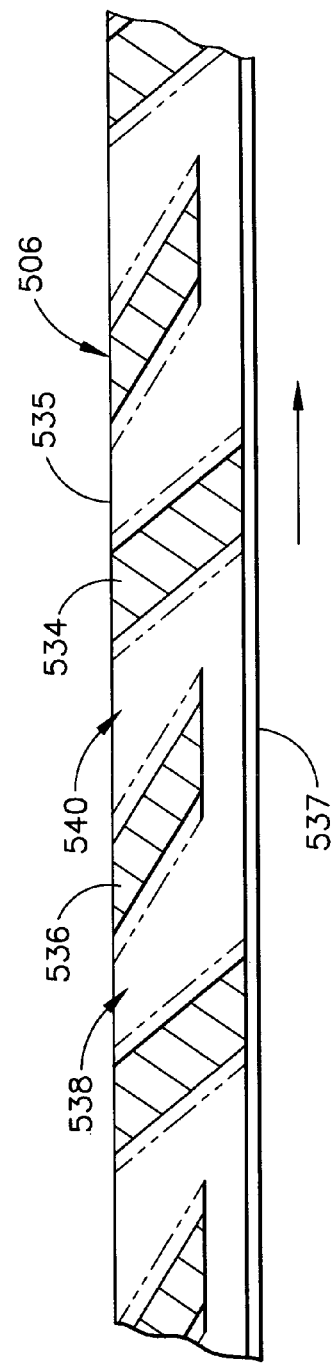
FIG. 31
FIG. 32

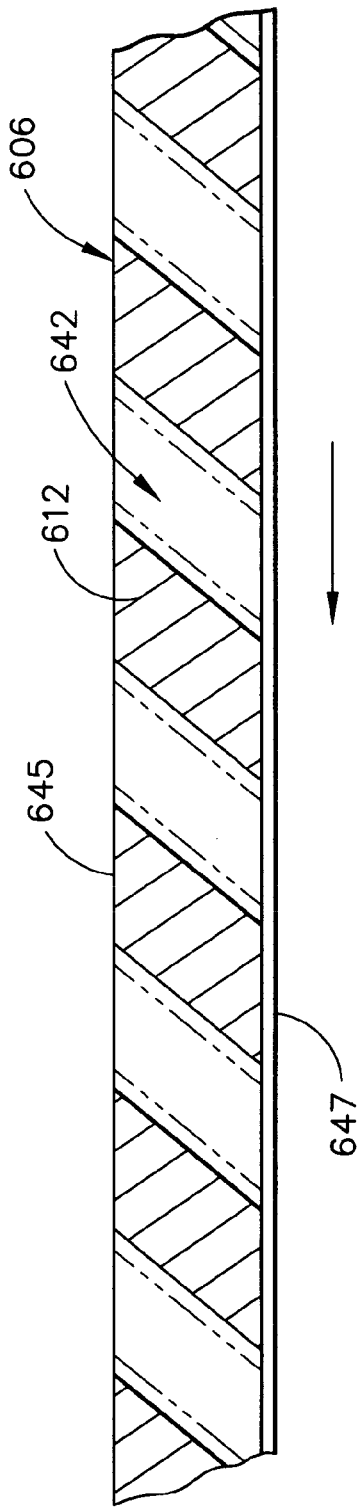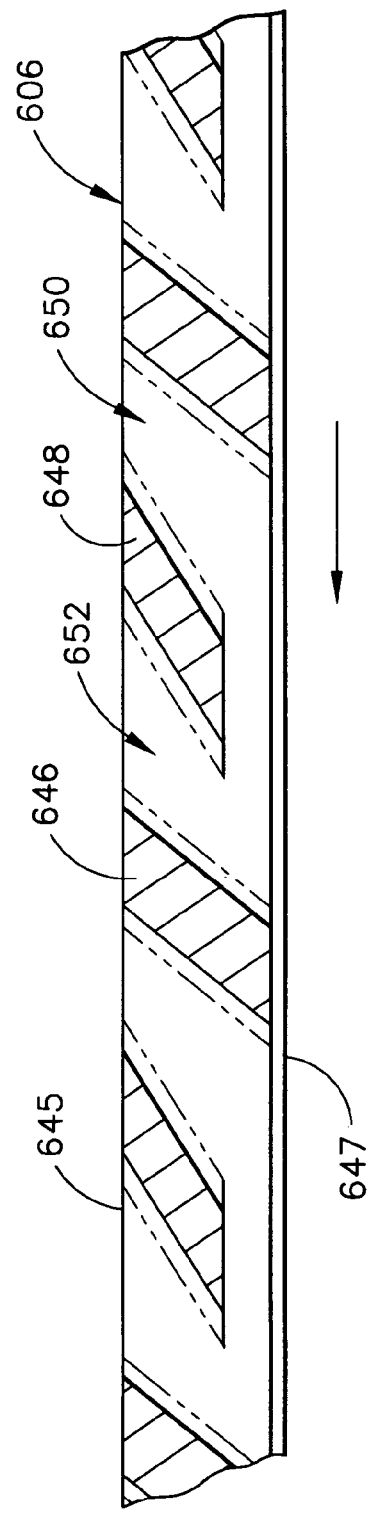

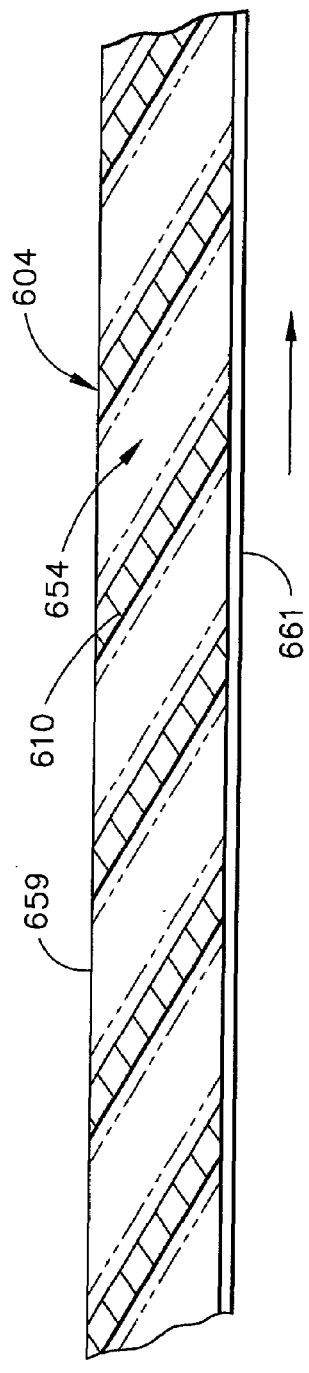
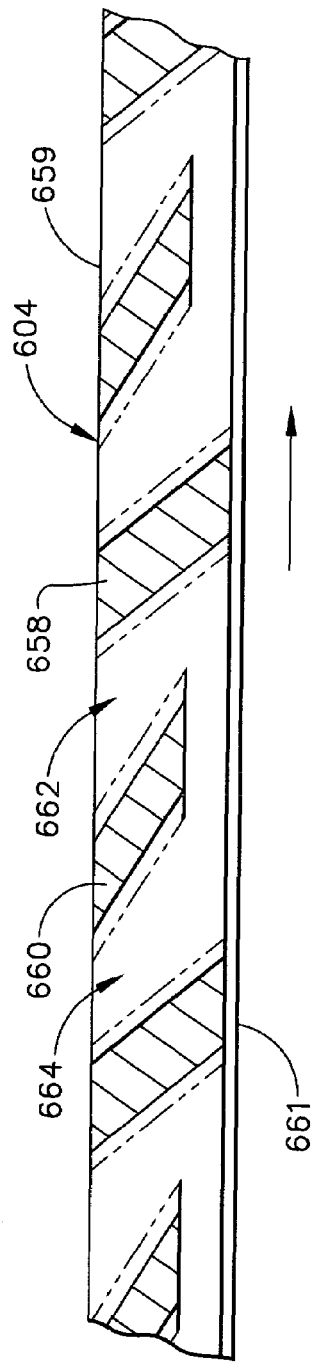
FIG. 41
FIG. 42

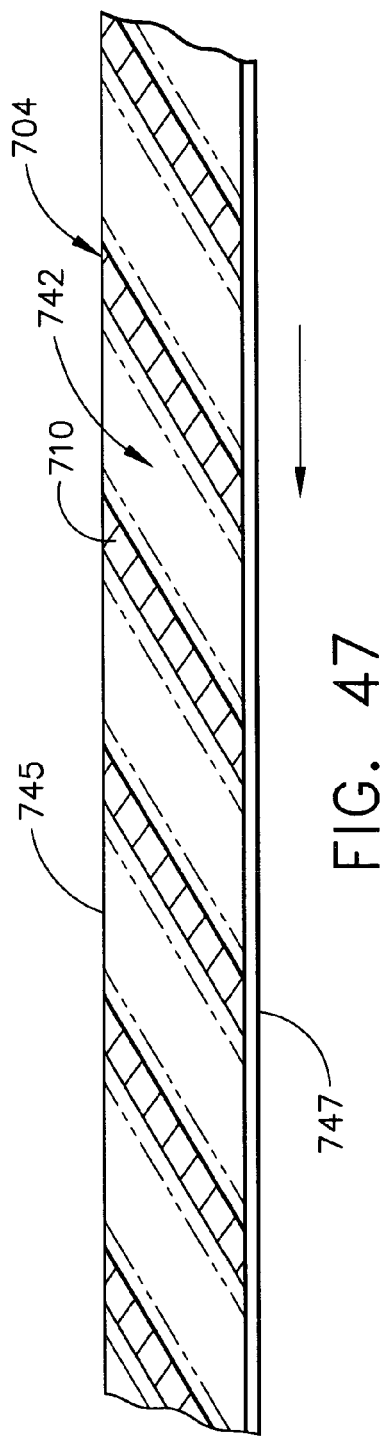
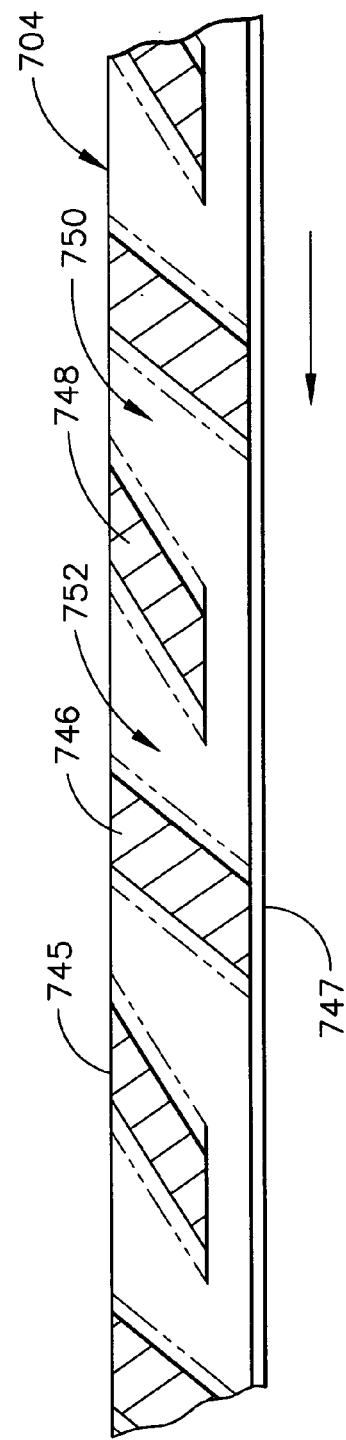
FIG. 47
FIG. 48

MIXER ASSEMBLY FOR COMBUSTOR OF A GAS TURBINE ENGINE HAVING A PLURALITY OF COUNTER-ROTATING SWIRLERS

BACKGROUND OF THE INVENTION

The present invention relates to a staged combustion system in which the production of undesirable combustion product components is minimized over the engine operating regime and, more particularly, to a swirler arrangement for the main mixer of such system which enhances mixing of fuel and air.

Air pollution concerns worldwide have led to stricter emissions standards both domestically and internationally. Aircraft are governed by both Environmental Protection Agency (EPA) and International Civil Aviation Organization (ICAO) standards. These standards regulate the emission of oxides of nitrogen (NOx), unburned hydrocarbons (HC), and carbon monoxide (CO) from aircraft in the vicinity of airports, where they contribute to urban photochemical smog problems. Such standards are driving the design of gas turbine engine combustors, which also must be able to accommodate the desire for efficient, low cost operation and reduced fuel consumption. In addition, the engine output must be maintained or even increased.

It will be appreciated that engine emissions generally fall into two classes: those formed because of high flame temperatures (NOx) and those formed because of low flame temperatures which do not allow the fuel-air reaction to proceed to completion (HC and CO). Balancing the operation of a combustor to allow efficient thermal operation of the engine, while simultaneously minimizing the production of undesirable combustion products, is difficult to achieve. In that regard, operating at low combustion temperatures to lower the emissions of NOx can also result in incomplete or partially incomplete combustion, which can lead to the production of excessive amounts of HC and CO, as well as lower power output and lower thermal efficiency. High combustion temperature, on the other hand, improves thermal efficiency and lowers the amount of HC and CO, but oftentimes results in a higher output of NOx.

One way of minimizing the emission of desirable gas turbine engine combustion products has been through staged combustion. In such an arrangement, the combustor is provided with a first stage burner for low speed and low power conditions so the character of the combustion products is more closely controlled. A combination of first and second stage burners is provided for higher power output conditions, which attempts to maintain the combustion products within the emissions limits.

Another way that has been proposed to minimize the production of such undesirable combustion product components is to provide for more effective intermixing of the injected fuel and the combustion air. In this way, burning occurs uniformly over the entire mixture and reduces the level of HC and CO that results from incomplete combustion. While numerous mixer designs have been proposed over the years to improve the mixing of the fuel and air, improvements in the levels of undesirable NOx formed under high power conditions (i.e., when the flame temperatures are high) is still desired.

One mixer design that has been utilized is known as a twin annular premixing swirler (TAPS), which is disclosed in the following U.S. Pat. Nos. 6,354,072; 6,363,726; 6,367,262; 6,381,964; 6,389,815; 6,418,726; 6,453,660; 6,484,489; and, 6,865,889. Published U.S. patent application Ser. No. 2002/0178732 also depicts certain embodiments of the TAPS mixer. It will be understood that the TAPS mixer assembly includes a pilot mixer which is supplied with fuel during the entire engine operating cycle and a main mixer which is supplied with fuel only during increased power conditions of the engine operating cycle. Because improvements in NOx emissions during high power conditions are of current primary concern, modification of the main mixer in the assembly is needed to maximize fuel-air mixing therein.

As shown in the '964 and '815 patents, the swirler assembly includes either one or two radial swirlers. The '732 patent application, as well as U.S. Pat. No. 6,418,726, discloses a swirler assembly including an axial swirler and at least one conical swirler (oriented at an acute angle to the centerline axis). The '732 patent application discloses a swirler assembly including an axial swirler and at least one cyclonic swirler (oriented radially to a centerline axis).

Accordingly, there is a desire for a gas turbine engine combustor in which the production of undesirable combustion product components in minimized over a wide range of engine operating conditions. More specifically, a mixer assembly for such gas turbine engine combustor is desired which provides increased mixing of fuel and air so as to create a more uniform mixture.

BRIEF SUMMARY OF THE INVENTION

In a first exemplary embodiment of the invention, a mixer assembly for use in a combustor of a gas turbine engine is disclosed as including a pilot mixer, a main mixer, and a fuel manifold positioned between the pilot mixer and the main mixer. The pilot mixer further includes an annular pilot housing having a hollow interior and a pilot fuel nozzle mounted in the pilot housing and adapted for dispensing droplets of fuel to the hollow interior of the pilot housing. The main mixer further includes a main housing surrounding the pilot housing and defining an annular cavity, a plurality of fuel injection ports for introducing fuel into the cavity, and a swirler arrangement including at least three swirlers positioned upstream from the fuel injection ports, wherein each swirler of the swirler arrangement is oriented substantially radially to a centerline axis through the mixer assembly and has a plurality of vanes for swirling air traveling through such swirler to mix air and the droplets of fuel dispensed by the fuel injection ports. The plurality of fuel injection ports for introducing fuel into the main mixer cavity are in flow communication with the fuel manifold.

In a second exemplary embodiment of the invention, a mixer assembly for use in a combustor of a gas turbine engine is disclosed as including a pilot mixer, a main mixer, and a fuel manifold positioned between the pilot mixer and the main mixer. The pilot mixer further includes an annular pilot housing having a hollow interior and a pilot fuel nozzle mounted in the pilot housing and adapted for dispensing droplets of fuel to the hollow interior of the pilot housing. The main mixer further includes a main housing surrounding the pilot housing and defining an annular cavity, a plurality of fuel injection ports for introducing fuel into the cavity, and a swirler arrangement including at least three swirlers positioned upstream from the fuel injection ports, wherein each swirler of the swirler arrangement is oriented at an acute angle to a centerline axis through the mixer assembly and has a plurality of vanes for swirling air traveling through such swirler to mix air and the droplets of fuel dispensed by the fuel injection ports. The plurality of fuel injection ports for introducing fuel into the main mixer cavity are in flow communication with the fuel manifold.

In accordance with a third embodiment of the present invention, a mixer assembly for use in a combustor of a gas turbine engine is disclosed as including a pilot mixer, a main mixer, and a fuel manifold positioned between the pilot mixer and the main mixer. The pilot mixer further includes an annular pilot housing having a hollow interior and a pilot fuel nozzle mounted in the pilot housing and adapted for dispensing droplets of fuel to the hollow interior of the pilot housing. The main mixer further includes a main housing surrounding the pilot housing and defining an annular cavity, a plurality of fuel injection ports for introducing fuel into the cavity, and a swirler arrangement including at least three swirlers positioned upstream from the plurality of fuel injection ports, wherein at least two swirlers of the swirler arrangement are oriented substantially parallel to a centerline axis through the mixer assembly and have a plurality of vanes for swirling air traveling through such swirlers to mix air and the droplets of fuel dispensed by the fuel injection ports. The plurality of fuel injection ports for introducing fuel into the main mixer cavity are in flow communication with the fuel manifold. The third swirler is oriented substantially radially to the centerline axis.

In accordance with a fourth embodiment of the present invention, a mixer assembly for use in a combustor of a gas turbine engine is disclosed as including a pilot mixer, a main mixer, and a fuel manifold positioned between the pilot mixer and the main mixer. The pilot mixer further includes an annular pilot housing having a hollow interior and a pilot fuel nozzle mounted in the pilot housing and adapted for dispensing droplets of fuel to the hollow interior of the pilot housing. The main mixer further includes a main housing surrounding the pilot housing and defining an annular cavity, a plurality of fuel injection ports for introducing fuel into the cavity, and a swirler arrangement including at least three swirlers positioned upstream from the plurality of fuel injection ports, wherein at least two swirlers of the swirler arrangement are oriented substantially parallel to a centerline axis through the mixer assembly and have a plurality of vanes for swirling air traveling through such swirlers to mix air and the droplets of fuel dispensed by the fuel injection ports. The plurality of fuel injection ports for introducing fuel into the main mixer cavity are in flow communication with the fuel manifold. The third swirler is oriented at an acute angle to the centerline axis.

In accordance with a fifth embodiment of the present invention, a mixer assembly for use in a combustor of a gas turbine engine is disclosed as including a pilot mixer, a main mixer, and a fuel manifold positioned between the pilot mixer and the main mixer. The pilot mixer further includes an annular pilot housing having a hollow interior and a pilot fuel nozzle mounted in the pilot housing and adapted for dispensing droplets of fuel to the hollow interior of the pilot housing. The main mixer further includes a main housing surrounding the pilot housing and defining an annular cavity, a plurality of fuel injection ports for introducing fuel into the cavity, and a swirler arrangement including at least four swirlers positioned upstream from the plurality of fuel injection ports, wherein each swirler of the swirler arrangement has a plurality of vanes for swirling air traveling through the respective swirler to mix air and the droplets of fuel dispensed by the fuel injection ports. The plurality of fuel injection ports for introducing fuel into the main cavity are in flow communication with the fuel manifold. The swirler arrangement includes at least two swirlers oriented substantially parallel to a centerline axis through the mixer assembly and at least two swirlers oriented substantially radially with respect to the centerline axis.

In accordance with a sixth embodiment of the present invention, a mixer assembly for use in a combustor of a gas turbine engine is disclosed as including a pilot mixer, a main mixer, and a fuel manifold positioned between the pilot mixer and the main mixer. The pilot mixer further includes an annular pilot housing having a hollow interior and a pilot fuel nozzle mounted in the pilot housing and adapted for dispensing droplets of fuel to the hollow interior of the pilot housing. The main mixer further includes a main housing surrounding the pilot housing and defining an annular cavity, a plurality of fuel injection ports for introducing fuel into the cavity, and a swirler arrangement including four swirlers positioned upstream from the plurality of fuel injection ports, wherein each swirler of the swirler arrangement has a plurality of vanes for swirling air traveling through the respective swirler to mix air and the droplets of fuel dispensed by the fuel injection ports. The plurality of fuel injection ports for introducing fuel into the main mixer cavity are in flow communication with the fuel manifold. The swirler arrangement includes two swirlers oriented substantially parallel to the centerline axis through the mixer assembly and two swirlers oriented at an acute angle to the centerline axis.

In accordance with a seventh embodiment of the present invention, a mixer assembly for use in a combustor of a gas turbine engine is disclosed as including a pilot mixer, a main mixer, and a fuel manifold positioned between the pilot mixer and the main mixer. The pilot mixer further includes an annular pilot housing having a hollow interior and a pilot fuel nozzle mounted in the pilot housing and adapted for dispensing droplets of fuel to the hollow interior of the pilot housing. The main mixer further includes a main housing surrounding the pilot housing and defining an annular cavity, a plurality of fuel injection ports for introducing fuel into the cavity, and a swirler arrangement including at least three swirlers positioned upstream from the plurality of fuel injection ports, wherein each swirler of the swirler arrangement has a plurality of vanes for swirling air traveling through the respective swirler to mix air and the droplets of fuel dispensed by the fuel injection ports. The plurality of fuel injection ports for introducing fuel into the main mixer cavity are in flow communication with the fuel manifold. The swirler arrangement further includes a first swirler oriented substantially parallel to a centerline axis through the mixer assembly, a second swirler oriented at an acute angle to the centerline axis and a third swirler oriented substantially radially to the centerline axis.

In accordance with an eighth embodiment of the present invention, a method of operating a gas turbine engine combustor with reduced emissions, wherein said combustor includes a pilot mixer and a main mixer, is disclosed as including the following steps: providing a swirler arrangement in flow communication with an annular cavity of the main mixer, wherein an intense mixing region is created adjacent a plurality of fuel injection ports to the annular cavity; causing air supplied to the swirler arrangement to swirl in a counter-rotating manner in the annular cavity; allocating air supplied to the swirler arrangement among each swirler thereof in a predetermined amount; and, providing fuel from the fuel injection ports into the intense mixing region.

BRIEF DESCRIPTION OF THE DRAWINGS

FIG. 16 is a view of the swirler arrangement depicted in FIGS. 13 and 14 taken along line 16-16 in FIG. 14, where the vanes in the outer axial swirler are arranged to define substantially uniform passages therebetween;

FIG. 17 is a view of the outer axial swirler similar to that depicted in FIG. 16, where the vanes are arranged to define shaped passages therebetween;

FIG. 18 is a view of the swirler arrangement depicted in FIGS. 13 and 14 taken along line 18-18 in FIG. 14, where the vanes in the inner axial swirler are arranged to define substantially uniform passages therebetween;

FIG. 19 is a view of the inner axial swirler similar to that depicted in FIG. 18, where the vanes are arranged to define shaped passages therebetween;

FIG. 26 is a view of the swirler arrangement depicted in FIGS. 20 and 21 taken along line 26-26 in FIG. 21, where the vanes in the inner axial swirler are arranged to define substantially uniform passages therebetween;

FIG. 27 is a view of the inner axial swirler similar to that depicted in FIG. 26, where the vanes are arranged to define shaped passages therebetween;

FIG. 31 is a view of the swirler arrangement depicted in FIGS. 28 and 29 taken along line 31-31 in FIG. 29, where the vanes in the outer axial swirler are arranged to define substantially uniform passages therebetween;

FIG. 32 is a view of the outer axial swirler similar to that depicted in FIG. 31, where the vanes are arranged to define shaped passages therebetween;

FIG. 39 is a view of the swirler arrangement depicted in FIGS. 35 and 36 taken along line 39-39 in FIG. 36, where the vanes in the outer axial swirler are arranged to define substantially uniform passages therebetween;

FIG. 40 is a view of the outer axial swirler similar to that depicted in FIG. 39, where the vanes are arranged to define shaped passages therebetween;

FIG. 41 is a view of the swirler arrangement depicted in FIGS. 35 and 36 taken along line 41-41 in FIG. 36, where the vanes in the inner axial swirler are arranged to define substantially uniform passages therebetween;

FIG. 42 is a view of the inner axial swirler similar to that depicted in FIG. 41, where the vanes are arranged to define shaped passages therebetween;

FIG. 47 is a view of the swirler arrangement depicted in FIGS. 43 and 44 taken along line 47-47 in FIG. 44, where the vanes in the axial swirler are arranged to define substantially uniform passages therebetween; and, FIG. 48 is a view of the axial swirler similar to that depicted in FIG. 47, where the vanes are arranged to define shaped passages therebetween.

DETAILED DESCRIPTION OF THE INVENTION

Figure 1:
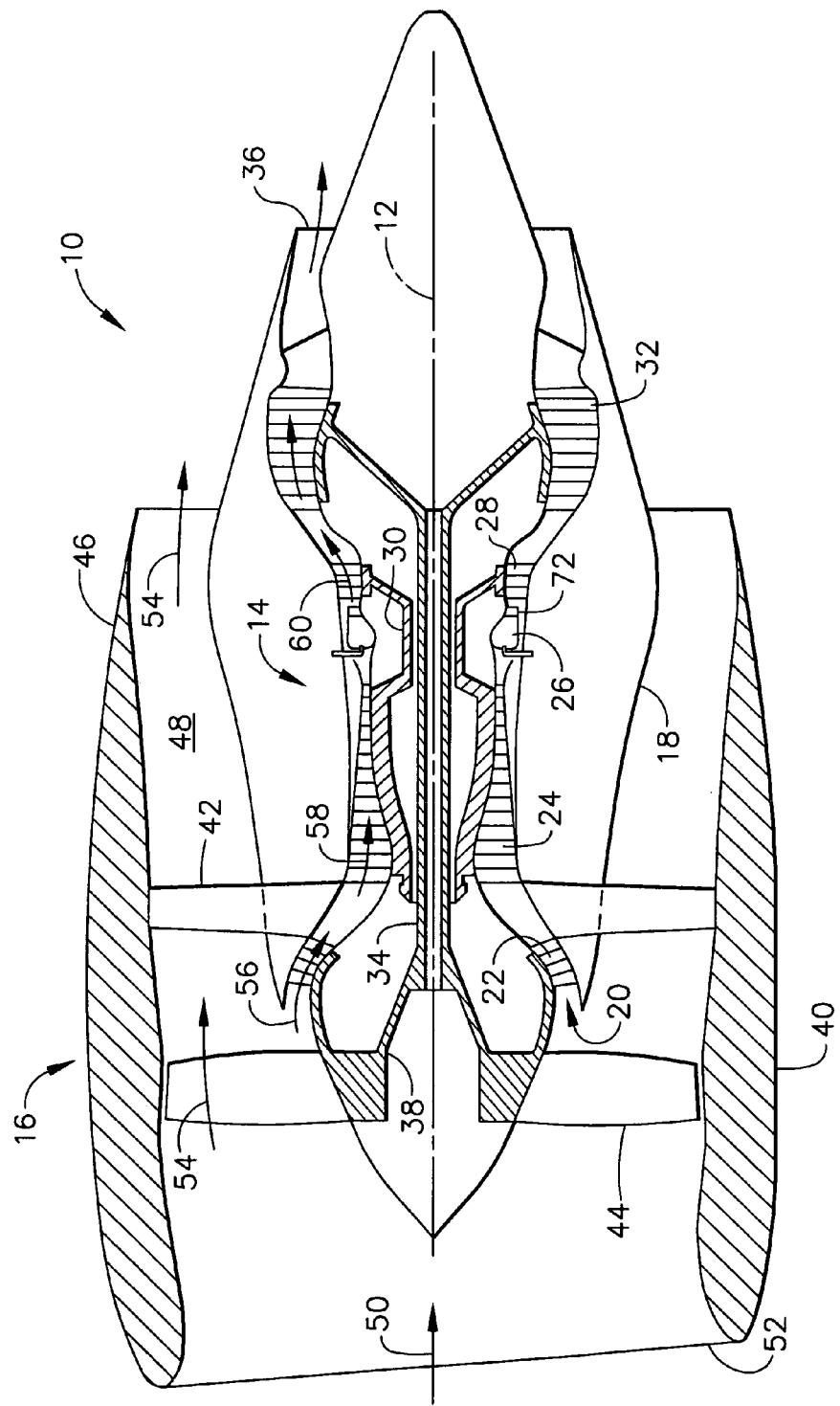
FIG. 1 is a diagrammatic view of a high bypass turbofan gas turbine engine.

Referring now to the drawings in detail, wherein identical numerals indicate the same elements throughout the figures, FIG. 1 depicts in diagrammatic form an exemplary gas turbine engine 10 (high bypass type) utilized with aircraft having a longitudinal or axial centerline axis 12 therethrough for reference purposes. Engine 10 preferably includes a core gas turbine engine generally identified by numeral 14 and a fan section 16 positioned upstream thereof. Core engine 14 typically includes a generally tubular outer casing 18 that defines an annular inlet 20. Outer casing 18 further encloses and supports a booster compressor 22 for raising the pressure of the air that enters core engine 14 to a first pressure level. A high pressure, multi-stage, axial-flow compressor 24 receives pressurized air from booster 22 and further increases the pressure of the air. The pressurized air flows to a combustor 26, where fuel is injected into the pressurized air stream to raise the temperature and energy level of the pressurized air. The high energy combustion products flow from combustor 26 to a first (high pressure) turbine 28 for driving high pressure compressor 24 through a first (high pressure) drive shaft 30, and then to a second (low pressure) turbine 32 for driving booster compressor 22 and fan section 16 through a second (low pressure) drive shaft 34 that is coaxial with first drive shaft 30. After driving each of turbines 28 and 32, the combustion products leave core engine 14 through an exhaust nozzle 36 to provide propulsive jet thrust.

Fan section 16 includes a rotatable, axial-flow fan rotor 38 that is surrounded by an annular fan casing 40. It will be appreciated that fan casing 40 is supported from core engine 14 by a plurality of substantially radially-extending, circumferentially-spaced outlet guide vanes 42. In this way, fan casing 40 encloses fan rotor 38 and fan rotor blades 44. Downstream section 46 of fan casing 40 extends over an outer portion of core engine 14 to define a secondary, or bypass, airflow conduit 48 that provides additional propulsive jet thrust.

From a flow standpoint, it will be appreciated that an initial air flow, represented by arrow 50, enters gas turbine engine 10 through an inlet 52 to fan casing 40. Air flow 50 passes through fan blades 44 and splits into a first compressed air flow (represented by arrow 54) that moves through conduit 48 and a second compressed air flow (represented by arrow 56) which enters booster compressor 22. The pressure of second compressed air flow 56 is increased and enters high pressure compressor 24, as represented by arrow 58. After mixing with fuel and being combusted in combustor 26, combustion products 60 exit combustor 26 and flow through first turbine 28. Combustion products 60 then flow through second turbine 32 and exit exhaust nozzle 36 to provide thrust for gas turbine engine 10.

Figure 2:
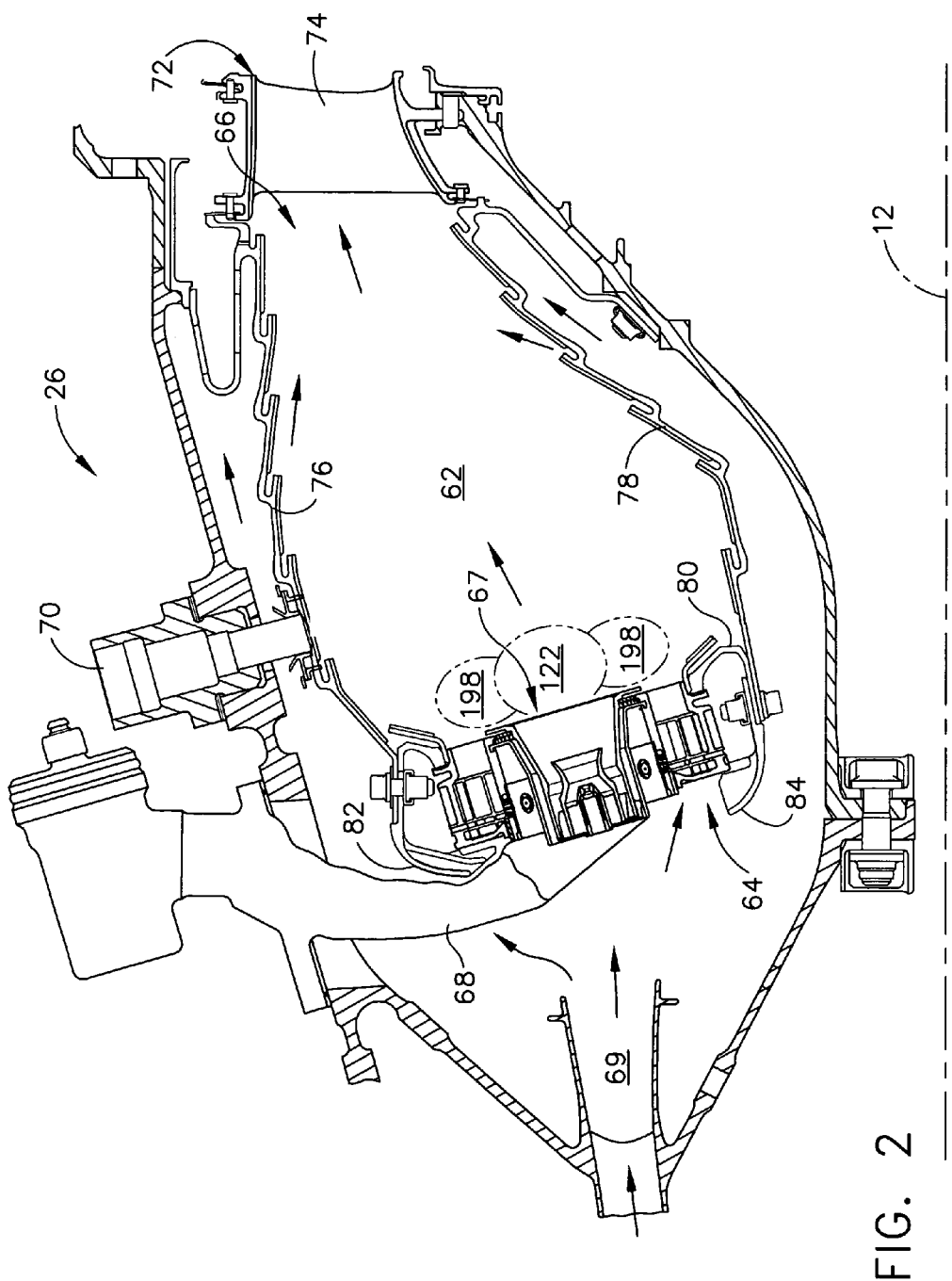
FIG. 2 is a longitudinal, cross-sectional view of a gas turbine engine combustor having a staged arrangement.

As best seen in FIG. 2, combustor 26 includes an annular combustion chamber 62 that is coaxial with longitudinal axis 12, as well as an inlet 64 and an outlet 66. As noted above, combustor 26 receives an annular stream of pressurized air from a high pressure compressor discharge outlet 69. A portion of this compressor discharge air flows into a mixing assembly 67, where fuel is also injected from a fuel nozzle 68 to mix with the air and form a fuel-air mixture that is provided to combustion chamber 62 for combustion. Ignition of the fuel-air mixture is accomplished by a suitable igniter 70, and the resulting combustion gases 60 flow in an axial direction toward and into an annular, first stage turbine nozzle 72. Nozzle 72 is defined by an annular flow channel that includes a plurality of radially-extending, circularly-spaced nozzle vanes 74 that turn the gases so that they flow angularly and impinge upon the first stage turbine blades of first turbine 28. As shown in FIG. 1, first turbine 28 preferably rotates high pressure compressor 24 via first drive shaft 30. Low pressure turbine 32 preferably drives booster compressor 24 and fan rotor 38 via second drive shaft 34.

Combustion chamber 62 is housed within engine outer casing 18 and is defined by an annular combustor outer lineer 76 and a radially-inwardly positioned annular combustor inner liner 78. The arrows in FIG. 2 show the directions in which compressor discharge air flows within combustor 26. As shown, part of the air flows over the outermost surface of outer liner 76, part flows into combustion chamber 62, and part flows over the innermost surface of inner liner 78.

Contrary to previous designs, it is preferred that outer and inner liners 76 and 78, respectively, not be provided with a plurality of dilution openings to allow additional air to enter combustion chamber 62 for completion of the combustion process before the combustion products enter turbine nozzle 72. This is in accordance with a patent application entitled "High Pressure Gas Turbine Engine having Reduced Emissions," filed concurrently herewith and hereby incorporated by reference, which is also owned by the assignee of the present invention. It will be understood, however, that outer liner 76 and inner liner 78 preferably include a plurality of smaller, circularly-spaced cooling air apertures (not shown) for allowing some of the air that flows along the outermost surfaces thereof to flow into the interior of combustion chamber 62. Those inwardly-directed air flows pass along the inner surfaces of outer and inner liners 76 and 78 that face the interior of combustion chamber 62 so that a film of cooling air is provided therealong.

It will be understood that a plurality of axially-extending mixing assemblies 67 are disposed in a circular array at the upstream end of combustor 26 and extend into inlet 64 of annular combustion chamber 62. It will be seen that an annular dome plate 80 extends inwardly and forwardly to define an upstream end of combustion chamber 62 and has a plurality of circumferentially spaced openings formed therein for receiving mixing assemblies 67. For their part, upstream portions of each of inner and outer liners 76 and 78, respectively, are spaced from each other in a radial direction and define an outer cowl 82 and an inner cowl 84. The spacing between the forwardmost ends of outer and inner cowls 82 and 84 defines combustion chamber inlet 64 to provide an opening to allow compressor discharge air to enter combustion chamber 62.

Figure 3:
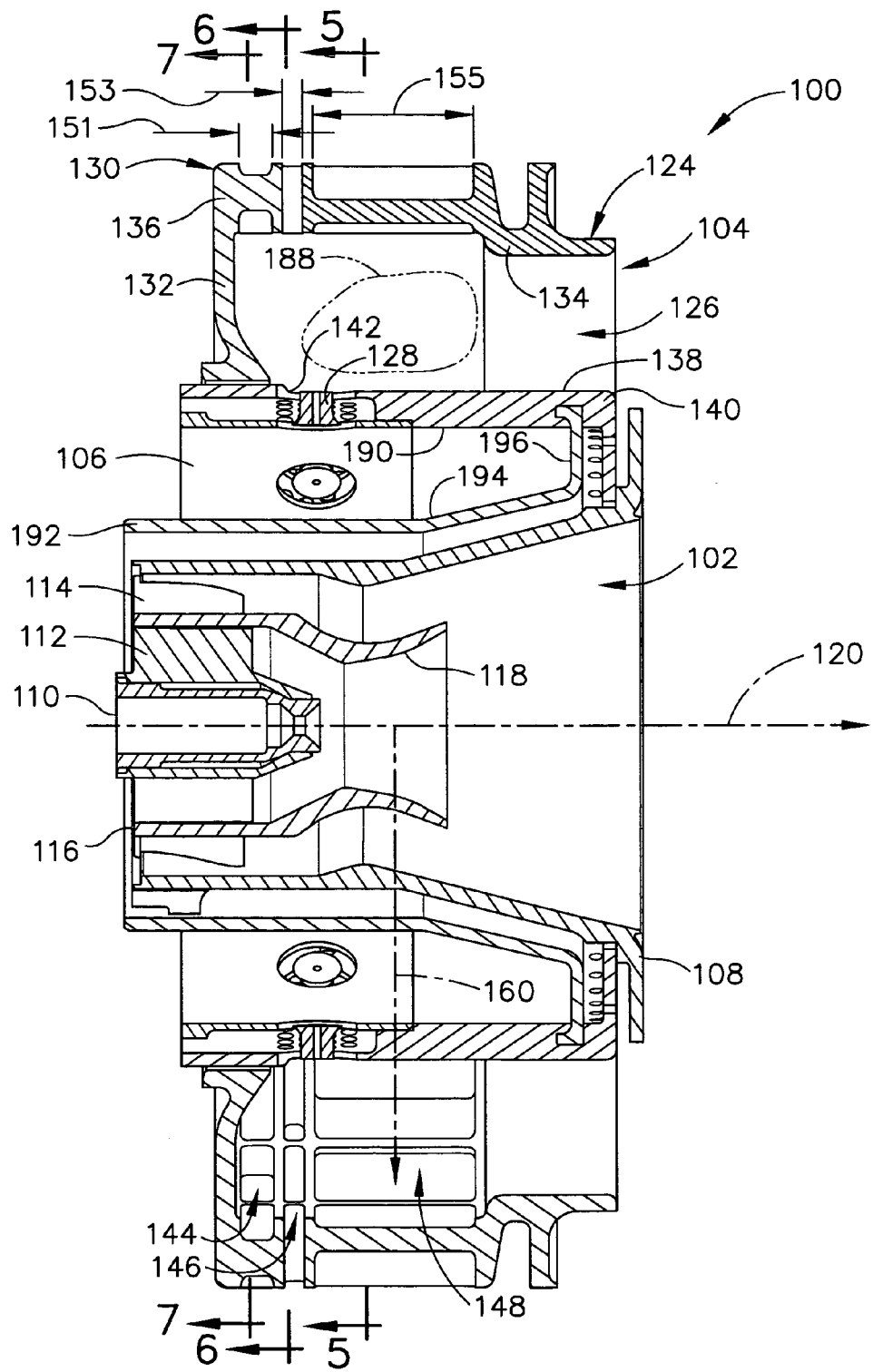
FIG. 3 is an enlarged, cross-sectional view of a first embodiment for the mixer assembly of the present invention, where the main mixer has a swirler arrangement including three swirlers oriented substantially radially to a centerline axis through the main mixer.

A mixing assembly 100 in accordance with one embodiment of the present invention is shown in FIG. 3. Mixing assembly 100 preferably includes a pilot mixer 102, a main mixer 104, and a fuel manifold 106 positioned therebetween. More specifically, it will be seen that pilot mixer 102 preferably includes an annular pilot housing 108 having a hollow interior, as well as a pilot fuel nozzle 110 mounted in housing 108 and adapted for dispensing droplets of fuel to the hollow interior of pilot housing 108. Further, pilot mixer preferably includes a first swirler 112 located at a radially inner position adjacent pilot fuel nozzle 110, a second swirler 114 located at a radially outer position from first swirler 112, and a splitter 116 positioned therebetween. Splitter 116 extends downstream of pilot fuel nozzle 110 to form a venturi 118 at a downstream portion. It will be understood that first and second pilot swirlers 112 and 114 are generally oriented parallel to a centerline axis 120 through mixing assembly 100 and include a plurality of vanes for swirling air traveling therethrough. Fuel and air are provided to pilot mixer 102 at all times during the engine operating cycle so that a primary combustion zone 122 is produced within a center portion of combustion chamber 62 (see FIG. 2).

Main mixer 104 further includes an annular main housing 124 radially surrounding pilot housing 108 and defining an annular cavity 126, a plurality of fuel injection ports 128 which introduce fuel into annular cavity 126, and a swirler arrangement identified generally by numeral 130. More specifically, annular cavity 126 is preferably defined by an upstream wall 132 and an outer radial wall 134 of a swirler housing 136, and by an inner radial wall 138 of a centerbody outer shell 140. It will be seen that inner radial wall 138 preferably also includes a ramp portion 142 located at a forward position along annular cavity 126. It will be appreciated that annular cavity 126 generally transitions from an upstream end 127 having a first radial height 129 to a downstream end 131 having a second radial height 133. The difference between first radial height 129 and second radial height 133 of annular cavity 126 is due primarily to outer radial wall 134 of swirler housing 136 incorporating at least one swirler therein at upstream end 127. In addition, ramp portion 142 of inner radial wall 138 is preferably located within an axial length 145 of any radial swirlers.

Figure 4:
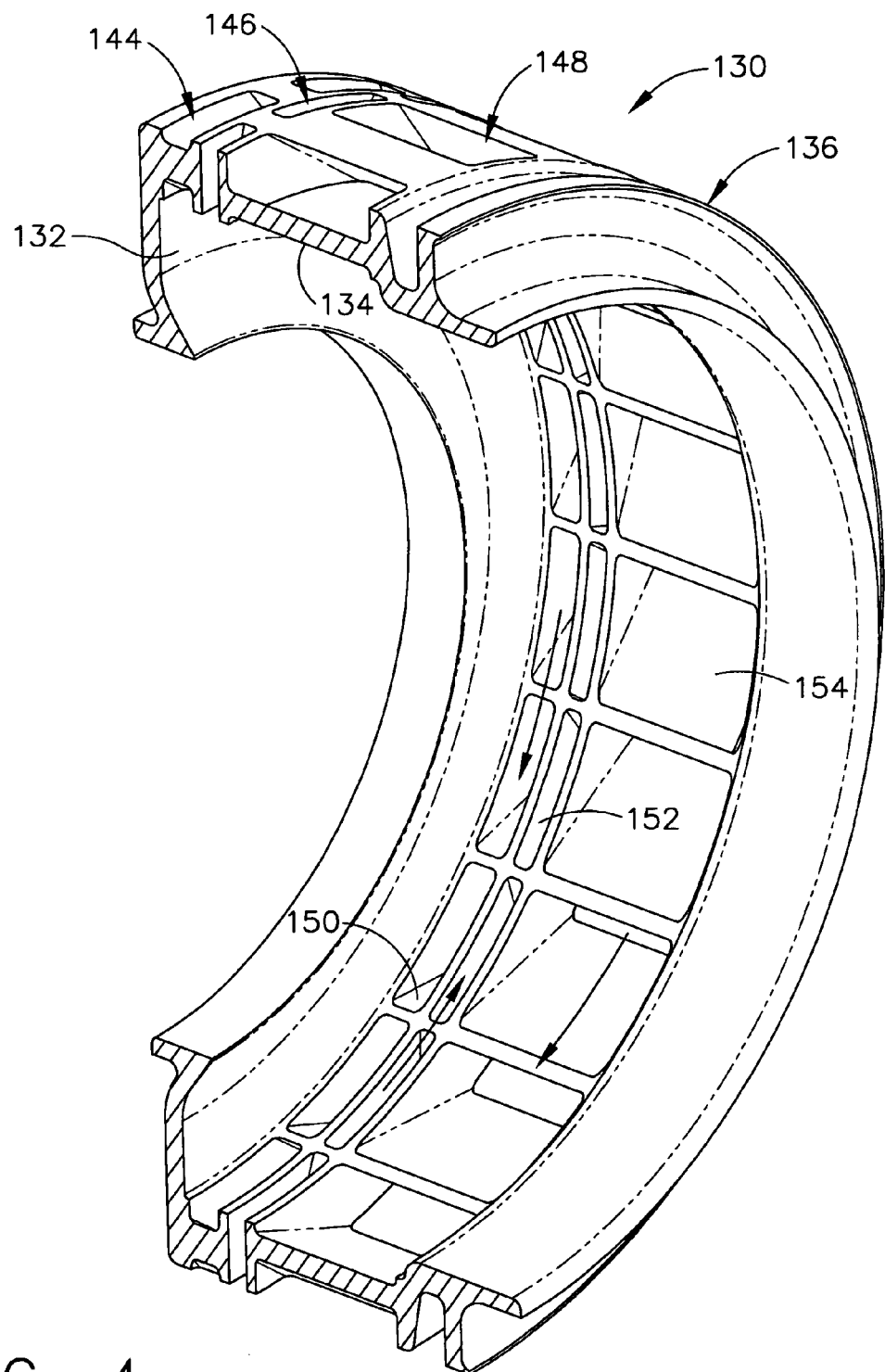
FIG. 4 is a partial perspective view of the swirler arrangement depicted in FIG. 3.

It will be seen in FIGS. 3 and 4 that swirler arrangement 130 preferably includes first, second and third swirlers 144, 146 and 148, respectively, positioned upstream from fuel injection ports 128. Each swirler is preferably oriented substantially radially to centerline axis 120 through mixer assembly 100, with first swirler 144 being positioned adjacent forward wall 132, second swirler 146 being positioned immediately downstream of first swirler 144, and third swirler 148 being positioned immediately downstream of second swirler 146. In addition, each swirler has a plurality of vanes identified by numerals 150, 152 and 154 for first swirler 144, second swirler 146, and third swirler 148, respectively) for swirling air traveling through such swirler to mix air and droplets of fuel dispensed by fuel injection ports 128.

Figure 5:
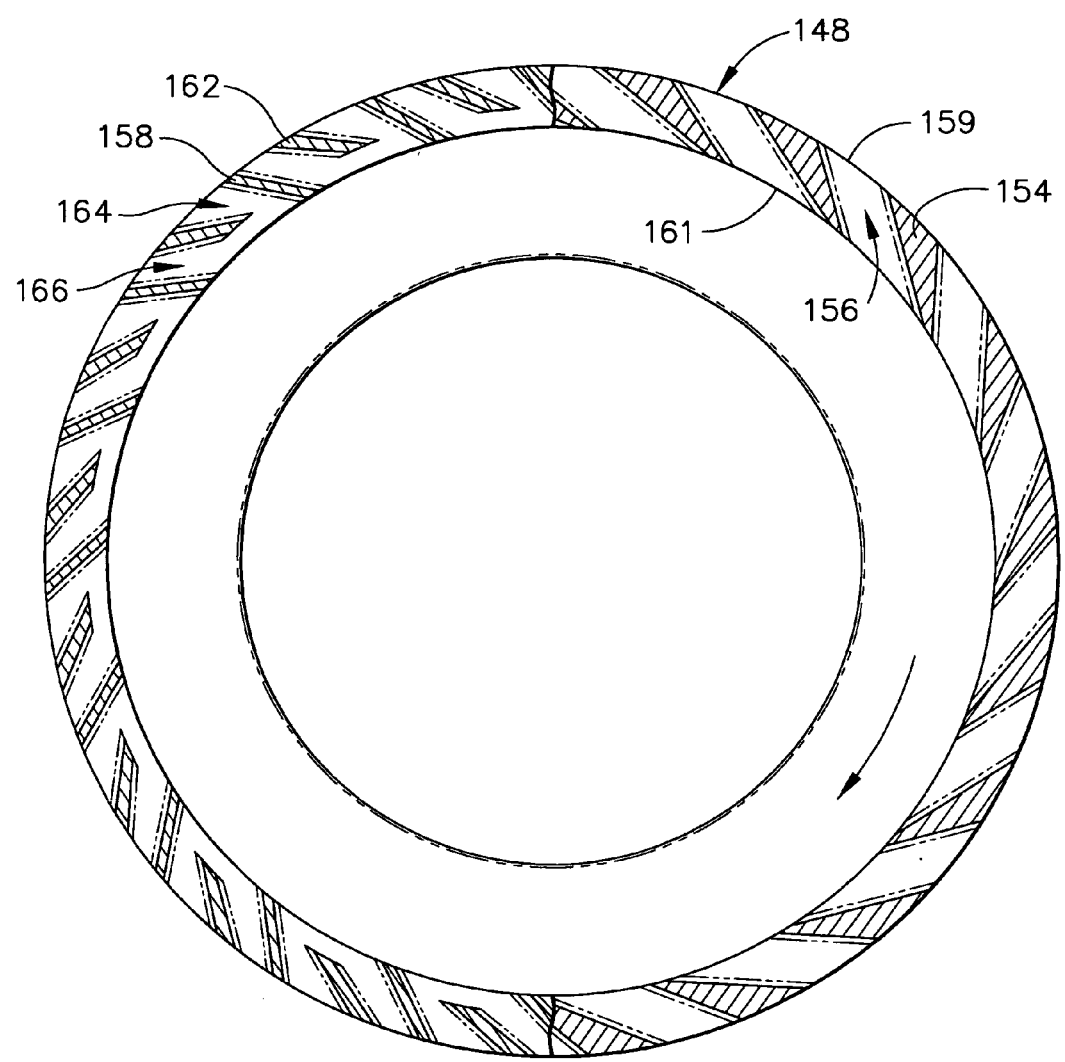
FIG. 5 is an aft view of the swirler arrangement depicted in FIGS. 3 and 4 taken along line 5-5 in FIG. 3, where the vanes in a downstream swirler are arranged to define substantially uniform passages therebetween on a right portion thereof and the vanes are arranged to define shaped passages therebetween on a left portion thereof.

It will be noted that vanes 154 of third swirler 148 may be of substantially uniform orientation and spacing to provide substantially uniform passages 156 therebetween (see right portion of FIG. 5). Vanes 154 of third swirler 148 are preferably oriented at an angle of approximately 20-70° C. with respect to a centerline axis 160 through swirler arrangement 130 and preferably have a length 155 which is measured across opposite ends (i.e., in the axial direction relative to centerline axis 120 of mixing assembly 100).

Alternatively, third swirler 148 may have a plurality of first vanes 158 oriented at a first angle (approximately 20-70°) with respect to a centerline axis 160 through swirler arrangement 130 and a plurality of second vanes 162 oriented at a second angle (approximately 20-70°) with respect to centerline axis 160 which alternate with first vanes 158 (see left portion of FIG. 5). It will be noted that first vanes 158 preferably extend from an upstream end 159 of third swirler 148 to a downstream end 161 thereof in the same manner as vanes 154. Second vanes 162, however, preferably extend only part of the way from upstream end 159 to downstream end 161 so that the tips of first and second vanes 158 and 162 are stepped or lie on a different annulus. In this way, a first type of passage 164 having a first configuration is defined between adjacent pairs of vanes 158, 162 and a second type of passage 166 having a second configuration is defined between opposite sides of vanes 158,162. It will be seen that passages 164 and 166 are configured differently, whereby momentum changes are produced. The shaping of such passages 164 and 166 permit greater flexibility in controlling air flow characteristics of third swirler 148 and is described in greater detail in a patent application entitled, "Swirler Arrangement For Mixer Assembly Of A Gas Turbine Engine Combustor Having Shaped Passages," which is filed concurrently herewith and owned by the assignee of the present invention.

Figure 6:
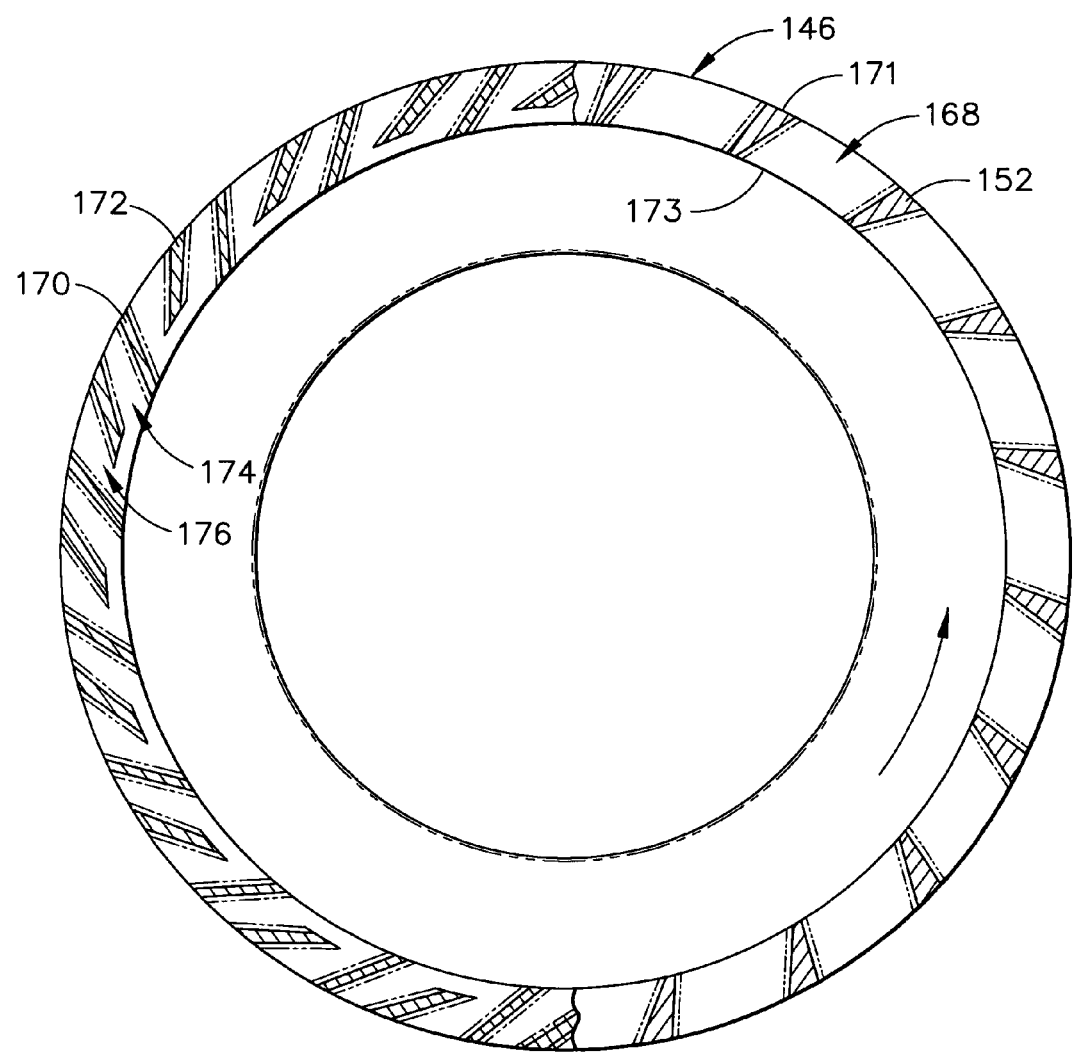
FIG. 6 is an aft view of the swirler arrangement depicted in FIGS. 3 and 4 taken along line 6-6 in FIG. 3, wherein the vanes in a middle swirler are arranged to define substantially uniform passages therebetween on a right portion thereof and the vanes are arranged to define shaped passages therebetween on a left portion thereof.

Similarly, vanes 152 of second swirler 146 may be of substantially uniform orientation and spacing to provide substantially uniform passages 168 therebetween (see right portion of FIG. 6). Vanes 152 of second swirler 146 are preferably oriented at an angle of approximately 0-60° with respect to centerline axis 160 through swirler arrangement 130 and preferably have a length 153 which is measured across opposite ends (i.e., in the axial direction relative to centerline axis 120 of mixing assembly 100).

Alternatively, second swirler 146 may have a plurality of first vanes 170 oriented at a first angle (approximately 0-60°) with respect to centerline axis 160 and a plurality of second vanes 172 oriented at a second angle (approximately 0-60°) with respect to centerline axis 160 which alternate with first vanes 170 (see left portion of FIG. 6). It will be noted that first vanes 170 preferably extend from an upstream end 171 of second swirler 146 to a downstream end 173 thereof in the same manner as vanes 152. Second vanes 172, however, preferably extend only part of the way from upstream end 171 to downstream end 173 so that the tips of first and second vanes 170 and 172 are stepped or lie on a different annulus. In this way, a first type of passage 174 is provided in second swirler 146 having a first configuration and a second type of passage 176 is provided in second swirler 146 having a second configuration.

Figure 7:
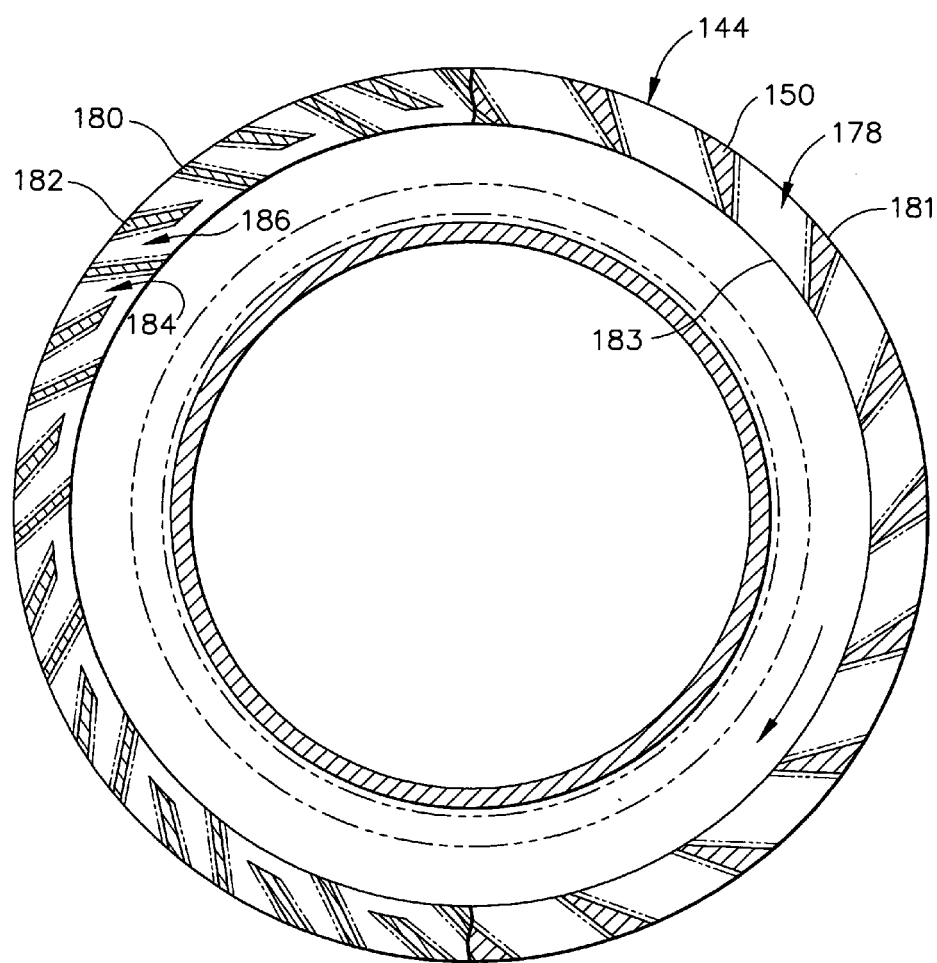
FIG. 7 is an aft view of the swirler arrangement depicted in FIGS. 3 and 4 taken along line 7-7 in FIG. 3, where the vanes in an upstream swirler are arranged to define substantially uniform passages therebetween on a right portion thereof and the vanes are arranged to define shaped passages therebetween on a left portion thereof.
Figure 8:
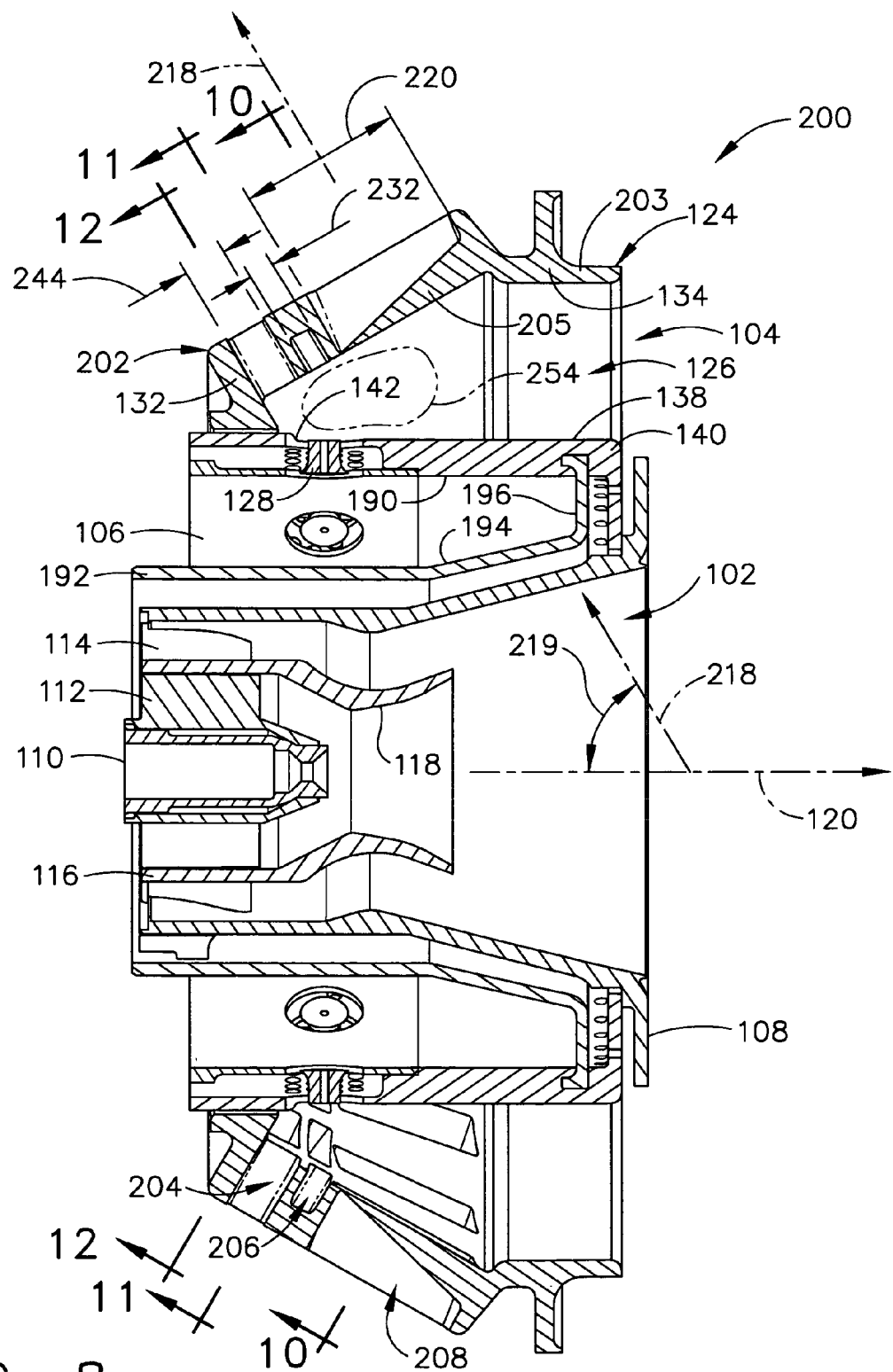
FIG. 8 is an enlarged, cross-sectional view of a second embodiment for the mixer assembly of the present invention, where the main mixer has a swirler arrangement including three swirlers oriented at an acute angle to a centerline axis through the main mixer.
Figure 9:
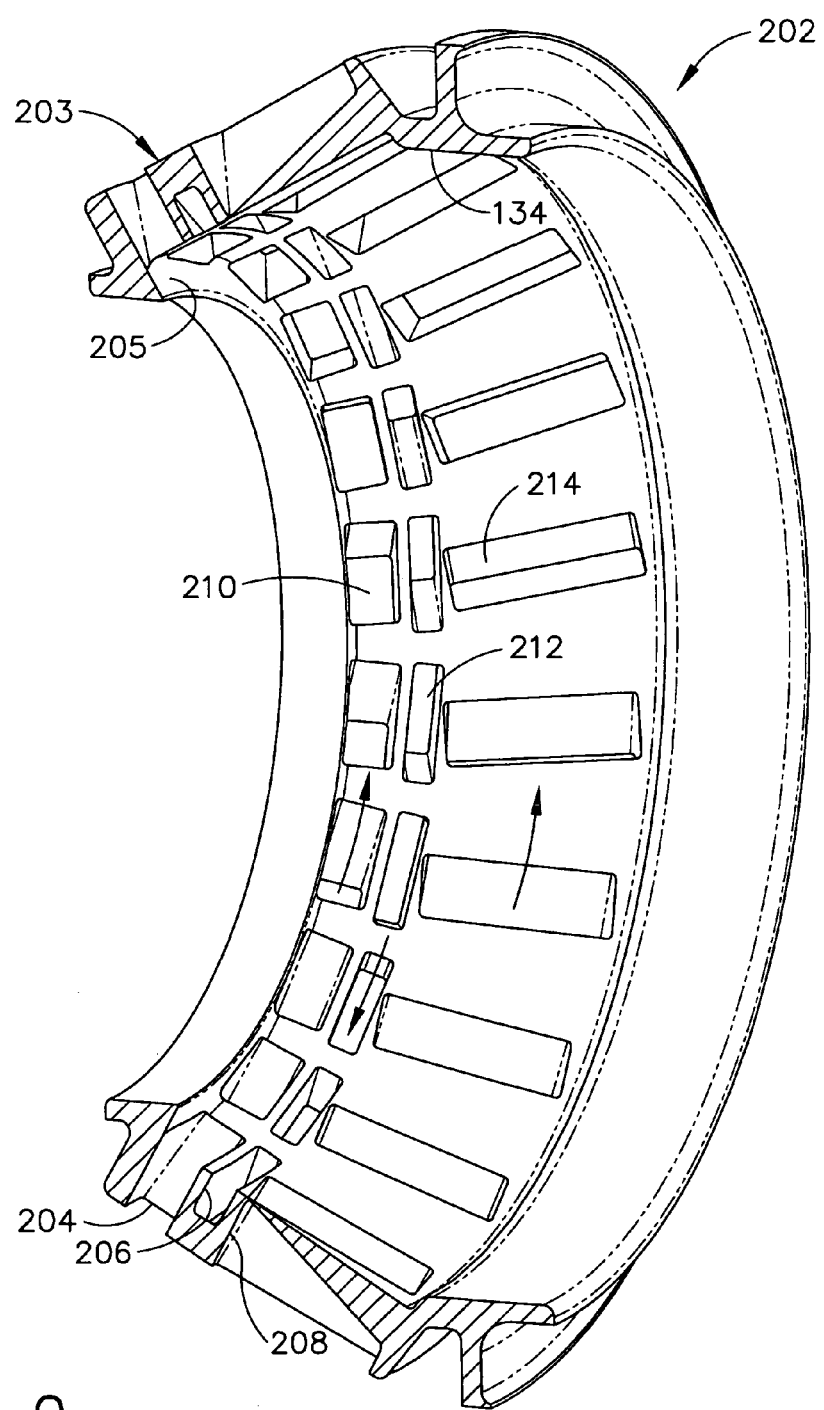
FIG. 9 is a partial perspective view of the swirler arrangement depicted in FIG. 8.

Vanes 150 of first swirler 144 may be of substantially uniform orientation and spacing to provide substantially uniform passages 178 therebetween (see right portion of FIG. 7). Vanes 150 of first swirler 144 are preferably oriented at an angle of approximately 20-70° with respect to centerline axis 160 through swirler arrangement 130 and preferably have a length 151 which is measured across opposite ends (i.e., in the axial direction relative to centerline axis 120 of mixing assembly 100).

Alternatively, first swirler 144 may have a plurality of first vanes 180 oriented at a first angle (approximately 20-70°) with respect to centerline axis 160 and a plurality of second vanes 182 oriented at a second angle (approximately 20-70°) with respect to centerline axis 160 which alternate with first vanes 180 (see left portion of FIG. 6). It will be noted that first vanes 180 preferably extend from an upstream end 181 of first swirler 144 to a downstream end 183 thereof in the same manner as vanes 150. Second vanes 182, however, preferably extend only part of the way from upstream end 181 to downstream end 183 so that the tips of first and second vanes 180 and 182 are stepped or lie on a different annulus. In this way, a first type of passage 184 is provided in first swirler 144 having a first configuration and a second type of passage 186 is provided in first swirler 144 having a second configuration.

It will be understood that air flowing through first and third swirlers 144 and 148 will be swirled in a first direction and air flowing through second swirler 146 will preferably be swirled in a direction opposite the first direction. In this way, an intense mixing region 188 of air and fuel is created within annular cavity 126 having an enhanced total kinetic energy. By properly configuring swirlers 144, 146 and 148, intense mixing region 188 is substantially centered within annular cavity 126, positioned axially adjacent fuel injection ports 128 and has a designated area. Vanes 150, 152 and 154 of first, second and third swirlers 144, 146 and 148 may be substantially aligned circumferentially with respect to centerline axis 160 through swirler arrangement 130 or not in any combination to further tailor the characteristics of air flowing therethrough as desired. Likewise, the configuration of the vanes in swirlers 144, 146, and 148 may be altered to vary the swirl direction of air flowing therethrough and not be limited to the exemplary swirl directions indicated hereinabove.

It will be seen that length 155 of third swirler vanes 154 is preferably greater than length 153 of second swirler vanes 152. Length 151 of first swirler vanes 150 is preferably greater than length 153 of second swirler vanes 152 and less than length 155 of third swirler vanes 154. Accordingly, a relatively greater amount of air flows through third swirler 148 than through first and second swirlers 144 and 146 due to the greater passage area therefor. More air flows through first swirler 144 than through second swirler 146 for the same reason. The relative lengths of swirlers 144, 146 and 148 may be varied as desired to alter the distribution of air therethrough, so the sizes depicted are only illustrative.

Fuel manifold 106, as stated above, is located between pilot mixer 102 and main mixer 104 and is in flow communication with a fuel supply. In particular, outer radial wall of centerbody outer shell 140 forms an outer radial surface 190 of fuel manifold 106, and a shroud member 192 is configured to provide an inner radial surface 194 and an aft surface 196. Fuel injection ports 128 are in flow communication with fuel manifold 106, preferably spaced circumferentially around centerbody outer shell 140, and configured as disclosed in a patent application entitled "Mixer Assembly For Combustor Of A Gas Turbine Engine Having A Main Mixer With Improved Fuel Penetration," filed concurrently herewith and also owned by the assignee of the present invention.

When fuel is provided to main mixer 104, an annular, secondary combustion zone 198 is provided in combustion chamber 62 that is radially outwardly spaced from and concentrically surrounds primary combustion zone 122. Depending upon the size of gas turbine engine 10, as many as twenty or so mixer assemblies 100 can be disposed in a circular array at inlet 64 of combustion chamber 62.

In a second embodiment of the mixing assembly, identified by numeral 200, an alternative swirler arrangement 202 having a swirler housing 203 is utilized and shown in FIGS. 8-12. Since each swirler is preferably oriented at an acute angle (approximately 0-60°) to centerline axis 120 through mixer assembly 200, it will be seen that swirler housing 203 includes a conical wall 205 oriented at an acute angle which forms part of annular cavity 126 of main mixer 104. As further seen therein, swirler arrangement 202 preferably includes first, second and third swirlers 204, 206 and 208, respectively, positioned upstream from fuel injection ports 128. First swirler 204 is positioned adjacent forward wall 132, second swirler 206 is positioned immediately downstream of first swirler 204, and third swirler 208 is positioned immediately downstream of second swirler 206. In addition, each swirler has a plurality of vanes (identified by numerals 210, 212 and 214 for first swirler 204, second swirler 206, and third swirler 208, respectively) for swirling air traveling through such swirler to mix air and droplets of fuel dispensed by fuel injection ports 128.

Figure 10:
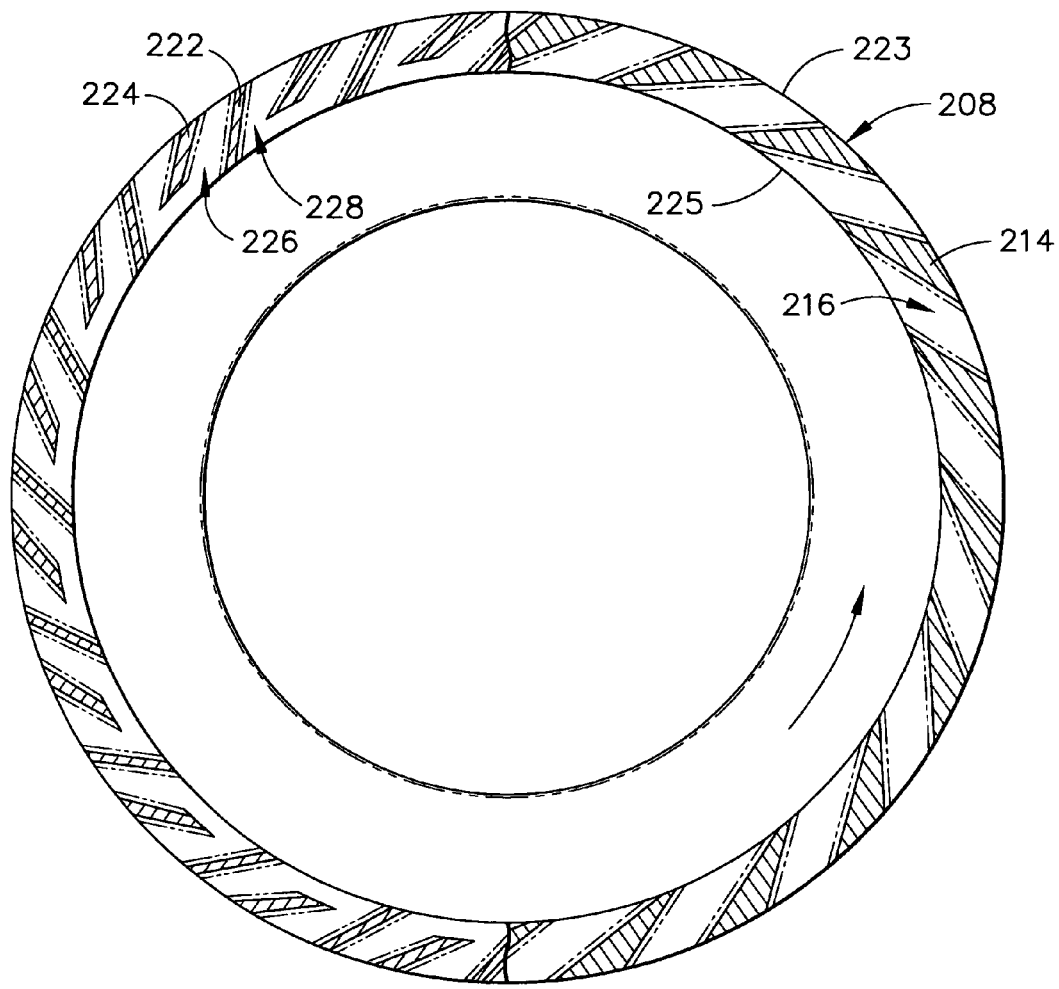
FIG. 10 is an aft view of the swirler arrangement depicted in FIGS. 8 and 9 taken along line 10-10 in FIG. 8, where the vanes in a downstream swirler are arranged to define substantially uniform passages therebetween on a right portion thereof and the vanes are arranged to define shaped passages therebetween on a left portion thereof.

It will be noted that vanes 214 of third swirler 208 may be of substantially uniform orientation and spacing to provide substantially uniform passages 216 therebetween (see right portion of FIG. 10). Vanes 214 of third swirler 208 are preferably oriented at an angle of approximately 20-70° with respect to an axis 218 through swirler arrangement 202 and preferably have a length 220 which is measured across opposite ends (i.e., perpendicular to axis 218 of swirler arrangement 202). It will be seen best in FIG. 8 that axis 218 is oriented at an acute angle 219 to centerline axis 120.

Alternatively, third swirler 208 may have a plurality of first vanes 222 oriented at a first angle (approximately 20-70°) with respect to centerline axis 218 through swirler arrangement 202 and a plurality of second vanes 224 oriented at a second angle (approximately 20-70°) with respect to centerline axis 218 which alternate with first vanes 222 (see left portion of FIG. 10). It will be noted that first vanes 222 preferably extend from an upstream end 223 of third swirler 208 to a downstream end 225 thereof in the same manner as vanes 214. Second vanes 224, however, preferably extend only part of the way from upstream end 223 to downstream end 225 so that the tips of first and second vanes 22 and 224 are stepped or lie on a different annulus. In this way, a first type of passage 226 having a first configuration is defined between adjacent pairs of vances 222,224 and a second type of passage 228 having a second configuration is defined between opposite sides of vanes 222,224. It will be seen that passages 226 and 228 are configured differently, whereby momentum changes are produced. As stated above, the shaping of such passages 226 and 228 permit greater flexibility in controlling air flow characteristics of third swirler 208.

Figure 11:
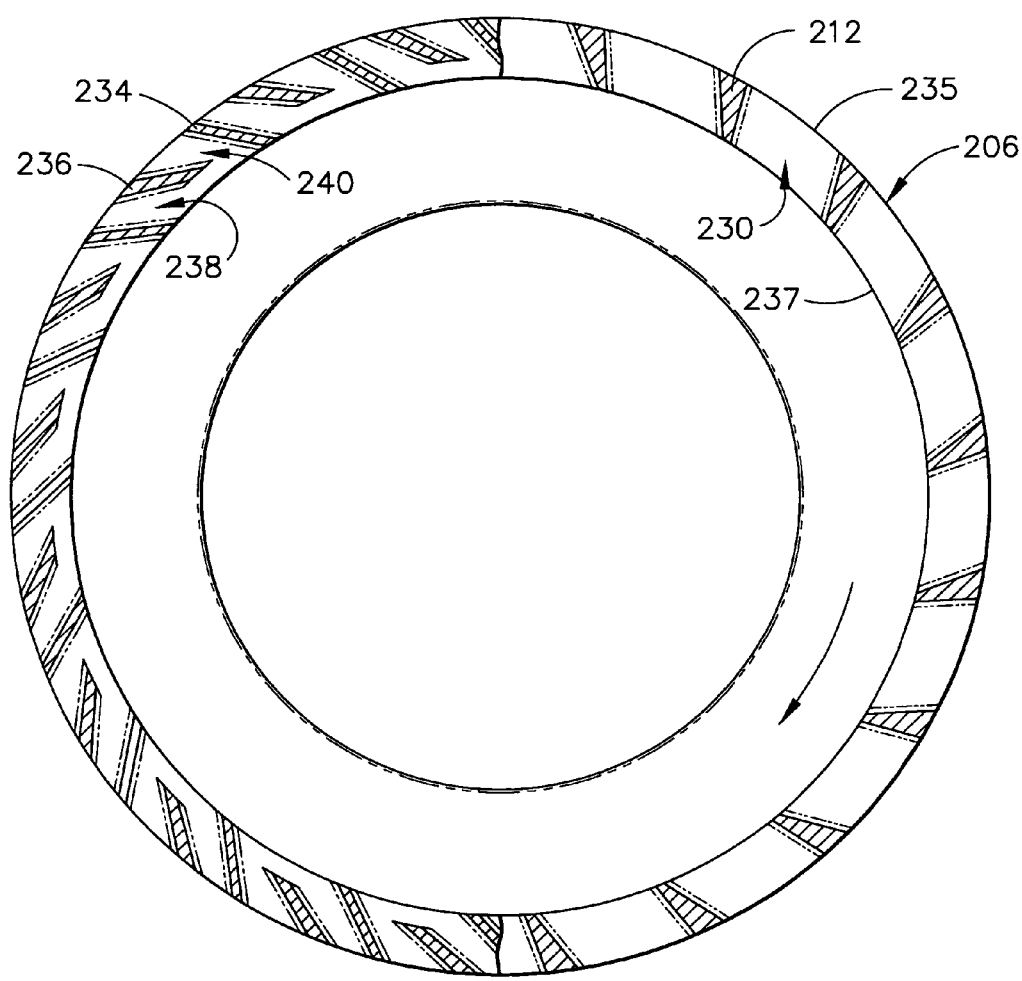
FIG. 11 is an aft view of the swirler arrangement depicted in FIGS. 8 and 9 taken along line 11-11 in FIG. 8, where the vanes in a middle swirler are arranged to define substantially uniform passages therebetween on a right portion thereof and the vanes are arranged to define shaped passages therebetween on a left portion thereof.

Similarly, vanes 212 of second swirler 206 may be of substantially uniform orientation and spacing to provide substantially uniform passages 230 therebetween (see right portion of FIG. 11). Vanes 212 of second swirler 206 are preferably oriented at an angle of approximately 0-60° with respect to centerline axis 218 through swirler arrangement 202 and preferably have a length 232 which is measured across opposite ends (i.e., perpendicular to centerline axis 218 of swirler arrangement 202).

Alternatively, second swirler 206 may have a plurality of first vanes 234 oriented at a first angle (approximately 0-60°) with respect to centerline axis 218 and a plurality of second vanes 236 oriented at a second angle (approximately 0-60°) with respect to centerline axis 218 which alternate with first vanes 234 (see left portion of FIG. 11). It will be noted that first vanes 234 preferably extend from an upstream end 235 of second swirler 206 to a downstream end 237 thereof in the same manner as vanes 212. Second vanes 236, however, preferably extend only part of the way from upstream end 235 to downstream end 237 so that the tips of first and second vanes 234 and 236 are stepped or lie on a different annulus. In this way, a first type of passage 238 is provided in second swirler 206 having a first configuration and a second type of passage 240 is provided in second swirler 206 having a second configuration.

Figure 12:
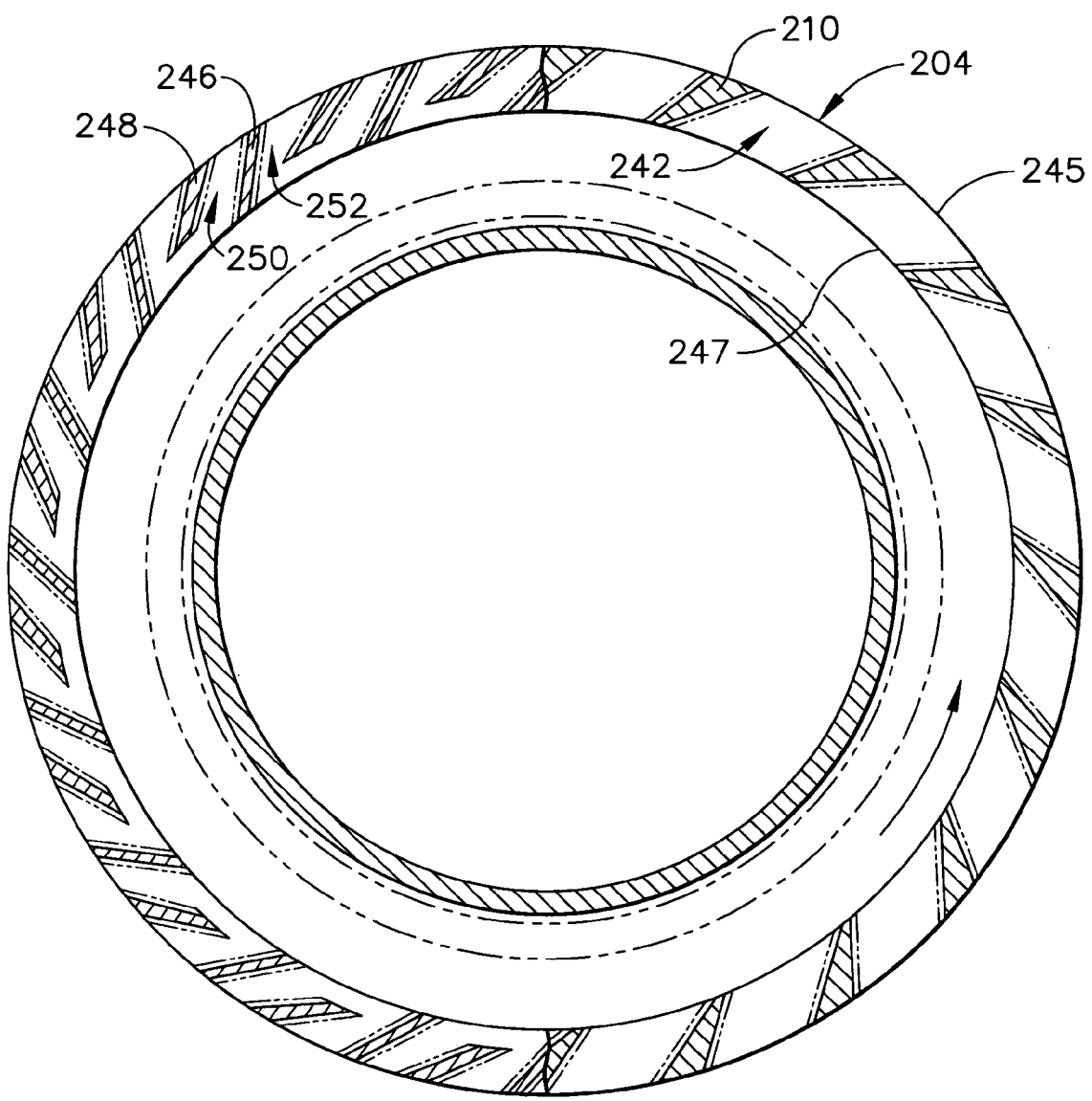
FIG. 12 is an aft view of the swirler arrangement depicted in FIGS. 8 and 9 taken along line 12-12 in FIG. 8, where the vanes in an upstream swirler are arranged to define substantially uniform passages therebetween on a right portion thereof and the vanes are arranged to define shaped passages therebetween on a left portion thereof.
Figure 13:
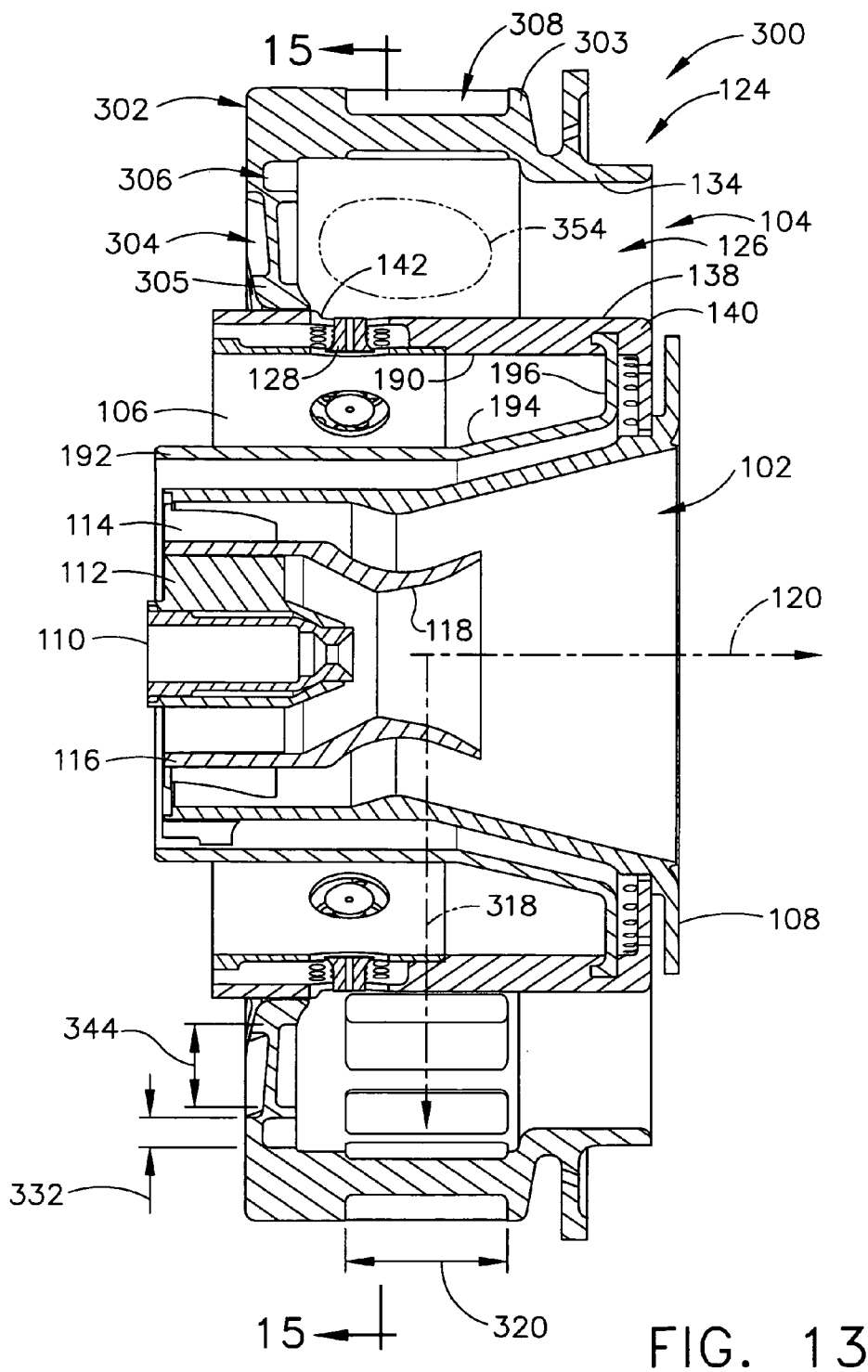
FIG. 13 is an enlarged, cross-sectional view of a third embodiment for the mixer assembly of the present invention, where the main mixer has a swirler arrangement including two swirlers oriented substantially parallel to a centerline axis through the mixer assembly and one swirler oriented substantially radially to the centerline axis.
Figure 14:
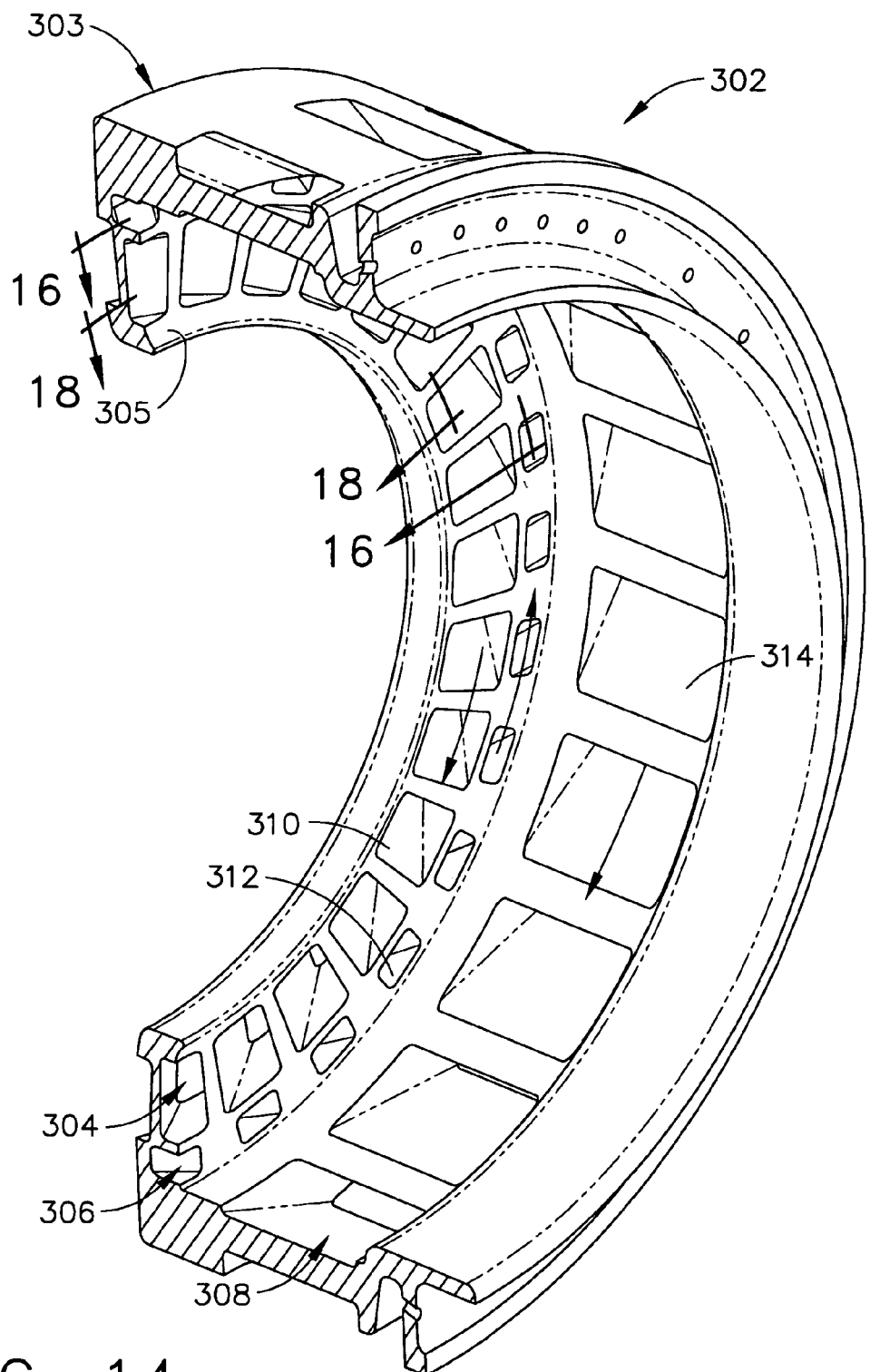
FIG. 14 is a partial perspective view of the swirler arrangement depicted in FIG. 13.

Vanes 210 of first swirler 204 may be of substantially uniform orientation and spacing to provide substantially uniform passages 242 therebetween (see right portion of FIG. 12). Vanes 210 of first swirler 204 are preferably oriented at an angle of approximately 0-60° with respect to centerline axis 218 through swirler arrangement 202 and preferably have a length 244 which is measured across opposite ends (i.e., perpendicular to centerline axis 218 of swirler arrangement 202).

Alternatively, first swirler 204 may have a plurality of first vanes 246 oriented at a first angle (approximately 20-70°) with respect to centerline axis 218 and a plurality of second vanes 248 oriented at a second angle (approximately 20-70°) with respect to centerline axis 218 which alternate with first vanes 246 (see left portion of FIG. 12). It will be noted that first vanes 246 preferably extend from an upstream end 245 of first swirler 204 to a downstream end 247 thereof in the same manner as vanes 210. Second vanes 248, however, preferably extend only part of the way from upstream end 245 to downstream end 247 so that the tips of first and second vanes 246 and 248 are stepped or lie on a different annulus. In this way, a first type of passage 250 is provided in first swirler 204 having a first configuration and a second type of passage 252 is provided in first swirler 204 having a second configuration.

It will be understood that air flowing through first and third swirlers 204 and 208 will be swirled in a first direction and air flowing through second swirler 206 will preferably be swirled in a direction opposite the first direction. In this way, an intense mixing region 254 of air and fuel is created within annular cavity 126 having an enhanced total kinetic energy. By properly configuring swirlers 204, 206 and 208, intense mixing region 254 is substantially centered within annular cavity 126, positioned axially adjacent fuel injection ports 128 and has a designated area. Vanes 210, 212 and 214 of first, second and third swirlers 204, 206 and 208 may be substantially aligned circumferentially with respect to centerline axis 218 through swirler arrangement 202 or not in any combination to further tailor the characteristics of air flowing therethrough as desired. Likewise, the configuration of the vanes in swirlers 204, 206 and 208 may be altered to vary the swirl direction of air flowing therethrough and not be limited to the exemplary swirl directions indicated hereinabove.

It will be seen that length 220 of third swirler vanes 214 is preferably greater than length 232 of second swirler vanes 212. Length 244 of first swirler vanes 210 is preferably greater than length 232 of second swirler vanes 212 and less than length 220 of third swirler vanes 214. Accordingly, a relatively greater amount of air flows through third swirler 208 than through first and second swirlers 204 and 206 due to the greater passage area therefor. More air flows through first swirler 204 than through second swirler 206 for the same reason. The relative lengths of swirlers 204, 206 and 208 may be varied as desired to alter the distribution of air therethrough, so the sizes depicted are only illustrative.

It will be understood that modifications of mixing assembly 100 in mixing assembly 200 are limited to the swirler arrangement 202, and therefore numerals identifying other components of main mixer 104, as well as pilot mixer 102 and fuel manifold 106, are not changed.

In a third embodiment of the mixing assembly, identified by numeral 300, an alternative swirler arrangement 302 having a swirler housing 303 is utilized and shown in FIGS. 13-19. It will be seen that swirler arrangement 302 preferably includes first, second and third swirlers 304, 306 and 308, respectively, positioned upstream from fuel injection ports 128. First swirler 304 is located within a forward wall 305 of swirler housing 303 and oriented substantially parallel to centerline axis 120 through mixing assembly 300. Second swirler 306 is located within a forward wall 305 of swirler housing 303, oriented substantially parallel to centerline axis 120, and positioned radially outside of first swirler 304. Third swirler 308 is located within radially outer wall 134 of swirler housing 303 and is oriented substantially perpendicular to centerline axis 120. Each swirler has a plurality of vanes (identified by numerals 310, 312 and 314 for first swirler 304, second swirler 306, and third swirler 308, respectively) for swirling air traveling through such swirler to mix air and droplets of fuel dispensed by fuel injection ports 128.

Figure 15:
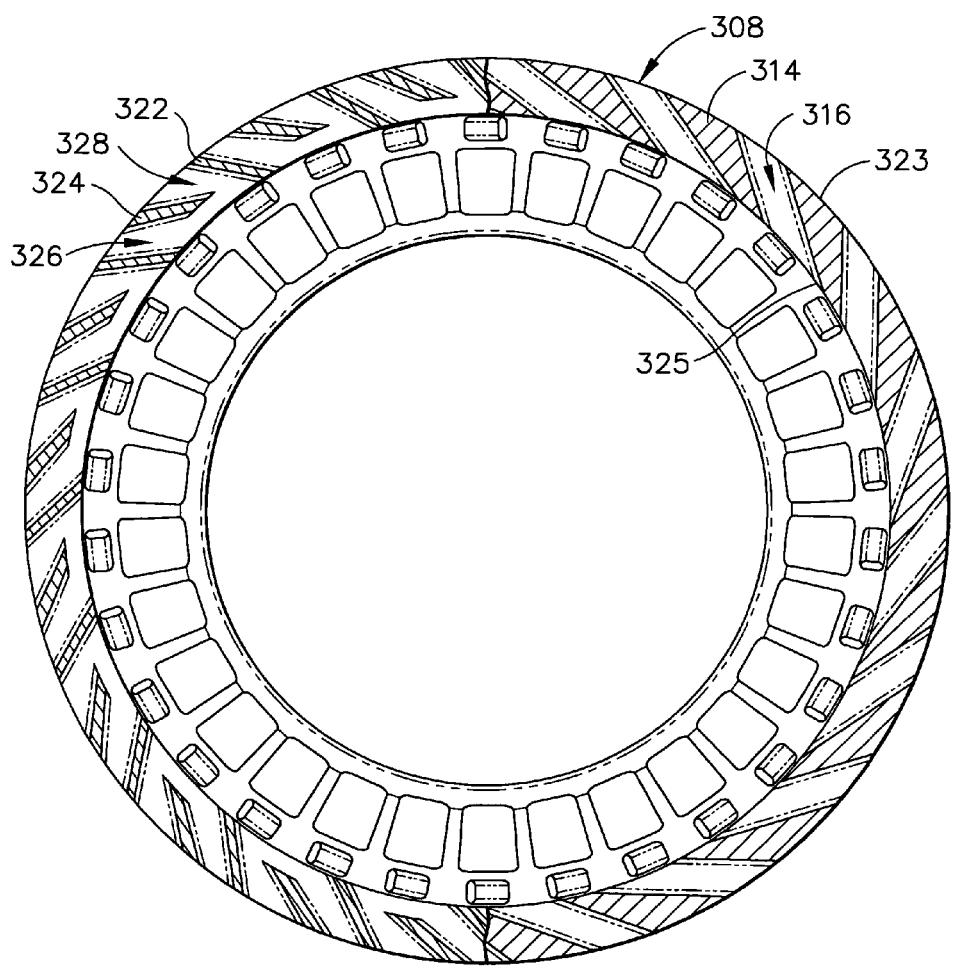
FIG. 15 is an aft view of the swirler arrangement depicted in FIGS. 13 and 14 taken along line 15-15 in FIG. 13, where the vanes in the radial swirler are arranged to define substantially uniform passages therebetween on a right portion thereof and the vanes are arranged to define shaped passages therebetween on a left portion thereof.
Figure 20:
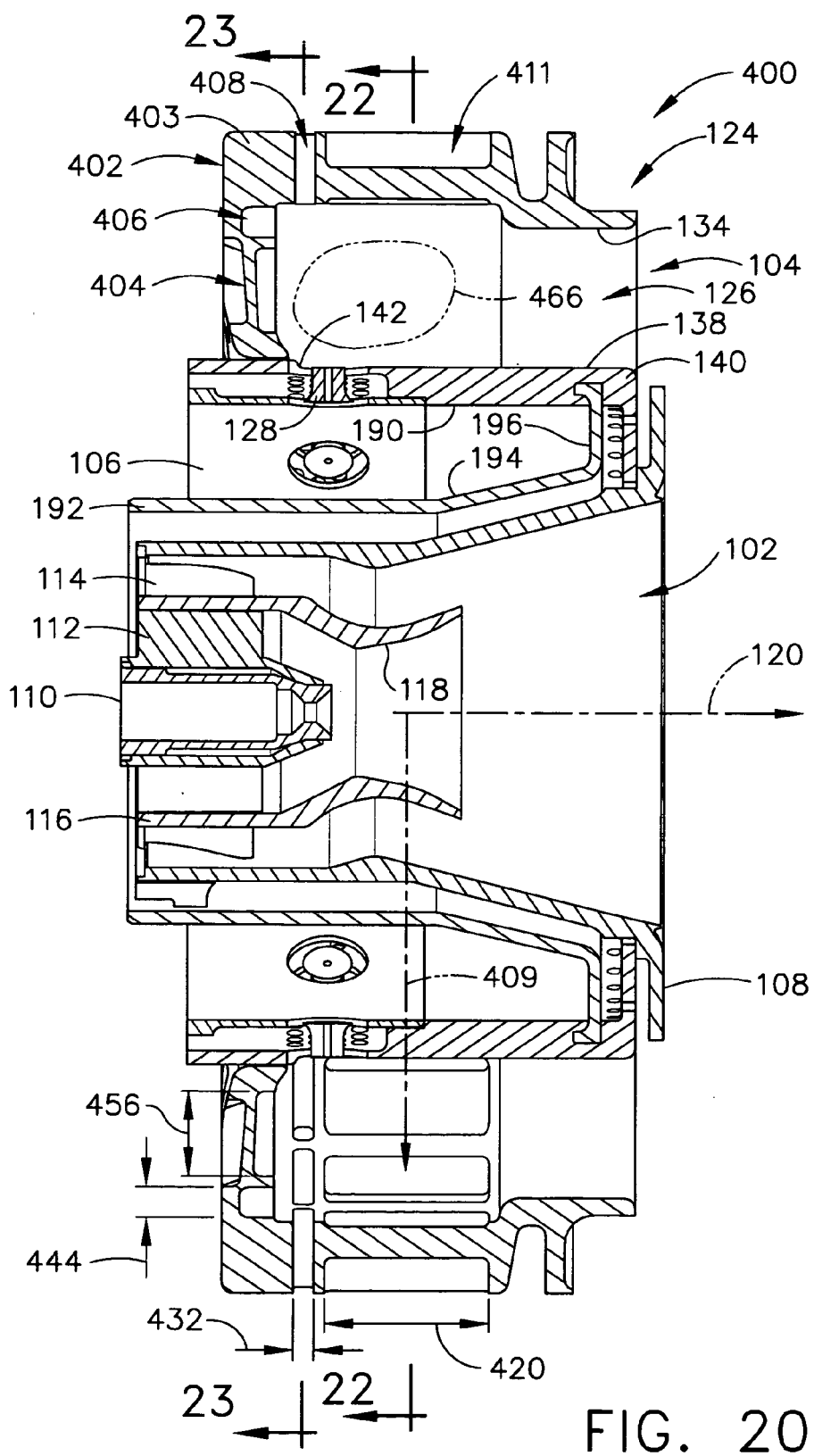
FIG. 20 is an enlarged, cross-sectional view of a fourth embodiment for the mixer assembly of the present invention, where the main mixer has a swirler arrangement including two swirlers oriented substantially parallel to a centerline axis through the main mixer and two swirlers oriented substantially radially to the centerline axis.
Figure 21:
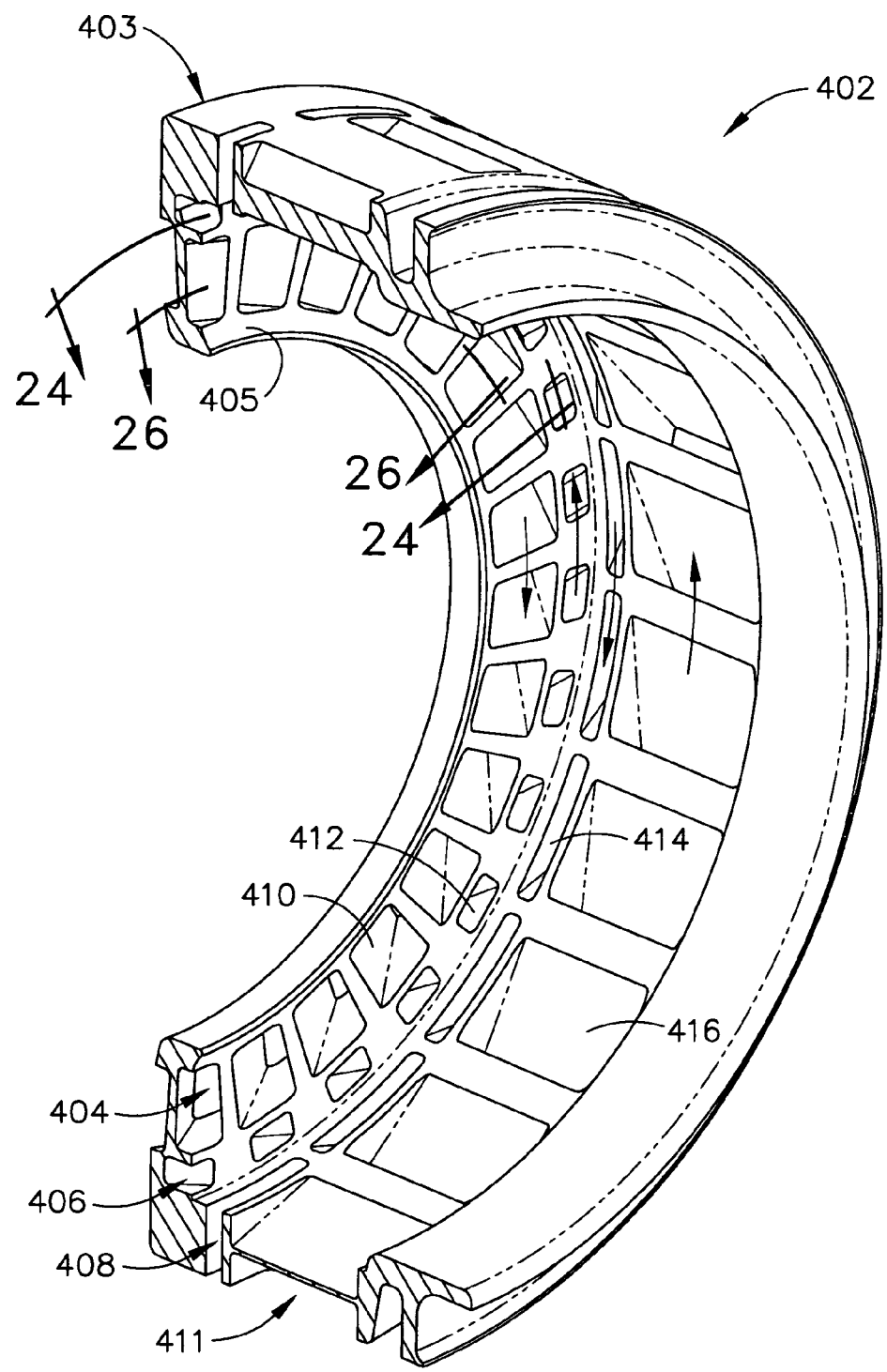
FIG. 21 is a partial perspective view of the swirler arrangement depicted in FIG. 20.

It will be noted that vanes 314 of third swirler 308 may be of substantially uniform orientation and spacing to provide substantially uniform passages 316 therebetween (see right portion of FIG. 15). Vanes 314 of third swirler 308 are preferably oriented at an angle of approximately 20-70° with respect to an axis 318 oriented substantially perpendicular to centerline axis 102 through mixing assembly 300 and preferably have a length 320 which is measured across opposite ends (i.e., parallel to centerline axis 120 of mixing assembly 300).

Alternatively, third swirler 308 may have a plurality of first vanes 322 oriented at a first angle (approximately 20-70°) with respect to axis 318 and a plurality of second vanes 324 oriented at a second angle (approximately 20-70°) with respect to axis 318 which alternate with first vanes 322 (see left portion of FIG. 15). It will be noted that first vanes 322 preferably extend from an upstream end 323 of third swirler 308 to a downstream end 325 thereof in the same manner as vanes 314. Second vanes 324, however, preferably extend only part of the way from upstream end 323 to downstream end 325 so that the tips of first and second vanes 322 and 324 are stepped or lie on a different annulus. In this way, a first type of passage 326 having a first configuration is defined between adjacent pairs of vanes 322,324 and a second type of passage 328 having a second configuration is defined between opposite sides of vanes 322,324. It will be seen that passages 326 and 328 are configured differently, whereby momentum changes are produced. As stated above, the shaping of such passages 326 and 328 permit greater flexibility in controlling air flow characteristics of third swirler 308.

Similarly, vanes 312 of second swirler 306 may be of substantially uniform orientation and spacing to provide substantially uniform passages 330 therebetween (see FIG. 16). Vanes 312 of second swirler 306 are preferably oriented at an angle of approximately 0-60° with respect to centerline axis 120 through mixing assembly 300 and preferably have a length 332 which is measured across opposite ends (i.e., perpendicular to centerline axis 120 of mixing assembly 300).

Alternatively, second swirler 306 may have a plurality of first vanes 334 oriented at a first angle (approximately 0-60°) with respect to centerline axis 120 and a plurality of second vanes 336 oriented at a second angle (approximately 0-60°) with respect to centerline axis 102 that alternate with first vanes 334 (see FIG. 17). It will be noted that first vanes 334 preferably extend from an upstream end 335 of second swirler 306 to a downstream end 337 thereof in the same manner as vanes 312. Second vanes 336, however, preferably extend only part of the way from upstream end 335 to downstream end 337 so that the tips of first and second vanes 334 and 336 are stepped or lie on a different annulus. In this way, a first type of passage 338 is provided in second swirler 306 having a first configuration and a second type of passage 340 is provided in second swirler 306 having a second configuration.

Vanes 310 of first swirler 304 may be of substantially uniform orientation and spacing to provide substantially uniform passages 342 therebetween (see FIG. 18). Vanes 310 of first swirler 304 are preferably oriented at an angle of approximately 20-70° with respect to centerline axis 120 through mixing assembly 300 and preferably have a length 344 which is measured across opposite ends (i.e., perpendicular to centerline axis 120 of mixing assembly 300).

Alternatively, first swirler 304 may have a plurality of first vanes 346 oriented at a first angle (approximately 20-70°) with respect to centerline axis 120 and a plurality of second vanes 348 oriented at a second angle (approximately 20-70°) with respect to centerline axis 120 that alternate with first vanes 346 (see FIG. 19). It will be noted that first vanes 346 preferably extend from an upstream end 345 of first swirler 304 to a downstream end 347 thereof in the same manner as vanes 310. Second vanes 348, however, preferably extend only part of the way from upstream end 345 to downstream end 347 so that the tips of first and second vanes 346 and 348 are stepped or lie on a different annulus. In this way, a first type of passage 350 is provided in first swirler 304 having a first configuration and a second type of passage 352 is provided in first swirler 304 having a second configuration.

It will be understood that air flowing through first and third swirlers 304 and 308 will be swirled in a first direction and air flowing through second swirler 306 will preferably be swirled in a direction opposite the first direction. In this way, an intense mixing region 354 of air and fuel is created within annular cavity 126 having an enhanced total kinetic energy. By properly configuring swirlers 304, 306 and 308, intense mixing region 354 is substantially centered within annular cavity 126, positioned axially adjacent fuel injection ports 128 and has a designated area. Vanes 310 and 312 of first and second swirlers 304 and 306 may be substantially aligned circumferentially with respect to centerline axis 120 through mixing assembly 300 or not to further tailor the characteristics of air flowing therethrough as desired. Likewise, the configuration of the vanes in swirlers 304, 306 and 308 may be altered to vary the swirl direction of air flowing therethrough and not be limited to the exemplary swirl directions indicated hereinabove.

It will be seen that length 320 of third swirler vanes 314 is preferably greater than length 332 of second swirler vanes 312. Length 344 of first swirler vanes 310 is preferably greater than length 332 of second swirler vanes 312 and less than length 320 of third swirler vanes 314. Accordingly, a relatively greater amount of air flows through third swirler 308 than through first and second swirlers 304 and 306 due to the greater passage area therefor. More air flows through first swirler 304 than through second swirler 306 for the same reason. The relative lengths of swirlers 304, 306 and 308 may be varied as desired to alter the distribution of air therethrough, so the sizes depicted are only illustrative.

It will be understood that modifications of mixing assembly 100 in mixing assembly 300 are limited to the swirler arrangement 302, and therefore numerals identifying other components of main mixer 104, as well as pilot mixer 102 and fuel manifold 106, are not changed.

In a fourth embodiment of the mixing assembly, identified by numeral 400, an alternative swirler arrangement 402 having a swirler housing 403 is utilized and shown in FIGS. 20-27. It will be seen that swirler arrangement 402 preferably includes first, second, third and fourth swirlers 404, 406, 408 and 411, respectively, positioned upstream from fuel injection ports 128. First and second swirlers 404 and 406 are positioned within a forward wall 405 and oriented substantially parallel to centerline axis 120 of mixing assembly 400, with second swirler 406 being positioned radially outside of first swirler 404. Third and fourth swirlers 408 and 411 are positioned within outer wall 134 and oriented substantially perpendicular to centerline axis 120 along an axis 409, with fourth swirler 411 being located downstream of third swirler 408. In addition, each swirler has a plurality of vanes (identified by numerals 410, 412, 414 and 416 for first swirler 404, second swirler 406, third swirler 408 and fourth swirler 411, respectively) for swirling air traveling through such swirler to mix air and droplets of fuel dispensed by fuel injection ports 128.

Figure 22:
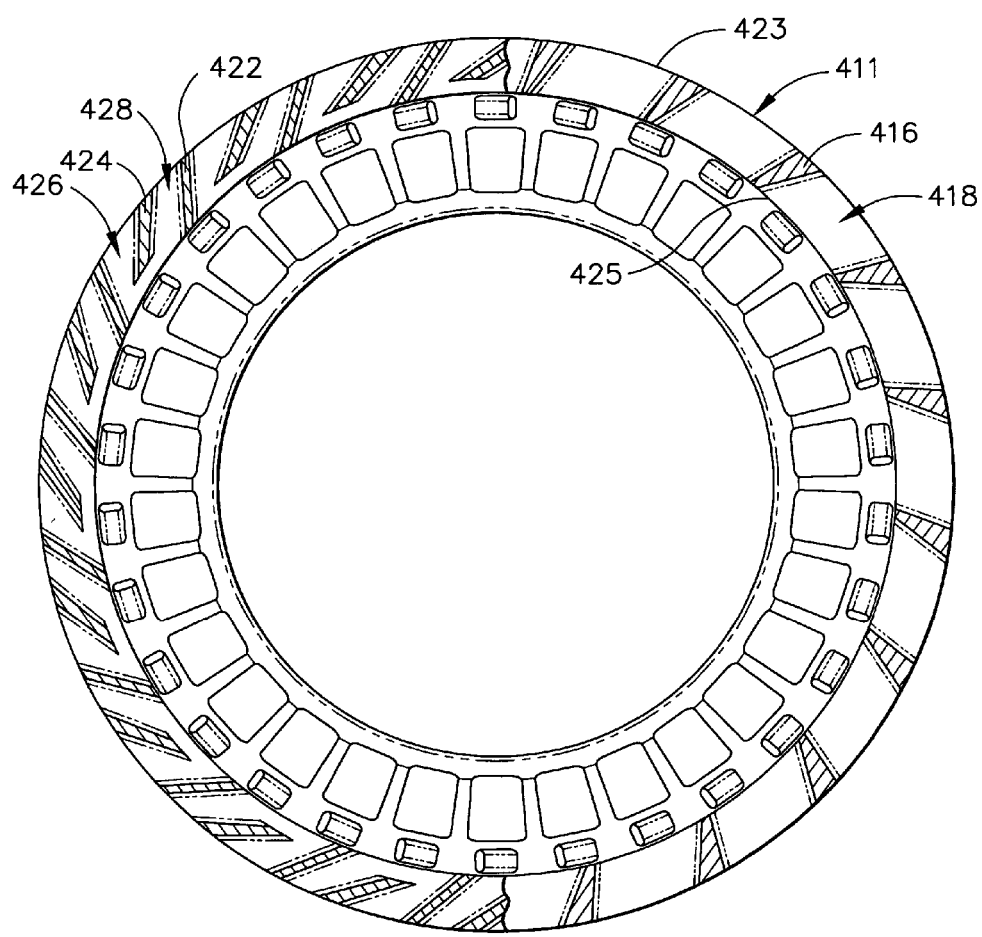
FIG. 22 is an aft view of the swirler arrangement depicted in FIGS. 20 and 21 taken along line 22-22 in FIG. 20, where the vanes in the downstream radial swirler are arranged to define substantially uniform passages therebetween on a right portion thereof and the vanes are arranged to define shaped passages therebetween on a left portion thereof.

It will be noted that vanes 416 of fourth swirler 411 may be of substantially uniform orientation and spacing to provide substantially uniform passages 418 therebetween (see right portion of FIG. 22). Vanes 416 of fourth swirler 411 are preferably oriented at an angle of approximately 20-70° with respect to axis 409 and preferably have a length 420 which is measured across opposite ends (i.e., perpendicular to axis 409).

Alternatively, fourth swirler 411 may have a plurality of first vanes 422 oriented at a first angle (approximately 0-70°) with respect to axis 409 and a plurality of second vanes 424 oriented at a second angle (approximately 0-70°) with respect to axis 409 which alternate with first vanes 422 (see left portion of FIG. 22). It will be noted that first vanes 422 preferably extend from an upstream end 423 of fourth swirler 411 to a downstream end 425 thereof in the same manner as vanes 416. Second vanes 424, however, preferably extend only part of the way from upstream end 423 to downstream end 425 so that the tips of first and second vanes 422 and 424 are stepped or lie on a different annulus. In this way, a first type of passage 426 having a first configuration is defined between adjacent pairs of vanes 422,424 and a second type of passage 428 having a second configuration is defined between opposite sides of vanes 422,424. It will be seen that passages 426 and 428 are configured differently, whereby momentum changes are produced. As stated above, the shaping of such passages 426 and 428 permit greater flexibility in controlling air flow characteristics of fourth swirler 411.

Figure 23:
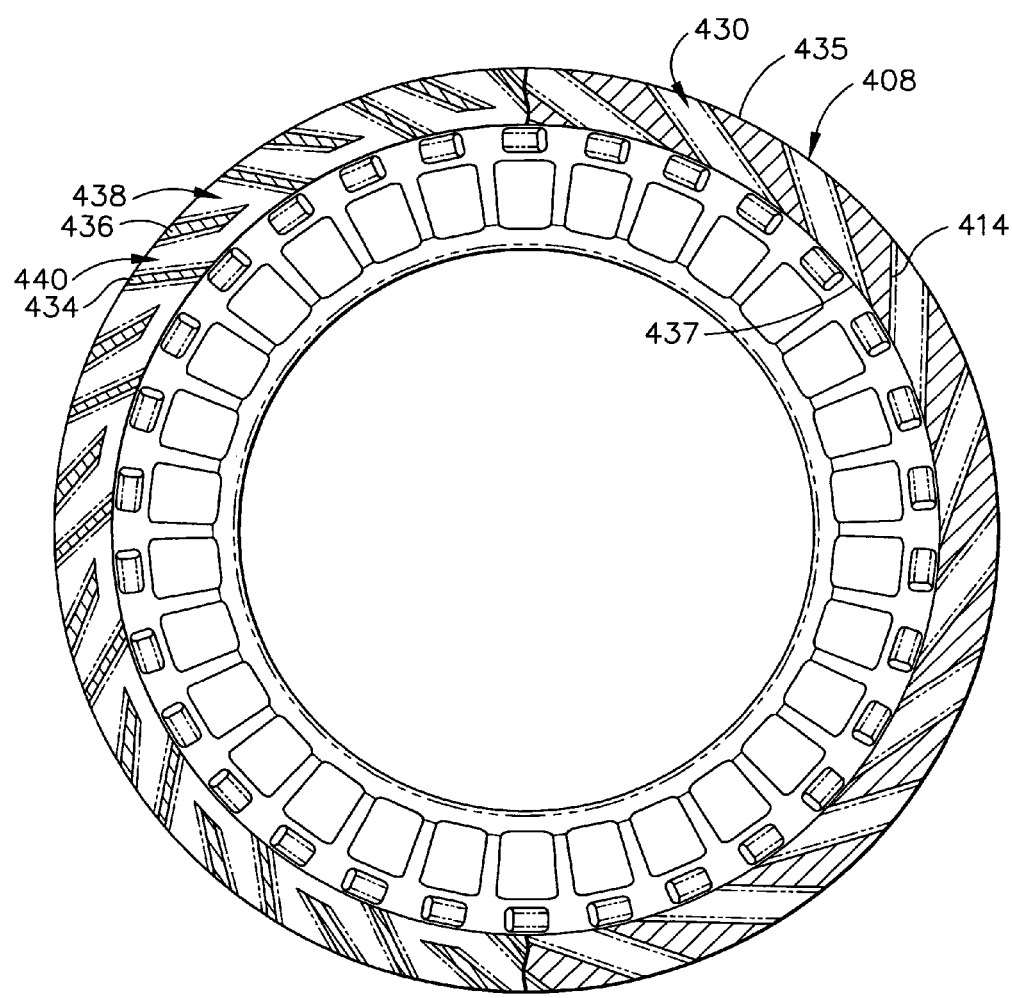
FIG. 23 is an aft view of the swirler arrangement depicted in FIGS. 20 and 21 taken along line 23-23 in FIG. 20, where the vanes in the upstream radial swirler are arranged to define substantially uniform passages therebetween on a right portion thereof and the vanes are arranged to define shaped passages therebetween on a left portion.

It will be noted that vanes 414 of third swirler 408 may be of substantially uniform orientation and spacing to provide substantially uniform passages 430 therebetween (see right portion of FIG. 23). Vanes 414 of third swirler 408 are preferably oriented at an angle of approximately 0-60° with respect to axis 409 and preferably have a length 432 which is measured across opposite ends (i.e., perpendicular to axis 409).

Alternatively, third swirler 408 may have a plurality of first vanes 434 oriented at a first angle (approximately 0-60°) with respect to axis 409 and a plurality of second vanes 436 oriented at a second angle (approximately 0-60°) with respect to axis 409 which alternate with first vanes 434 (see left portion of FIG. 23). It will be noted that first vanes 434 preferably extend from an upstream end 435 of third swirler 408 to a downstream end 437 thereof in the same manner as vanes 414. Second vanes 436, however, preferably extend only part of the way from upstream end 435 to downstream end 437 so that the tips of first and second vanes 434 and 436 are stepped or lie on a different annulus. In this way, a first type of passage 438 having a first configuration is defined between adjacent pairs of vanes 434,436 and a second type of passage 440 having a second configuration is defined between opposite sides of vanes 434,436. It will be seen that passages 438 and 440 are configured differently, whereby momentum changes are produced. As stated above, the shaping of such passages 438 and 440 permit greater flexibility in controlling air flow characteristics of third swirler 408.

Figure 24:
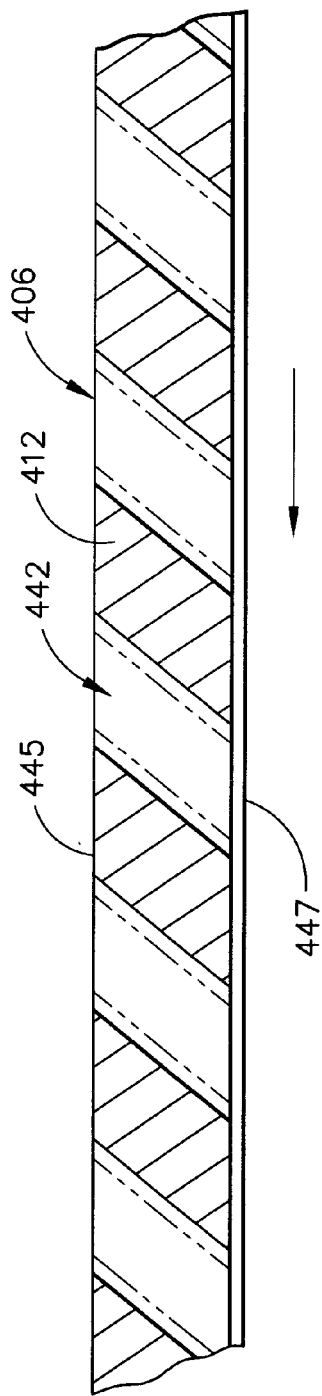
FIG. 24 is a view of the swirler arrangement depicted in FIGS. 20 and 21 taken along line 24-24 in FIG. 21, where the vanes in the outer axial swirler are arranged to define substantially uniform passages therebetween.

Similarly, vanes 412 of second swirler 406 may be of substantially uniform orientation and spacing to provide substantially uniform passages 442 therebetween (see FIG. 24). Vanes 412 of second swirler 406 are preferably oriented at an angle of approximately 0-60° with respect to centerline axis 120 and preferably have a length 444 which is measured across opposite ends (i.e., perpendicular to centerline axis 120).

Figure 25:
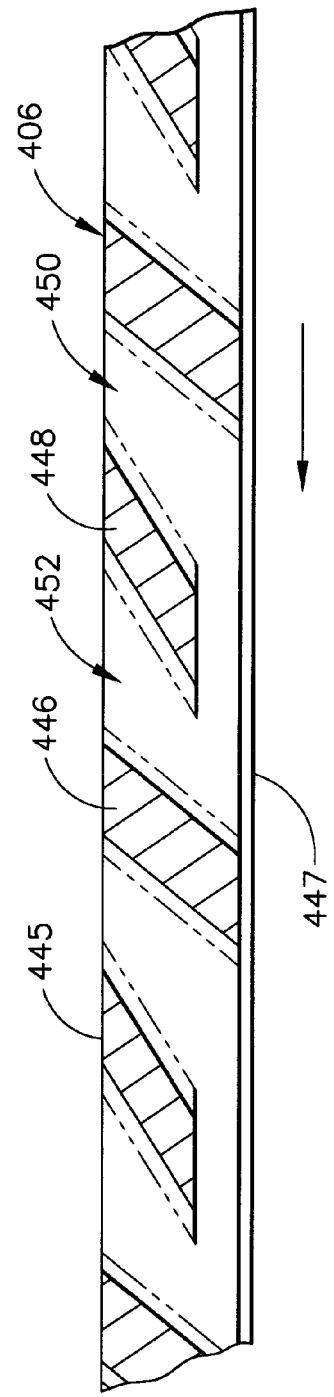
FIG. 25 is a view of the outer axial swirler similar to that depicted in FIG. 24, where the vanes are arranged to define shaped passages therebetween.
Figure 28:
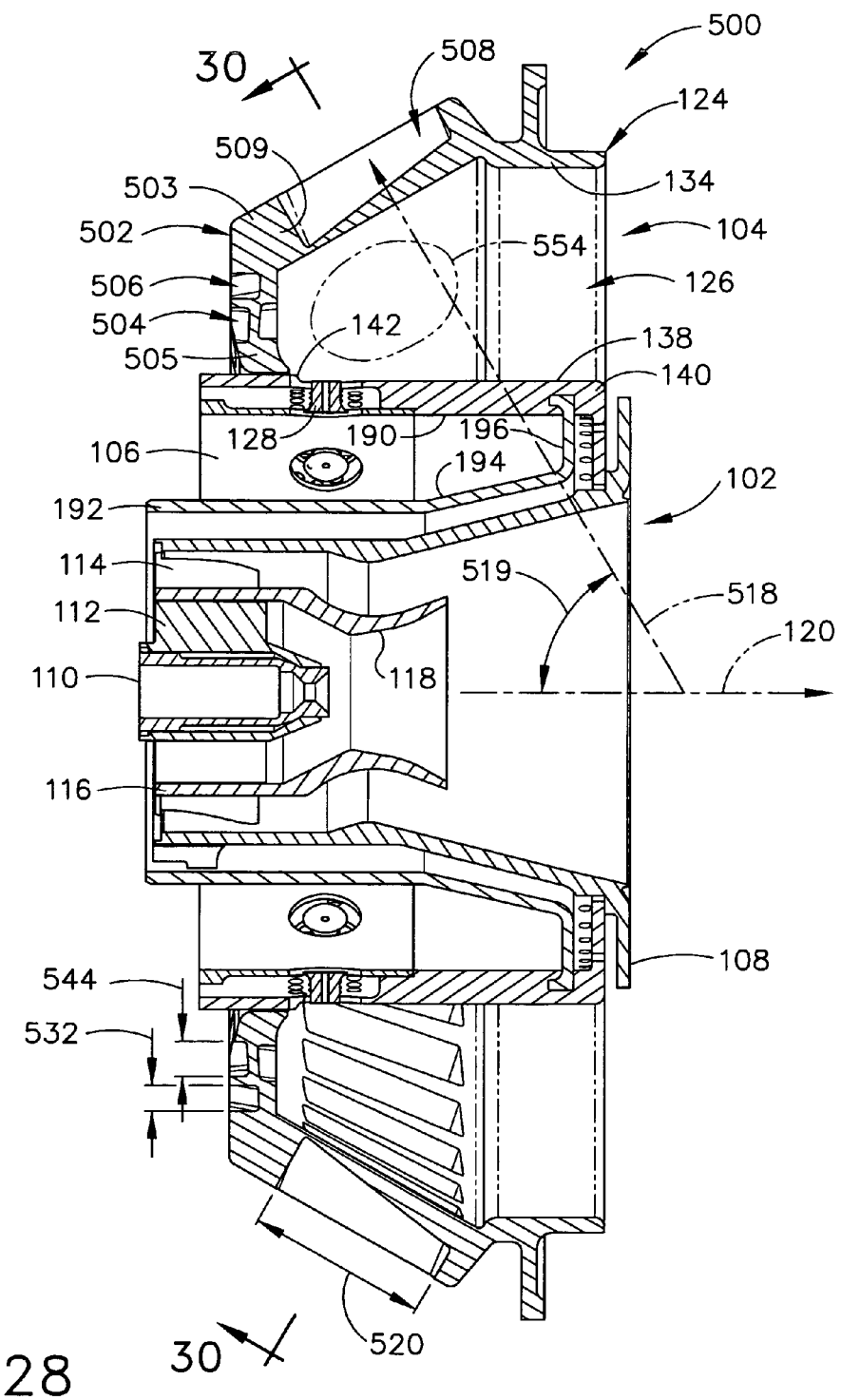
FIG. 28 is an enlarged, cross-sectional view of a fifth embodiment for the mixer assembly of the present invention, where the main mixer has a swirler arrangement including two swirlers oriented substantially parallel to a centerline axis through the mixer assembly and one swirler oriented at an acute angle to the centerline axis.
Figure 29:
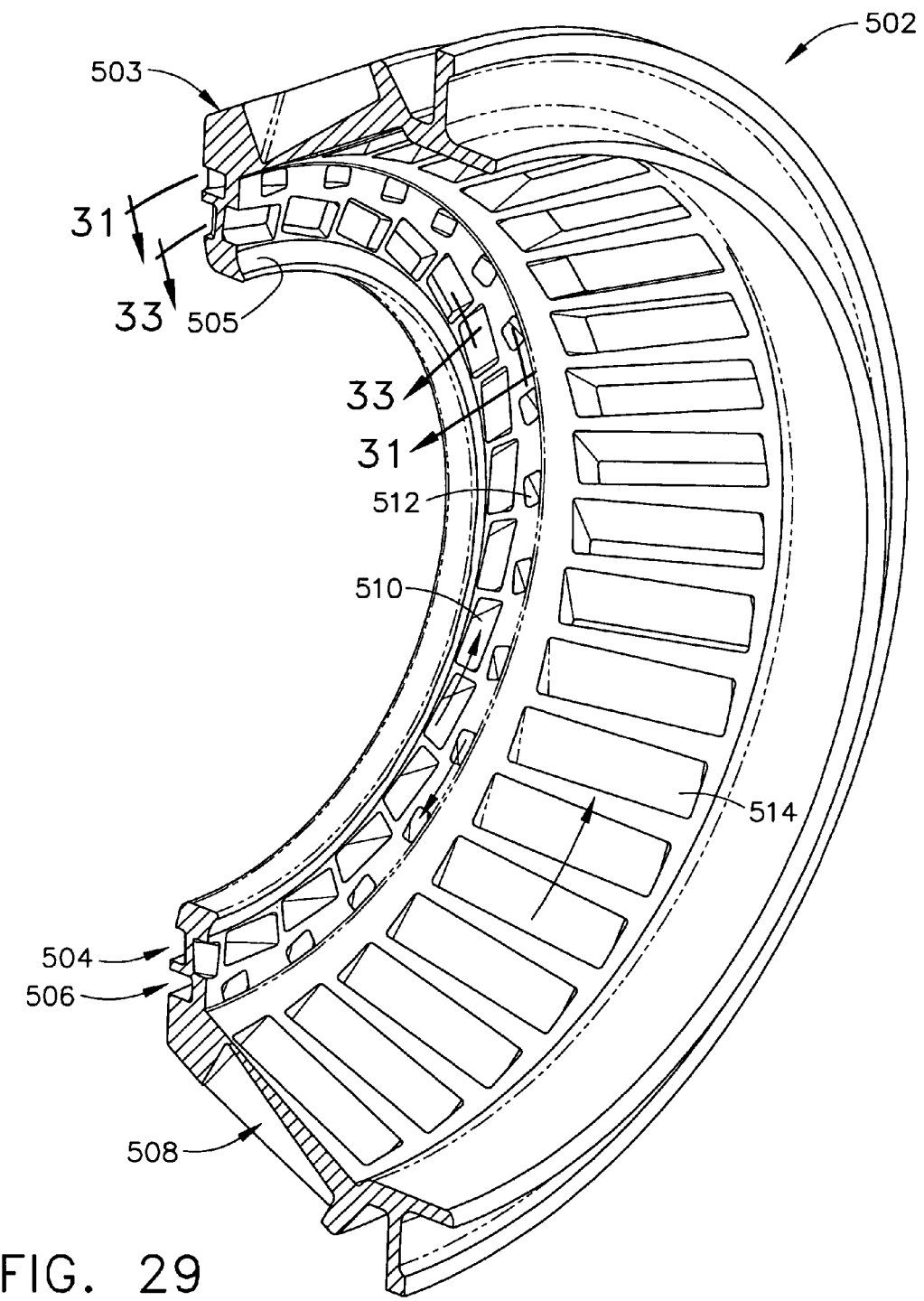
FIG. 29 is a partial perspective view of the swirler arrangement depicted in FIG. 28.

Alternatively, second swirler 406 may have a plurality of first vanes 446 oriented at a first angle (approximately 0-60°) with respect to centerline axis 120 and a plurality of second vanes 448 oriented at a second angle (approximately 0-60°) with respect to centerline axis 120 that alternate with first vanes 446 (see FIG. 25). It will be noted that first vanes 446 preferably extend from an upstream end 445 of second swirler 406 to a downstream end 447 thereof in the same manner as vanes 412. Second vanes 448, however preferably extend only part of the way from upstream end 445 to downstream end 447 so that the tips of first and second vanes 446 and 448 are stepped or lie on a different annulus. In this way, a first type of passage 450 having a first configuration is defined between opposite sides of vanes 446,448 and a second type of passage 452 having a second configuration is defined between opposite sides of vanes 446,448. It will be seen that passages 450 and 452 are configured differently, whereby momentum changes are produced. As stated above, the shaping of such passages 450 and 452 permit greater flexibility in controlling air flow characteristics of second swirler 406.

Vanes 410 of first swirler 404 may be of substantially uniform orientation and spacing to provide substantially uniform passages 454 therebetween (see FIG. 26). Vanes 410 of first swirler 404 are preferably oriented at an angle of approximately 20-70° with respect to centerline axis 120 and preferably have a length 456 which is measured across opposite ends (i.e., perpendicular to centerline axis 120).

Alternatively, first swirler 404 may have a plurality of first vanes 458 oriented at a first angle (approximately 20-70°) with respect to centerline axis 120 and a plurality of second vanes 460 oriented at a second angle (approximately 20-70°) with respect to centerline axis 120 that alternate with first vanes 458 (see FIG. 27). It will be noted that first vanes 458 preferably extend from an upstream end 459 of first swirler 404 to a downstream end 461 thereof in the same manner as vanes 410. Second vanes 460, however, preferably extend only part of the way from upstream end 459 to downstream end 461 so that the tips of first and second vanes 458 and 460 are stepped or lie on a different annulus. In this way, a first type of passage 462 having a first configuration is defined between opposite sides of vanes 458,460 and a second type of passage 464 having a second configuration is defined between opposite sides of vanes 458,460. It will be seen that passages 462 and 464 are configured differently, whereby momentum changes are produced. As stated above, the shaping of such passages 462 and 464 permit greater flexibility in controlling air flow characteristics of first swirler 404.

It will be understood that air flowing through first and third swirlers 404 and 408 will be swirled in a first direction and air flowing through second and fourth swirlers 406 and 411 will preferably be swirled in a direction opposite the first direction. In this way, an intense mixing region 466 of air and fuel is created within annular cavity 126 having an enhanced total kinetic energy. By properly configuring swirlers 404, 406, 408 and 411, intense mixing region 466 is substantially centered within annular cavity 126, positioned axially adjacent fuel injection ports 128 and has a designated area. Vanes 410 and 412 of first and second swirlers 404 and 406 may or may not be substantially aligned circumferentially with respect to centerline axis 120 in any combination to further tailor the characteristics of air flowing therethrough as desired. Likewise, vanes 414 and 416 of third and fourth swirlers 408 and 11 may or may not be substantially aligned circumferentially with respect to axis 409. In any event, the configuration of the vanes in swirlers 404, 406, 408 and 411 may be altered to vary the swirl direction of air flowing therethrough and not be limited to the exemplary swirl directions indicated hereinabove.

It will be seen that length 420 of fourth swirler vanes 416 is preferably greater than length 432 of third swirler vanes 414, whereas length 456 of first swirler vanes 410 is preferably greater than length 444 of second swirler vanes 412. Accordingly, a relatively greater amount of air flows through fourth swirler 411 than through third swirler 408 due to the greater passage area therefor. More air flows through first swirler 404 than through second swirler 406 for the same reason. The relative lengths of swirlers 404, 406, 408 and 411 may be varied as desired to alter the distribution of air therethrough, so the sizes depicted are only illustrative.

It will be understood that modifications of mixing assembly 100 in mixing assembly 400 are limited to the swirler arrangement 402, and therefore numerals identifying other components of main mixer 104, as well as pilot mixer 102 and fuel manifold 106, are not changed.

In a fifth embodiment of the mixing assembly, identified by numeral 500, an alternative swirler arrangement 502 having a swirler housing 503 is utilized and shown in FIGS. 28-34. It will be seen that swirler arrangement 502 preferably includes first, second and third swirlers 504, 506 and 508, respectively, positioned upstream from fuel injection ports 128. First swirler 504 is located within a forward wall 505 of swirler housing 503 and oriented substantially parallel to centerline axis 120 through mixing assembly 500. Second swirler 506 is located within forward wall 505 of swirler housing 503, oriented substantially parallel to centerline axis 120, and positioned radially outside of first swirler 504. Third swirler 508 is located within a conical wall 509 of swirler housing 503 and is oriented at an acute angle to centerline axis 120. Each swirler has a plurality of vanes (identified by numerals 510, 512 and 514 for first swirler 504, second swirler 506, and third swirler 508, respectively) for swirling air traveling through such swirler to mix air and droplets of fuel dispensed by fuel injection ports 128.

Figure 30:
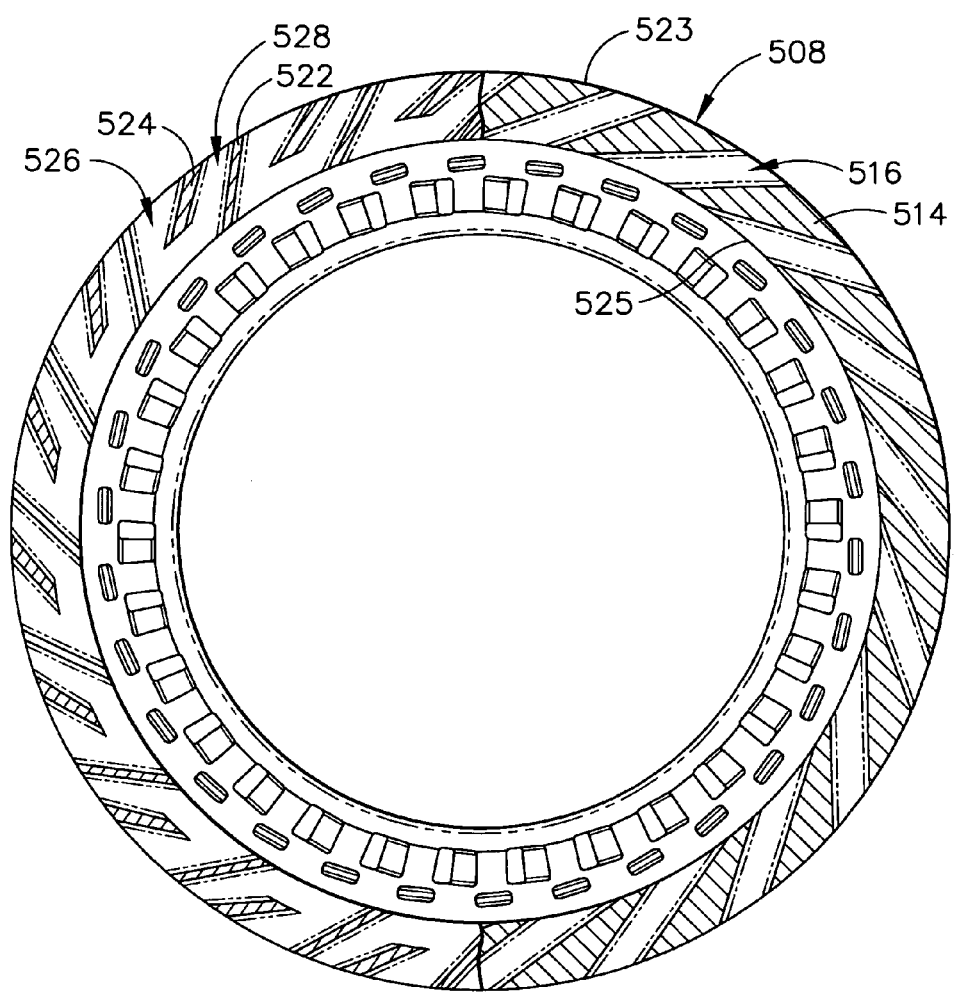
FIG. 30 is an aft view of the swirler arrangement depicted in FIGS. 28 and 29 taken along line 30-30 in FIG. 28, where the vanes in the conical swirler are arranged to define substantially uniform passages therebetween on a right portion thereof and the vanes are arranged to define shaped passages therebetween on a left portion thereof.

It will be noted that vanes 514 of third swirler 508 may be of substantially uniform orientation and spacing to provide substantially uniform passages 516 therebetween (see right portion of FIG. 30). Vanes 514 of third swirler 508 are preferably oriented at an angle of approximately 20-70° with respect to an axis 518 oriented at an acute angle 519 to centerline axis 120 through mixing assembly 500 and preferably have a length 520 which is measured across opposite ends (i.e., perpendicular to axis 518).

Alternatively, third swirler 508 may have a plurality of first vanes 522 oriented at a first angle (approximately 20-70°) with respect to axis 518 and a plurality of second vanes 524 oriented at a second angle (approximately 20-70°) with respect to axis 518 which alternate with first vanes 522 (see left portion of FIG. 30). It will be noted that first vanes 522 preferably extend from an upstream end 523 of third swirler 508 to a downstream end 525 thereof in the same manner as vanes 514. Second vanes 524, however, preferably extend only part of the way from upstream end 523 to downstream end 525 so that the tips of first and second vanes 522 and 524 are stepped or lie on a different annulus. In this way, a first type of passage 526 having a first configuration is defined between adjacent pairs of vanes 522,524 and a second type of passage 528 having a second configuration is defined between opposite sides of vanes 522,524. It will be seen that passages 526 and 528 are configured differently, whereby momentum changes are produced. As stated above, the shaping of such passages 526 and 528 permit greater flexibility in controlling air flow characteristics of third swirler 508.

Similarly, vanes 512 of second swirler 506 may be of substantially uniform orientation and spacing to provide substantially uniform passages 530 therebetween (see FIG. 31). Vanes 512 of second swirler 506 are preferably oriented at an angle of approximately 0-60° with respect to centerline axis 120 through mixing assembly 500 and preferably have a length 532 which is measured across opposite ends (i.e., perpendicular to centerline axis 120 of mixing assembly 500).

Alternatively, second swirler 506 may have a plurality of first vanes 534 oriented at a first angle (approximately 0-60°) with respect to centerline axis 120 and a plurality of second vanes 536 oriented at a second angle (approximately 0-60°) with respect to centerline axis 120 that alternate with first vanes 534 (see FIG. 32). It will be noted that first vanes 534 preferably extend from an upstream end 535 of second swirler 506 to a downstream end 537 thereof in the same manner as vanes 512. Second vanes 536 however, preferably extend only part of the way from upstream end 535 to downstream end 537 so that the tips of first and second vanes 534 and 536 are stepped or lie on a different annulus. In this way, a first type of passage 538 is provided in second swirler 506 having a first configuration and a second type of passage 540 is provided in second swirler 506 having a second configuration.

Figure 33:
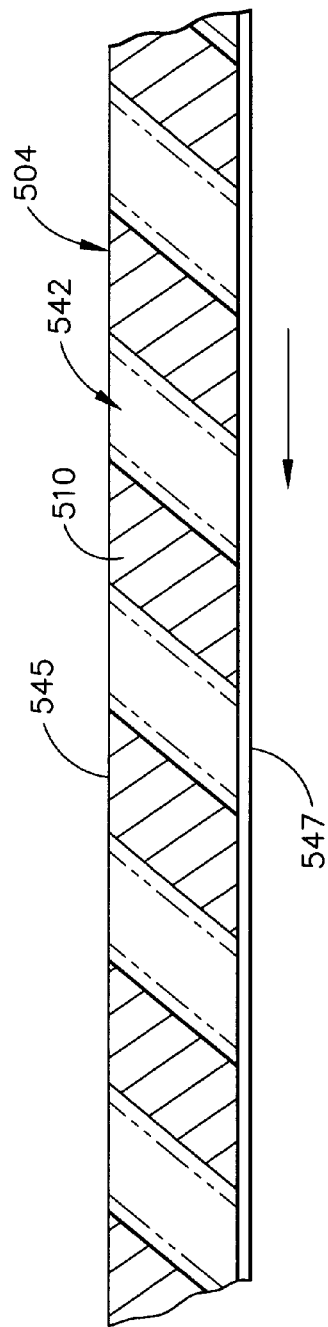
FIG. 33 is a view of the swirler arrangement depicted in FIGS. 28 and 29 taken along line 33-33 in FIG. 29, where the vanes in the inner axial swirler are arranged to define substantially uniform passages therebetween.

Vanes 510 of first swirler 504 may be of substantially uniform orientation and spacing to provide substantially uniform passages 542 therebetween (see FIG. 33). Vanes 510 of first swirler 504 are preferably oriented at an angle of approximately 20-70° with respect to centerline axis 120 through mixing assembly 500 and preferably have a length 544 which is measured across opposite ends (i.e., perpendicular to centerline axis 120 of mixing assembly 500).

Figure 34:
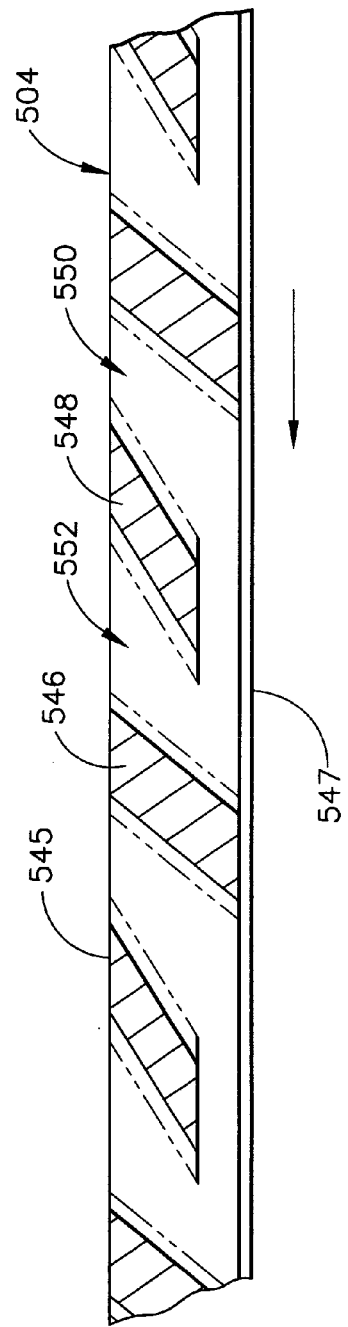
FIG. 34 is a view of the inner axial swirler similar to that depicted in FIG. 33, where the vanes are arranged to define shaped passages therebetween.
Figure 35:
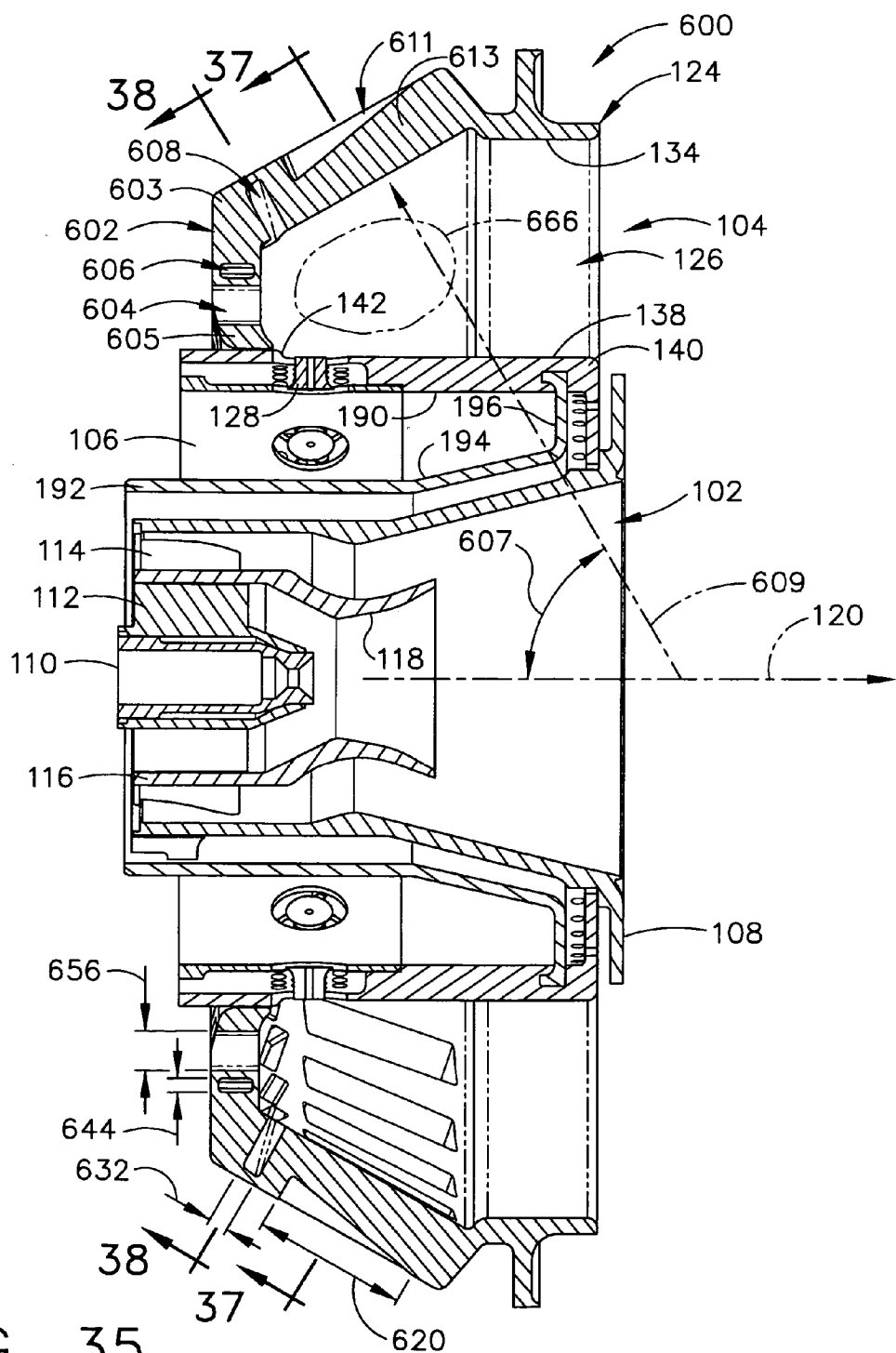
FIG. 35 is an enlarged, cross-sectional view of a sixth embodiment for the mixer assembly of the present invention, where the main mixer has a swirler arrangement including two swirlers oriented substantially parallel to a centerline axis through the main mixer and two swirlers oriented at an acute angle to the centerline axis.
Figure 36:
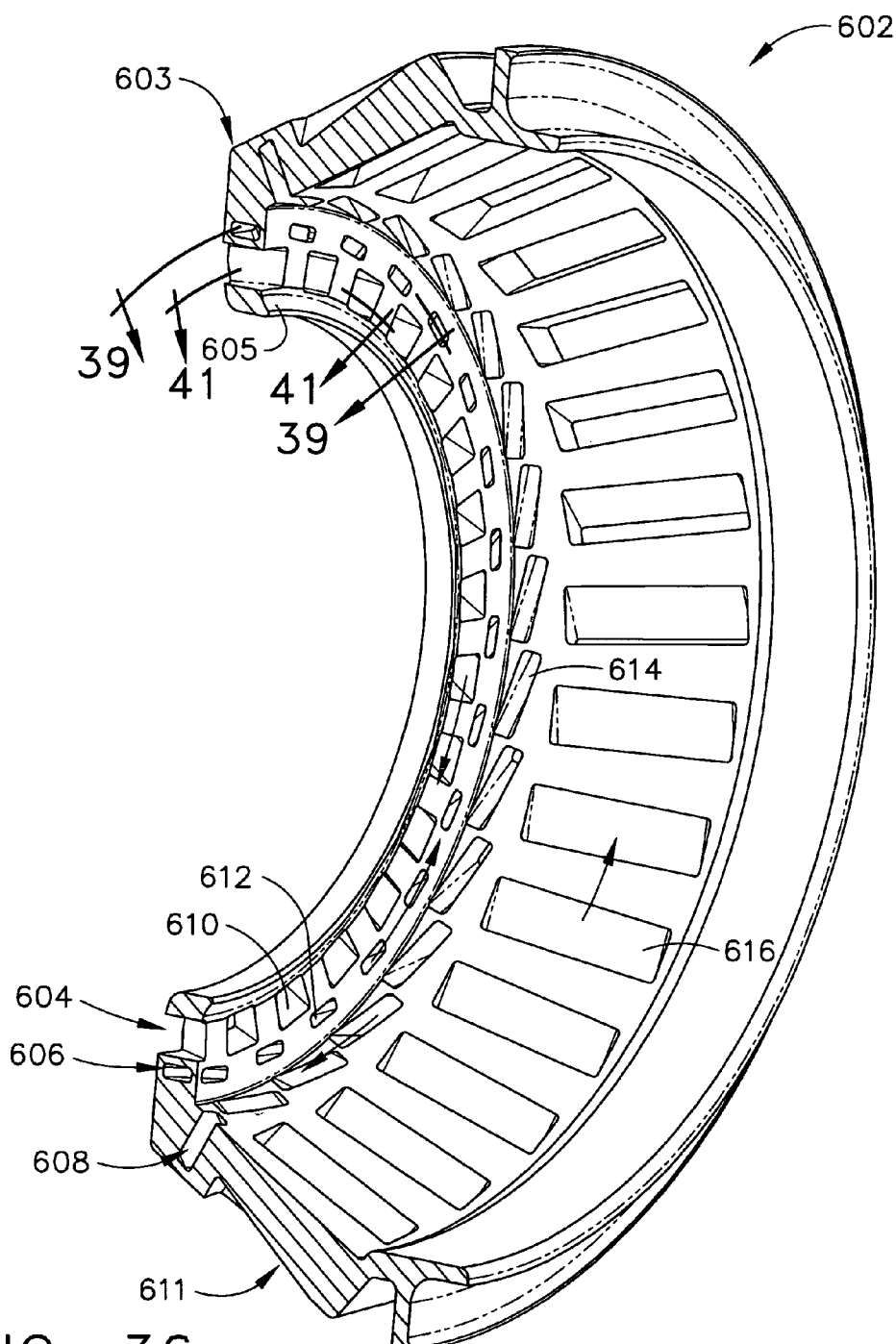
FIG. 36 is a partial perspective view of the swirler arrangement depicted in FIG. 35.

Alternatively, first swirler 504 may have a plurality of first vanes 546 oriented at a first angle (approximately 20-70°) with respect to centerline axis 120 and a plurality of second vanes 548 oriented at a second angle (approximately 20-70°) with respect to centerline axis 120 that alternate with first vanes 546 (see FIG. 34). It will be noted that first vanes 546 preferably extend from an upstream end 545 of first swirler 504 to a downstream end 547 thereof in the same manner as vanes 510. Second vanes 548, however, preferably extend only part of the way from upstream end 545 to downstream end 547 so that the tips of first and second vanes 546 and 548 are stepped or lie on a different annulus. In this way, a first type of passage 550 is provided in first swirler 504 having a first configuration and a second type of passage 552 is provided in first swirler 504 having a second configuration.

It will be understood that air flowing through first and third swirlers 504 and 508 will be swirled in a first direction and air flowing through second swirler 506 will preferably be swirled in a direction opposite the first direction. In this way, an intense mixing region 554 of air and fuel is created within annular cavity 126 having an enhanced total kinetic energy. By properly configuring swirlers 504, 506 and 508, intense mixing region 554 is substantially centered within annular cavity 126, positioned axially adjacent fuel injection ports 128 and has a designated area. Vanes 510 and 512 of first and second swirlers 504 and 506 may be substantially aligned circumferentially with respect to centerline axis 120 through mixing assembly 500 or not to further tailor the characteristics of air flowing therethrough as desired. Likewise, the configuration of the vanes in swirlers 504, 506 and 508 may be altered to vary the swirl direction of air flowing therethrough and not be limited to the exemplary swirl directions indicated hereinabove.

It will be seen that length 520 of third swirler vanes 514 is preferably greater than length 532 of second swirler vanes 512. Length 544 of first swirler vanes 510 is preferably greater than length 532 of second swirler vanes 512 and less than length 520 of third swirler vanes 514. Accordingly, a relatively greater amount of air flows through third swirler 508 than through first and second swirlers 504 and 506 due to the greater passage area therefor. More air flows through first swirler 504 than through second swirler 506 for the same reason. The relative lengths of swirlers 504, 506 and 508 may be varied as desired to alter the distribution of air therethrough, so the sizes depicted are only illustrative.

It will be understood that modifications of mixing assembly 100 in mixing assembly 500 are limited to the swirler arrangement 502, and therefore numerals identifying other components of main mixer 104, as well as pilot mixer 102 and fuel manifold 106, are not changed.

In a sixth embodiment of the mixing assembly, identified by numeral 600, an alternative swirler arrangement 602 having a swirler housing 603 is utilized and shown in FIGS. 35-42. It will be seen that swirled arrangement 602 preferably includes first, second, third and forth swirlers 604, 606, 608 and 611, respectively, positioned upstream from fuel injection ports 128. First and second swirlers 604 and 606 are positioned within a forward wall 605 substantially parallel to centerline axis 120 of mixing assembly 600, with second swirler 606 being positioned radially outside of first swirler 604. Third and fourth swirlers 608 and 611 are positioned within a conical wall 613 having an axis 609 therethrough oriented at an acute angle 607 to centerline axis 120, with fourth swirler 611 being located downstream of second swirler 606. In addition, each swirler has a plurality of vanes (identified by numerals 610, 612, 614 and 616 for first swirler 604, second swirler 606, third swirler 608 and fourth swirler 611, respectively) for swirling air traveling through such swirler to mix air and droplets of fuel dispensed by fuel injection ports 128.

Figure 37:
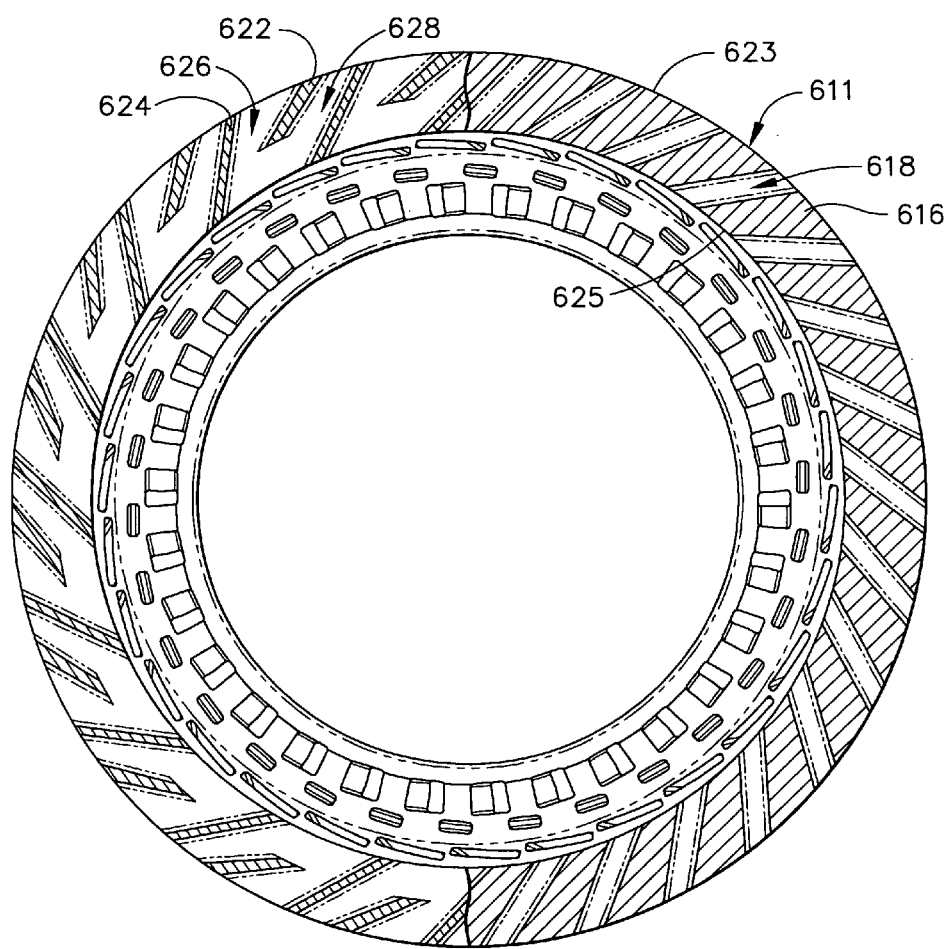
FIG. 37 is an aft view of the swirler arrangement depicted in FIGS. 35 and 36 taken along line 37-37 in FIG. 35, where the vanes in the downstream conical swirler are arranged to define substantially uniform passages therebetween on a right portion thereof and the vanes are arranged to define shaped passages therebetween on a left portion thereof.

It will be noted that vanes 616 of fourth swirler 611 may be of substantially uniform orientation and spacing to provide substantially uniform passages 618 therebetween (see right portion of FIG. 37). Vanes 616 of fourth swirler 611 are preferably oriented at an angle of approximately 0-60° with respect to axis 609 and preferably have a length 620 which is measured across opposite ends (i.e., perpendicular to axis 609).

Alternatively, fourth swirler 611 may have a plurality of first vanes 622 oriented at a first angle (approximately 20-70°) with respect to axis 609 and a plurality of second vanes 624 oriented at a second angle (approximately 20-70°) with respect to axis 609 which alternate with first vanes 622 (see left portion of FIG. 37). It will be noted that first vanes 622 preferably extend from an upstream end 623 of fourth swirler 611 to a downstream end 625 thereof in the same manner as vanes 616. Second vanes 624, however, preferably extend only part of the way from upstream end 623 to downstream end 625 so that the tips of first and second vanes 622 and 624 are stepped or lie on a different annulus. In this way, a first type of passage 626 having a first configuration is defined between adjacent pairs of vanes 622,624 and a second type of passage 628 having a second configuration is defined between opposite sides of vanes 622,624. It will be seen that passages 626 and 628 are configured differently, whereby momentum changes are produced. As stated above, the shaping of such passages 626 and 628 permit greater flexibility in controlling air flow characteristics of fourth swirler 611.

Figure 38:
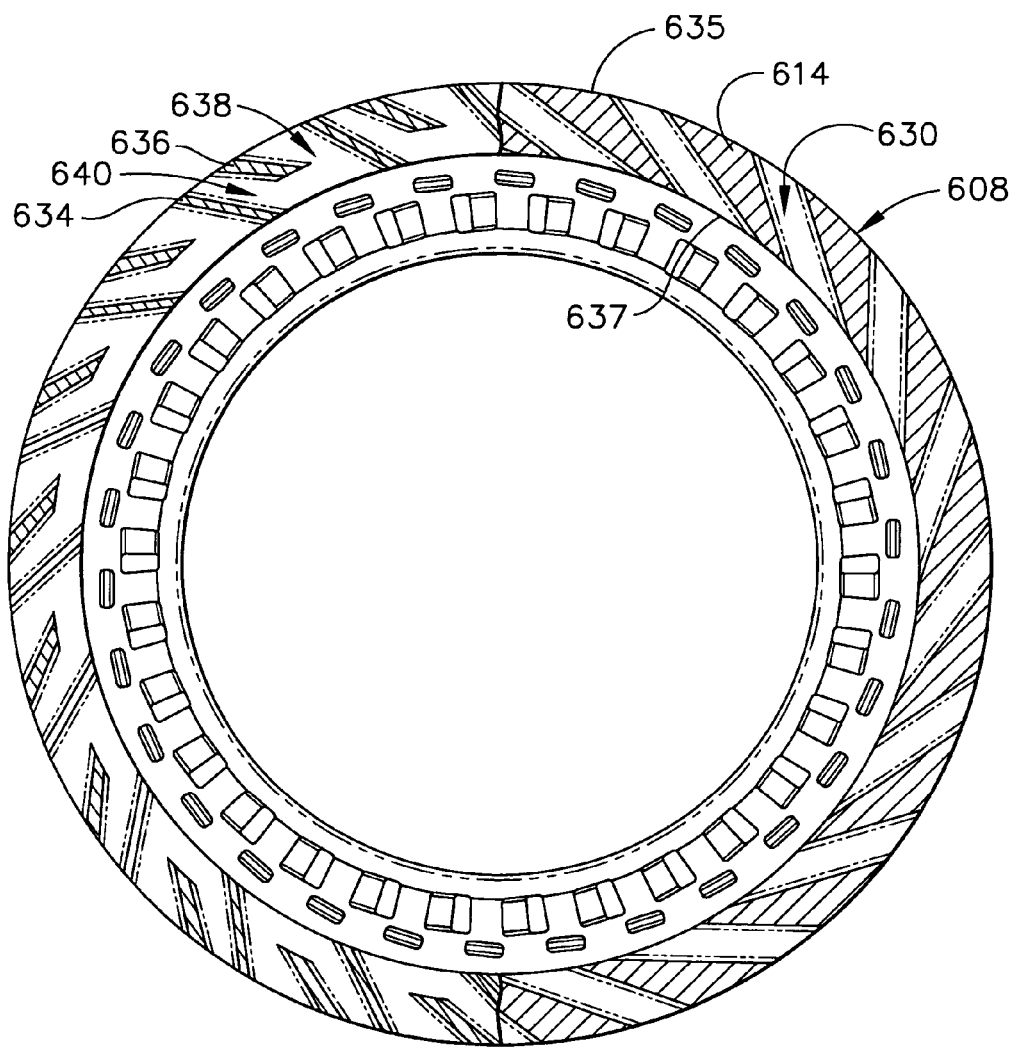
FIG. 38 is an aft view of the swirler arrangement depicted in FIGS. 35 and 36 taken along line 38-38 in FIG. 35, where the vanes in the upstream conical swirler are arranged to define substantially uniform passages therebetween on a right portion thereof and the vanes are arranged to define shaped passages therebetween on a left portion.
Figure 43:
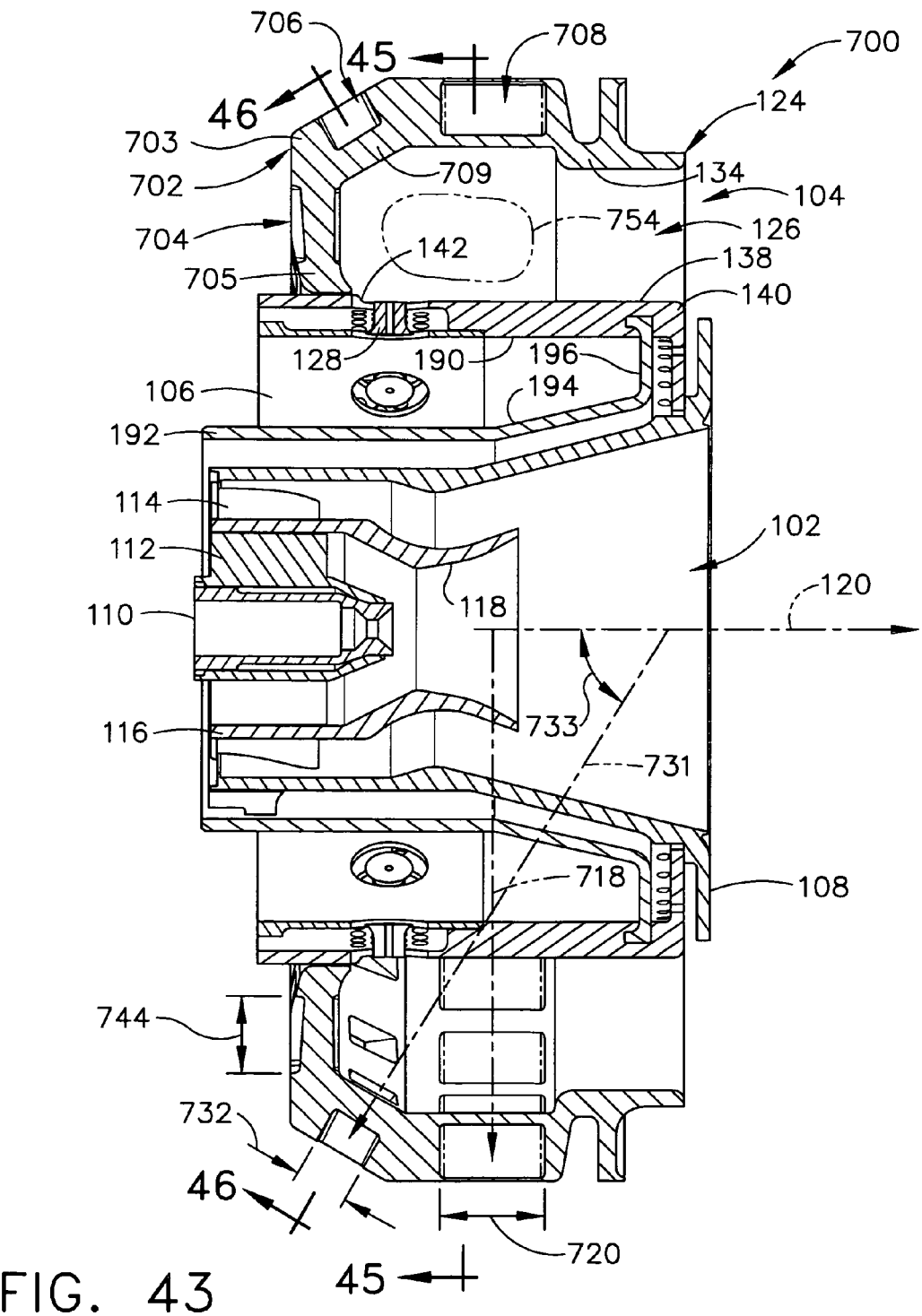
FIG. 43 is an enlarged, cross-sectional view of a seventh embodiment for the mixer assembly of the present invention, where the main mixer has a swirler arrangement including a first swirler oriented substantially parallel to a centerline axis through the main mixer, a second swirler oriented at an acute angle to the centerline axis, and a third swirler oriented substantially radially to the centerline axis.
Figure 44:
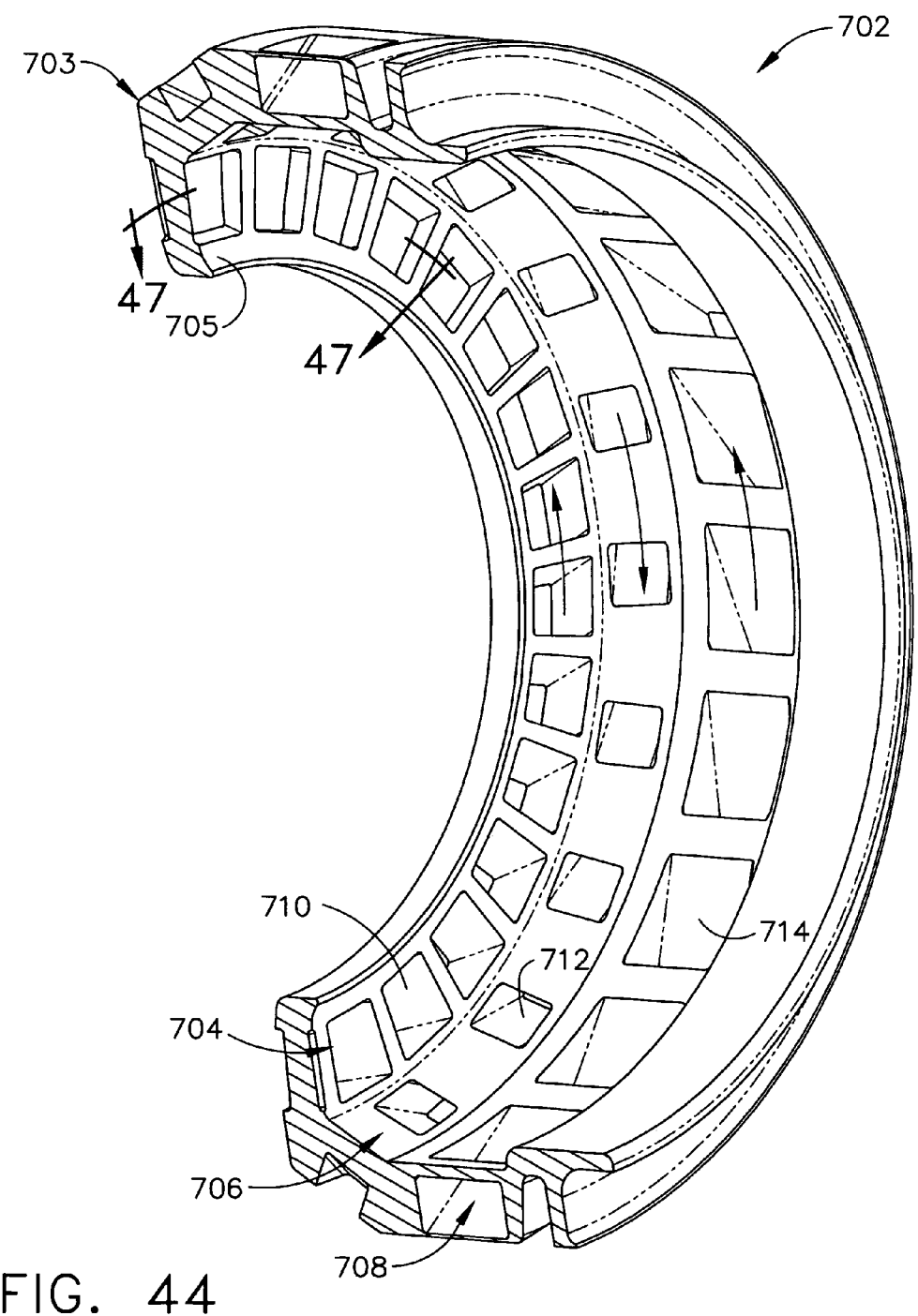
FIG. 44 is a partial perspective view of the swirler arrangement depicted in FIG. 43.

It will be noted that vanes 614 of third swirler 608 may be of substantially uniform orientation and spacing to provide substantially uniform passages 630 therebetween (see right portion of FIG. 38). Vanes 614 of third swirler 608 are preferably oriented at an angle of approximately 0-60° with respect to axis 609 and preferably have a length 632 which is measured across opposite ends (i.e., perpendicular to axis 609).

Alternatively, third swirler 608 may have a plurality of first vanes 634 oriented at a first angle (approximately 0-60°) with respect to axis 609 and a plurality of second vanes 636 oriented at a second angle (approximately 0-60°) with respect to axis 609 which alternate with first vanes 634 (see left portion of FIG. 38). It will be noted that first vanes 634 preferably extend from an upstream end 635 of third swirler 608 to a downstream end 637 thereof in the same manner as vanes 614. Second vanes 636, however, preferably extend only part of the way from upstream end 635 to downstream end 637 so that the tips of first and second vanes 634 and 636 are stepped or lie on a different annulus. In this way, a first type of passage 638 having a first configuration is defined between adjacent pairs of vanes 634,636 and a second type of passage 640 having a second configuration is defined between opposite sides of vanes 634,636. It will be seen that passages 638 and 640 are configured differently, whereby momentum changes are produced. As stated above, the shaping of such passages 638 and 640 permit greater flexibility in controlling air flow characteristics of third swirler 608.

Similarly, vanes 612 of second swirler 606 may be of substantially uniform orientation and spacing to provide substantially uniform passages 642 therebetween (see FIG. 39). Vanes 612 of second swirler 606 are preferably oriented at an angle of approximately 0-60° with respect to centerline axis 120 and preferably have a length 644 which is measured across opposite ends (i.e., perpendicular to centerline axis 120).

Alternatively, second swirler 606 may have a plurality of first vanes 646 oriented at a first angle (approximately 0-60°) with respect to centerline axis 120 and a plurality of second vanes 648 oriented at a second angle (approximately 0-60°) with respect to centerline axis 120 that alternate with first vanes 646 (see FIG. 40). It will be noted that first vanes 646 preferably extend from an upstream end 645 of second swirler 606 to a downstream end 647 thereof in the same manner as vanes 612. Second vanes 648, however, preferably extend only part of the way from upstream end 645 to downstream end 647 so that the tips of first and second vanes 646 and 648 are stepped or lie on a different annulus. In this way, a first type of passage 650 having a first configuration is defined between opposite sides of vanes 646,648 and a second type of passage 652 having a second configuration is defined between opposite sides of vanes 646,648. It will be seen that passages 650 and 652 are configured differently, whereby momentum changes are produced. As stated above, the shaping of such passages 650 and 652 permit greater flexibility in controlling air flow characteristics of second swirler 606.

Vanes 610 of first swirler 604 may be of substantially uniform orientation and spacing to provide substantially uniform passages 654 therebetween (see FIG. 41). Vanes 610 of first swirler 604 are preferably oriented at an angle of approximately 20-70° with respect to centerline axis 120 and preferably have a length 656 which is measured across opposite ends (i.e., perpendicular to centerline axis 120).

Alternatively, first swirler 604 may have a plurality of first vanes 658 oriented at a first angle (approximately 20-70°) with respect to centerline axis 120 and a plurality of second vanes 660 oriented at a second angle (approximately 20-70°) with respect to centerline axis 120 that alternate with first vanes 658 (see FIG. 42). It will be noted that first vanes 658 preferably extend from an upstream end 659 of first swirler 604 to a downstream end 661 thereof in the same manner as vanes 610. Second vanes 660, however, preferably extend only part of the way from upstream end 659 to downstream end 661 so that the tips of first and second vanes 658 and 660 are stepped or lie on a different annulus. In this way, a first type of passage 662 having a first configuration is defined between opposite sides of vanes 658,660 and a second type of passage 664 having a second configuration is defined between opposite sides of vanes 658,660. It will be seen that passages 662 and 664 are configured differently, whereby momentum changes are produced. As stated above, the shaping of such passages 662 and 664 permit greater flexibility in controlling air flow characteristics of first swirler 604.

It will be understood that air flowing through first and third swirlers 604 and 608 will be swirled in a first direction and air flowing through second and fourth swirlers 606 and 611 will preferably be swirled in a direction opposite the first direction. In this way, an intense mixing region 666 of air and fuel is created within annular cavity 126 having an enhanced total kinetic energy. By properly configuring swirlers 604, 606,

608 and 611, intense mixing region 666 is substantially centered within annular cavity 126, positioned axially adjacent fuel injection ports 128 and has a designated area. Vanes 610 and 612 of first and second swirlers 604 and 606 may or may not be substantially aligned circumferentially with respect to centerline axis 120 in any combination to further tailor the characteristics of air flowing therethrough as desired. Likewise, vanes 614 and 616 of third and fourth swirlers 608 and 611 may or may not be substantially aligned circumferentially with respect to axis 609. In any event, the configuration of the vanes in swirlers 604, 606, 608 and 611 may be altered to vary the swirl direction of air flowing therethrough and not be limited to the exemplary swirl directions indicated hereinabove.

It will be seen that length 620 of fourth swirler vanes 616 is preferably greater than length 632 of third swirler vanes 614, whereas length 656 of first swirler vanes 610 is preferably greater than length 644 of second swirler vanes 612. Accordingly, a relatively greater amount of air flows through fourth swirler 611 than through third swirler 608 due to the greater passage area therefor. More air flows through first swirler 604 than through second swirler 606 for the same reason. The relative lengths of swirlers 604, 606, 608 and 611 may be varied as desired to alter the distribution of air therethrough, so the sizes depicted are only illustrative.

It will be understood that modifications of mixing assembly 100 in mixing assembly 600 are limited to the swirler arrangement 602, and therefore numerals identifying other components of main mixer 104, as well as pilot mixer 102 and fuel manifold 106, are not changed.

In a seventh embodiment of the mixing assembly, identified by numeral 700, an alternative swirler arrangement 702 having a swirler housing 703 is utilized and shown in FIGS. 43-48. It will be seen that swirler arrangement 702 preferably includes first, second and third swirlers 704, 706 and 708, respectively, positioned upstream from fuel injection ports 128. First swirler 704 is located within a forward wall 705 of swirler housing 703 and oriented substantially parallel to centerline axis 120 through mixing assembly 700. Second swirler 706 is located within a conical wall 709 of swirler housing 703 and oriented at an acute angle to centerline axis 120. Third swirler 708 is located within radially outer wall 134 of swirler housing 703 and oriented substantially perpendicular to centerline axis 120. Each swirler has a plurality of vanes (identified by numerals 710, 712 and 714 for first swirler 704, second swirler 706, and third swirler 708, respectively) for swirling air traveling through such swirler to mix air and droplets of fuel dispensed by fuel injection ports 128.

Figure 45:
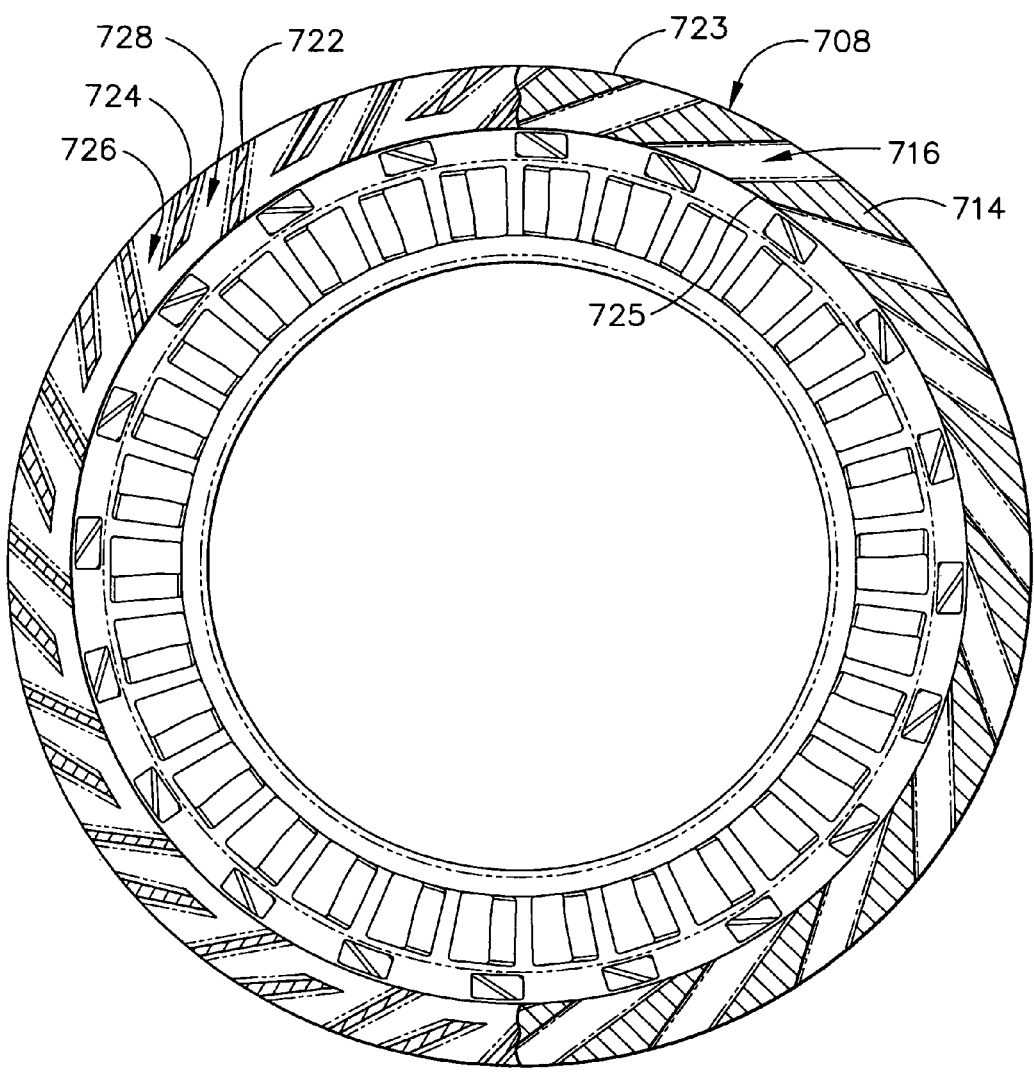
FIG. 45 is an aft view of the swirler arrangement depicted in FIGS. 43 and 44 taken along line 45-45 in FIG. 43, where the vanes in the radial swirler are arranged to define substantially uniform passages therebetween on a right portion thereof and the vanes are arranged to define shaped passages therebetween on a left portion thereof.

It will be noted that vanes 714 of third swirler 708 may be of substantially uniform orientation and spacing to provide substantially uniform passages 716 therebetween (see right portion of FIG. 45). Vanes 714 of third swirler 708 are preferably oriented at an angle of approximately 20-70° with respect to an axis 718 oriented substantially perpendicular to centerline axis 120 through mixing assembly 700 and preferably have a length 720 which is measured across opposite ends (i.e., perpendicular to axis 718).

Alternatively, third swirler 708 may have a plurality of first vanes 722 oriented at a first angle (approximately 20-70°) with respect to axis 718 and a plurality of second vanes 724 oriented at a second angle (approximately 20-70°) with respect to axis 718 which alternate with first vanes 722 (see left portion of FIG. 45). It will be noted that first vanes 722 preferably extend from an upstream end 723 of third swirler 708 to a downstream end 725 thereof in the same manner as vanes 714. Second vanes 724, however, preferably extend only part of the way from upstream end 723 to downstream end 725 so that the tips of first and second vanes 722 and 724 are stepped or lie on a different annulus. In this way, a first type of passage 726 having a first configuration is defined between adjacent pairs of vanes 722,724 and a second type of passage 728 having a second configuration is defined between opposite sides of vanes 722,724. It will be seen that passages 726 and 728 are configured differently, whereby momentum changes are produced. As stated above, the shaping of such passages 726 and 728 permit greater flexibility in controlling air flow characteristics of third swirler 708.

Figure 46:
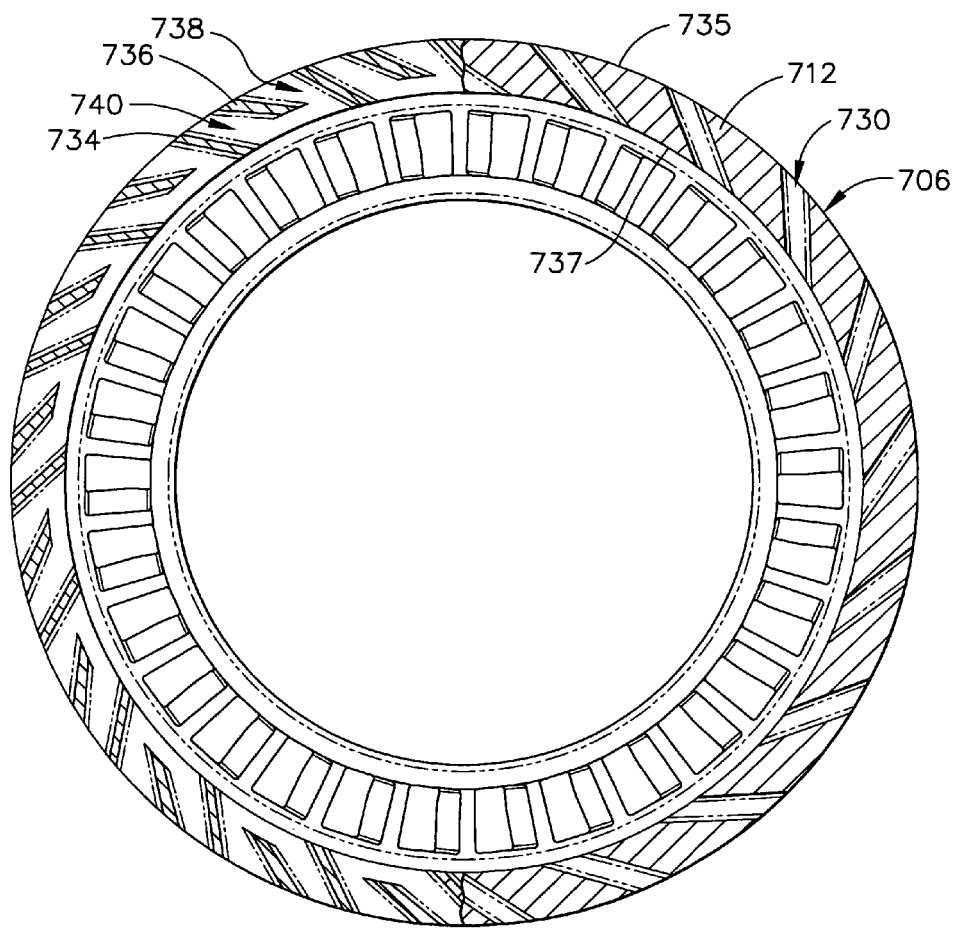
FIG. 46 is an aft view of the swirler arrangement depicted in FIGS. 43 and 44 taken along line 46-46 in FIG. 43, where the vanes in the conical swirler are arranged to define substantially uniform passages therebetween on a right portion thereof and the vanes are arranged to define shaped passages therebetween on a left portion.

Similarly, vanes 712 of second swirler 706 may be of substantially uniform orientation and spacing to provide substantially uniform passages 730 therebetween (see right portion of FIG. 46). Vanes 712 of second swirler 706 are preferably oriented at an angle of approximately 30-60° with respect to an axis 731 oriented at an acute angle 733 to centerline axis 120 and preferably have a length 732 which is measured across opposite ends (i.e., perpendicular to axis 731).

Alternatively, second swirler 706 may have a plurality of first vanes 734 oriented at a first angle (approximately 0-60°) with respect to axis 731 and a plurality of second vanes 736 oriented at a second angle (approximately 0-60°) with respect to centerline axis 120 that alternate with first vanes 734 (see left portion of FIG. 46). It will be noted that first vanes 734 preferably extend from an upstream end 735 of second swirler 706 to a downstream end 737 thereof in the same manner as vanes 712. Second vanes 736, however, preferably extend only part of the way from upstream end 735 to downstream end 737 so that the tips of first and second vanes 734 and 736 are stepped or lie on a different annulus. In this way, a first type of passage 738 is provided in second swirler 706 having a first configuration and a second type of passage 740 is provided in second swirler 706 having a second configuration.

Vanes 710 of first swirler 704 may be of substantially uniform orientation and spacing to provide substantially uniform passages 742 therebetween (see FIG. 47). vanes 710 of first swirler 704 are preferably oriented at an angle of approximately 20-70° with respect to centerline axis 102 through mixing assembly 700 and preferably have a length 744 which is measured across opposite ends (i.e., perpendicular to centerline axis 120 of mixing assembly 700).

Alternatively, first swirler 704 may have a plurality of first vanes 746 oriented at a first angle (approximately 20-70°) with respect to centerline axis 120 and a plurality of second vanes 748 oriented at a second angle (approximately 20-70°) with respect to centerline axis 120 that alternate with first vanes 746 (see FIG. 48). It will be noted that first vanes 746 preferably extend from an upstream end 745 of first swirler 704 to a downstream end 747 thereof in the same manner as vanes 710. Second vanes 748, however, preferably extend only part of the way from upstream end 745 to downstream end 747 so that the tips of first and second vanes 746 and 748 are stepped or lie on a different annulus. In this way, a first type of passage 750 is provided in the first swirler 704 having a first configuration and a second type of passage 752 is provided in first swirler 704 having a second configuration.

It will be understood that air flowing through first and third swirlers 704 and 708 will be swirled in a first direction and air flowing through second swirler 706 will preferably be swirled in a direction opposite the first direction. In this way, an intense mixing region 754 of air and fuel is created within annular cavity 126 having an enhanced total kinetic energy. By properly configuring swirlers 704, 706 and 708, intense mixing region 754 is substantially centered within annular cavity 126, positioned axially adjacent fuel injection ports 128 and has a designated area. In this regard, the configuration of the vanes in swirlers 704, 706 and 708 may be altered to vary the swirl direction of air flowing therethrough and not be limited to the exemplary swirl directions indicated hereinabove.

It will be seen that length 720 of third swirler vanes 714 is preferably greater than length 732 of second swirler vanes 712. Length 744 of first swirler vanes 710 is preferably greater than length 732 of second swirler vanes 712 and less than length 720 of third swirler vanes 714. Accordingly, a relatively greater amount of air flows through third swirler 708 than through first and second swirlers 704 and 706 due to the greater passage area therefor. More air flows through first swirler 704 than through second swirler 706 for the same reason. The relative lengths of swirlers 704, 706 and 708 may be varied as desired to alter the distribution of air therethrough, so the sizes depicted are only illustrative.

It will be understood that modifications of mixing assembly 100 in mixing assembly 700 are limited to the swirler arrangement 702, and therefore numerals identifying other components of main mixer 104, as well as pilot mixer 102 and fuel manifold 106, are not changed.

The various mixing assemblies described herein, which each include pilot mixer 102 and 104, further present a method of operating gas turbine engine combustor 26 with reduced emissions. The first step of such method includes providing a swirler arrangement 130, 202, 302, 402, 502, 602, or 702, in flow communication with an annular cavity 126 of main mixer 104, wherein an intense mixing region 188, 254, 354, 466, 554, 666, or 754 is created adjacent a plurality of fuel injection ports 128 to annular cavity 126. The next step includes causing air supplied to swirler arrangement 130, 202, 302, 402, 502, 602, or 702 to swirl in a counter-rotating manner in annular cavity. An additional step involves allocating air supplied to swirler arrangement 130, 202, 302, 402, 502, 602, or 702 among each swirler thereof in a predetermined amount. Thereafter, fuel is provided from fuel injection ports 128 into intense mixing region 188, 254, 354, 466, 554, 666 or 754, respectively.

Although particular embodiments of the present invention have been illustrated and described, it will be apparent to those skilled in the art that various changes and modifications can be made without departing from the spirit of the present invention. Accordingly, it is intended to encompass within the appended claims all such changes and modification that fall within the scope of the present invention.

What is claimed is:

1. A mixer assembly for use in a combustion chamber of a gas turbine engine, comprising:
   (a) a pilot mixer including an annular pilot housing having a hollow interior and a pilot fuel nozzle mounted in said pilot housing and adapted for dispensing droplets of fuel to said hollow interior of said pilot housing;
   (b) a main mixer including:
   (1) a main housing surrounding said pilot housing and defining an annular cavity;
   (2) a plurality of fuel injection ports for introducing fuel into said cavity;
   (3) a swirler arrangement including at least first, second, and third swirlers positioned upstream from said fuel injection ports, said first swirler positioned axially upstream of said second swirler and said third swirler positioned axially downstream of said second swirler, wherein each swirler of said swirler arrangement is oriented substantially radially to a centerline axis through said mixer assembly and has a plurality of vanes for swirling air traveling through such swirler to mix air and said droplets of fuel dispensed by said fuel injection ports; and,
   (c) a fuel manifold positioned between said pilot mixer and said main mixer, wherein said plurality of fuel injection ports for introducing fuel into said main mixer cavity are in flow communication with said fuel manifold.

2. The mixer assembly of claim 1, wherein said first and third swirlers swirl air in a first direction and said second swirler swirls air in a direction opposite said first direction.

3. The mixer assembly of claim 1, wherein vanes of said third swirler have a length greater than vanes of said second swirler.

4. The mixer assembly of claim 1, wherein vanes of said first swirler have a length grater than vanes of said second swirler.

5. The mixer assembly of claim 1, wherein vanes of said first swirler are oriented at an angle of approximately 20-70° with respect to a centerline axis through said swirler arrangement, vanes of said second swirler are oriented at an angle of approximately 0-60° with respect to said centerline axis through said swirler arrangement, and vanes of said third swirler are oriented at an angle of approximately 20-70° with respect to said centerline axis through said swirler arrangement.

6. The mixer assembly of claim 1, wherein vanes of said first, second and third swirlers are substantially aligned circumferentially with respect to a centerline axis through said swirler arrangement.

7. The mixer assembly of claim 1, wherein vanes of said first, second and third swirlers are not substantially aligned circumferentially with respect to a centerline axis through said swirler arrangement.

8. The mixer assembly of claim 1, at least one swirler of said swirler arrangement further comprising:
   (a) a first plurality of vanes oriented at a first angle with respect to a centerline axis through said swirler arrangement; and,
   (b) a second plurality of vanes oriented at a second angle with respect to said swirler arrangement centerline axis;
wherein a first type of passage is defined between adjacent vanes having a first configuration and a second type of passage is defined between adjacent vanes having a second configuration.

9. The mixer assembly of claim 8, wherein each of said first plurality of vanes is oriented at an angle of approximately 0-60° with respect to said swirler arrangement centerline axis.

10. The mixer assembly of claim 8, wherein each of said second plurality of vanes is oriented at an angle of approximately 0-60° with respect to said swirler arrangement centerline axis.

11. The mixer assembly of claim 1, wherein an intense mixing region is created which is substantially centered radially within said annular cavity of said main mixer.

12. The mixer assembley of claim 11, wherein said intense mixing region is located axially adjacent said fuel injection ports.

13. A method of operating a gas turbine engine combustor with reduced emissions, wherein said combustor includes a plurality of mixer assemblies having a pilot mixer and a main mixer, comprising the following steps:
   (a) providing a plurality of fuel injection ports in flow communication with an annular cavity of each said main mixer;
   (b) providing a swirler arrangement in flow communication with said annular cavity of each said main mixer, said swirler arrangement including at least first, second, and third swirlers positioned upstream of said fuel injection ports and oriented substantially radially to a centerline axis through each said mixer assembly, said first swirler positioned axially upstream of said second swirler and said third swirler positioned axially downstream of said second swirler, wherein an intense mixing region is created adjacent a said plurality of fuel injection ports to said annular cavity;

(c) causing air supplied to each said swirler arrangement to swirl in a counter-rotating manner in said annular cavity;
(d) allocating air supplied to each said swirler arrangement among each swirler thereof in a predetermined amount, and,
(e) providing fuel from said fuel injection ports into said intense mixing region.

* * * * *